US011231793B2

(12) United States Patent
Gray et al.

(10) Patent No.: US 11,231,793 B2
(45) Date of Patent: Jan. 25, 2022

(54) PEN SYSTEM WITH INTERNAL PRESSURE TILT ROTATION

(71) Applicant: SIGMASENSE, LLC., Wilmington, DE (US)

(72) Inventors: Patrick Troy Gray, Cedar Park, TX (US); Michael Gray, Dripping Springs, TX (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

(21) Appl. No.: 17/082,237

(22) Filed: Oct. 28, 2020

(65) Prior Publication Data

US 2021/0041968 A1  Feb. 11, 2021

Related U.S. Application Data

(63) Continuation of application No. 16/672,725, filed on Nov. 4, 2019, now Pat. No. 10,852,851, which is a (Continued)

(51) Int. Cl.
*G06F 3/0354* (2013.01)
*G06F 3/041* (2006.01)
(Continued)

(52) U.S. Cl.
CPC ........ *G06F 3/03545* (2013.01); *G06F 3/0346* (2013.01); *G06F 3/0383* (2013.01);
(Continued)

(58) Field of Classification Search
CPC . G06F 3/0383; G06F 3/04162; G06F 3/03545
See application file for complete search history.

(56) References Cited

U.S. PATENT DOCUMENTS 6,218,972 B1   4/2001   Groshong
6,665,013 B1   12/2003  Fossum et al.
(Continued)

FOREIGN PATENT DOCUMENTS

CN   103995626 A   8/2014
CN   104182105 A   12/2014
(Continued)

OTHER PUBLICATIONS

Baker; How delta-sigma ADCs work, Part 1; Analog Applications Journal; Oct. 1, 2011; 6 pgs.
(Continued)

*Primary Examiner* — Laurence J Lee
(74) *Attorney, Agent, or Firm* — Garlick & Markison; Timothy W. Markison; Shayne X. Short

(57) ABSTRACT

A pen apparatus with a pressure sensitive tip mechanism that internally generates pressure, tilt, and/or barrel rotation through the use of a multi-axis measurement scheme with simultaneous transmit, receive, and sensing driver capability operable in conjunction with a receiving system or in a relative stand-alone manner. Signaling schemes are provided for operating the pen apparatus to achieve improved function. Systems and methods are provided for operating a pen, and for operating a pen with a touch sensor system. Drive/receive circuitry and methods of driving and receiving sensor electrode signals are provided that allow digital I/O pins to be used to interface with touch sensor electrodes. This circuitry may be operated in modes to sense various combinations of signals coupled within a pen, or from outside of a pen.

20 Claims, 43 Drawing Sheets

Related U.S. Application Data continuation of application No. 16/399,336, filed on Apr. 30, 2019, now Pat. No. 10,514,783, which is a continuation of application No. 15/506,137, filed as application No. PCT/US2016/041070 on Jul. 6, 2016, now Pat. No. 10,296,108.

(60) Provisional application No. 62/189,161, filed on Jul. 6, 2015.

(51) Int. Cl.
*G06F 3/0346* (2013.01)
*G06F 3/038* (2013.01)
*G06F 3/044* (2006.01)

(52) U.S. Cl.
CPC ............ *G06F 3/044* (2013.01); *G06F 3/0416* (2013.01); *G06F 3/0418* (2013.01); *G06F 3/0441* (2019.05); *G06F 3/0442* (2019.05); *G06F 3/04162* (2019.05); *G06F 3/04184* (2019.05); *G06F 2203/04105* (2013.01)

(56) References Cited

U.S. PATENT DOCUMENTS

| | | |
|---|---|---|
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,587,535 B2 | 11/2013 | Oda et al. |
| 8,625,726 B2 | 1/2014 | Kuan et al. |
| 8,982,097 B1 | 3/2015 | Kuzo et al. |
| 9,201,547 B2 | 12/2015 | Elias |
| 9,946,366 B2 | 4/2018 | Shahparnia et al. |
| 10,101,228 B2 | 10/2018 | Horie et al. |
| 2011/0063154 A1 | 3/2011 | Hotelling et al. |
| 2011/0193776 A1 | 8/2011 | Oda et al. |
| 2011/0298745 A1 | 12/2011 | Souchkov |
| 2012/0278031 A1 | 11/2012 | Sugiyama |
| 2013/0265265 A1 | 10/2013 | Stern |
| 2013/0278447 A1 | 10/2013 | Kremin |
| 2014/0327644 A1 | 11/2014 | Mohindra |
| 2014/0354555 A1 | 12/2014 | Shahparnia et al. |
| 2015/0002415 A1 | 1/2015 | Lee et al. |
| 2015/0070330 A1 | 3/2015 | Stern |
| 2015/0091847 A1 | 4/2015 | Chang |
| 2015/0123932 A1 | 5/2015 | Collins |
| 2015/0261356 A1 | 9/2015 | Shepelev et al. |
| 2015/0338950 A1 | 11/2015 | Ningrat et al. |
| 2015/0346889 A1 | 12/2015 | Chen et al. |
| 2016/0048225 A1* | 2/2016 | Curtis ................. G06F 3/03546 345/173 |
| 2016/0062490 A1 | 3/2016 | Ogata et al. |
| 2016/0085356 A1 | 3/2016 | Stern |
| 2016/0291707 A1 | 10/2016 | Coppin |
| 2016/0320895 A1 | 11/2016 | Ribeiro |
| 2017/0177099 A1 | 6/2017 | Tamura |

FOREIGN PATENT DOCUMENTS

| | | |
|---|---|---|
| JP | 2002297300 A | 10/2002 |
| JP | 2012168729 A | 9/2012 |
| KR | 1020110074652 A | 7/2011 |
| KR | 1020110091459 A | 8/2011 |
| WO | 2015027017 A1 | 2/2015 |
| WO | 2015084542 A1 | 6/2015 |

OTHER PUBLICATIONS

International Search Authority; International Search Report and Written Opinion; PCT/US2016/041070; dated Oct. 18, 2016.
European Patent Office; Extended European Search Report; EP Application No. 16821899.8; dated Apr. 12, 2018; 8 pgs.

* cited by examiner

Legend

 f1 — Due to higher current flow caused by differential voltages and parasitic capacitance use a lower frequency

 f2 — No mutual parasitic, lower current flow, longer sampling window. Use higher frequency and lower amplitude

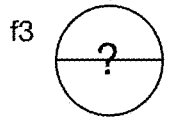 f3 — Long sampling window

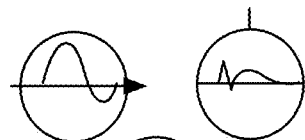

Mutual (f1) — 50-150Kz, as large Vpp as possible

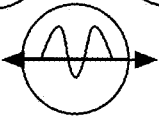

Self (f2) — 100-200Khz, 500mVpp

Receive — 0-200Khz, combination of Dither And f2 to overcome Hysteresys

Mutual (f1) TX one line

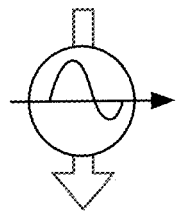

Clock Domains

| | |
|---|---|
| Σ Δ AtoD | 100-400Mhz |
| PWM | 10-40Mhz |
| DEMOD | 1-4Mhz |
| PROCESSOR | 40-100Mhz |

FIG. 2

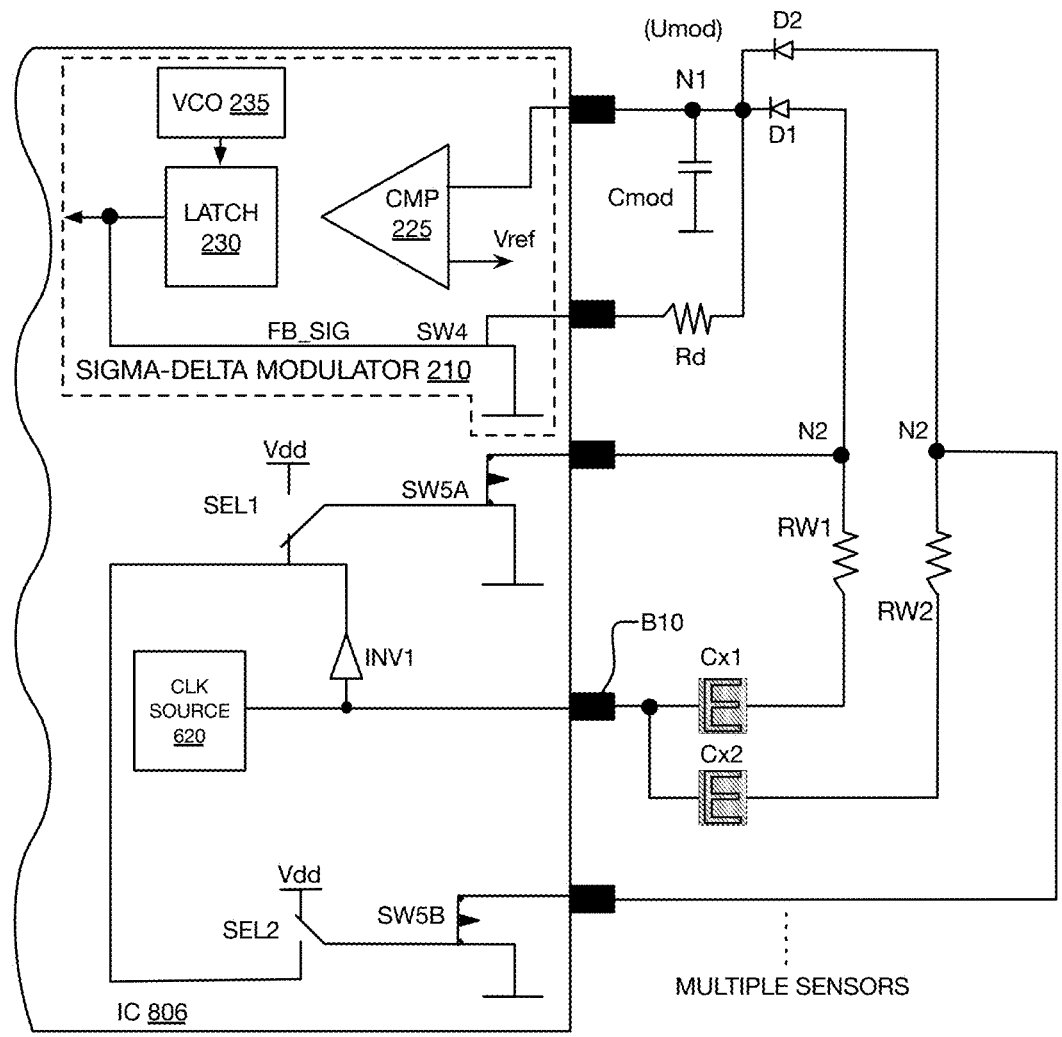
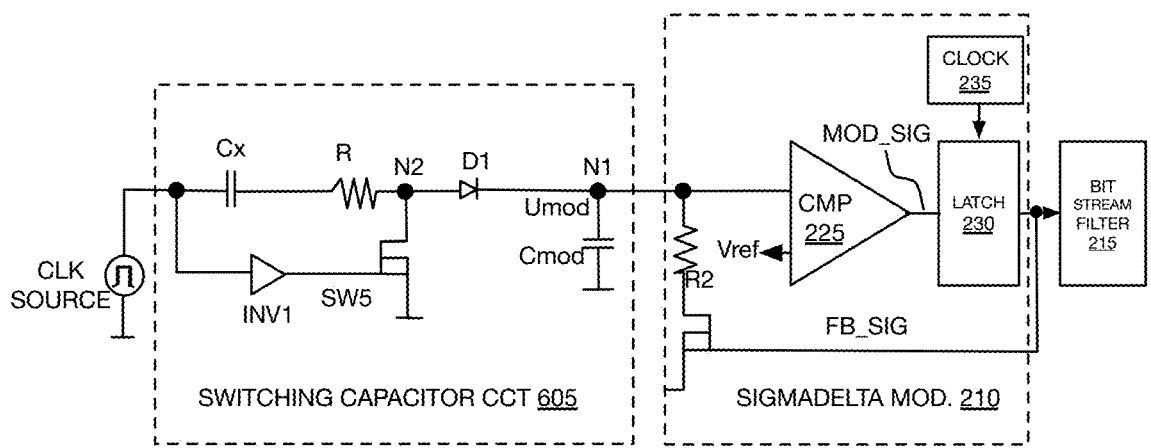
FIG. 20 (Prior Art)

FIG. 21 (PriorArt)

FIG. 22 (PriorArt)

FIG. 23 (PriorArt)

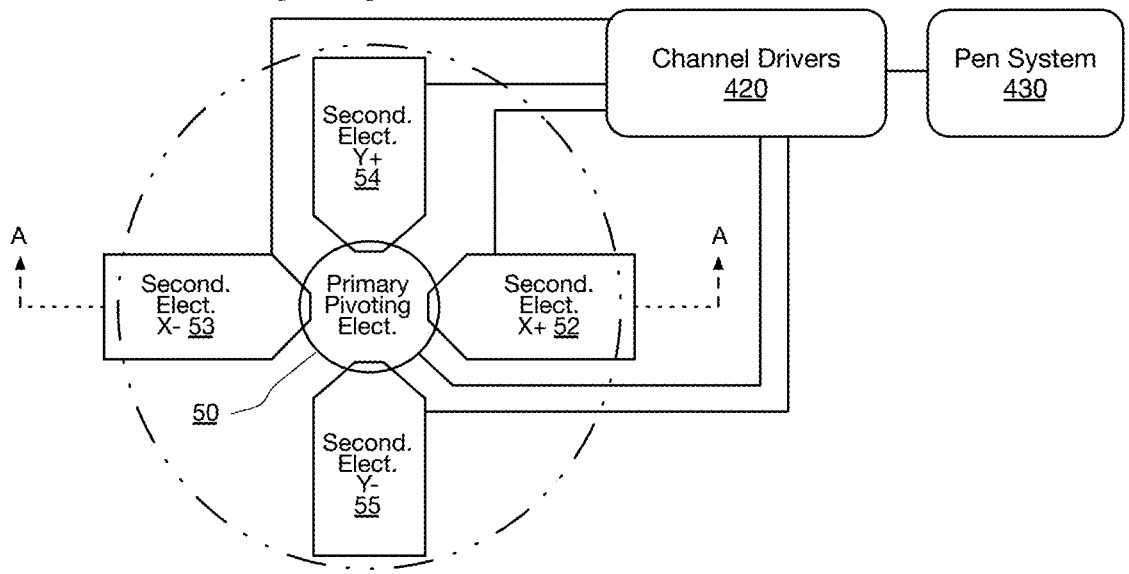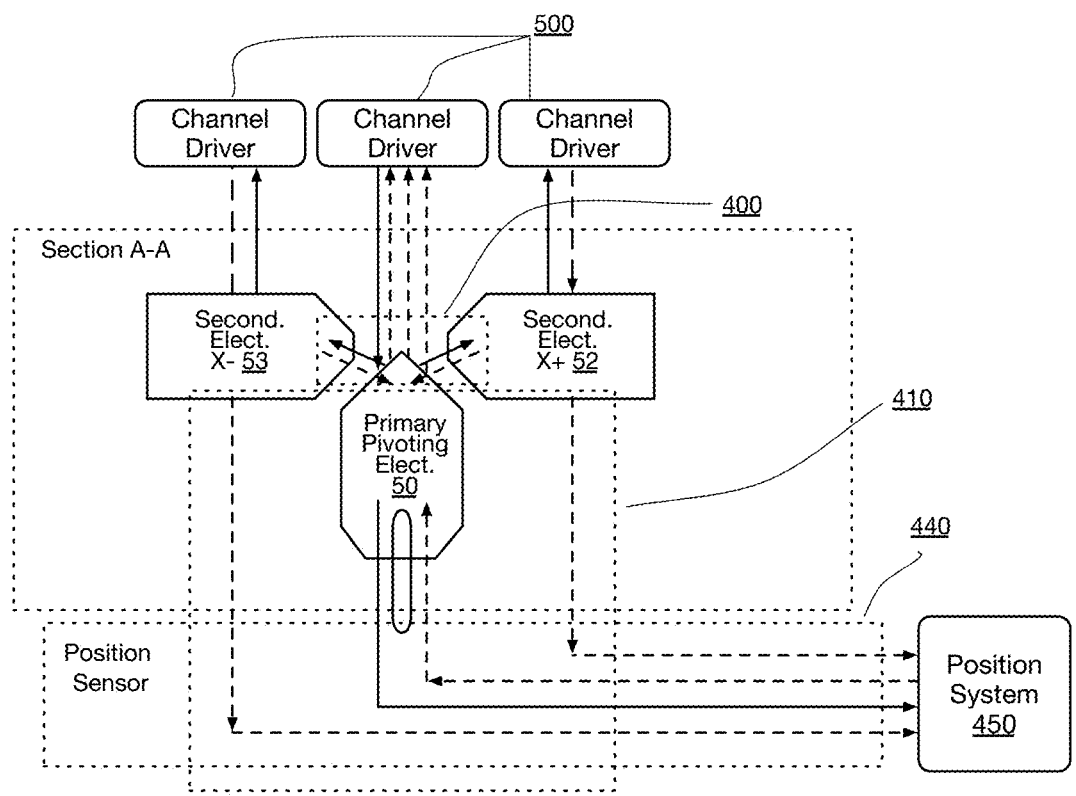
Fig. 31

X Diff = abs (X1-X2)
X Pressure = (X1+X2)
X Tilt Angle = atan((X1+X2) / X Diff)
Diff = abs (Y1-Y2)
Y Pressure = (Y1+Y2) + Y Diff
Y Tilt Angle = atan((Y1+Y2) / Y Diff)

Rotation Angle = ATAN2 (Diff Y, Dif X)

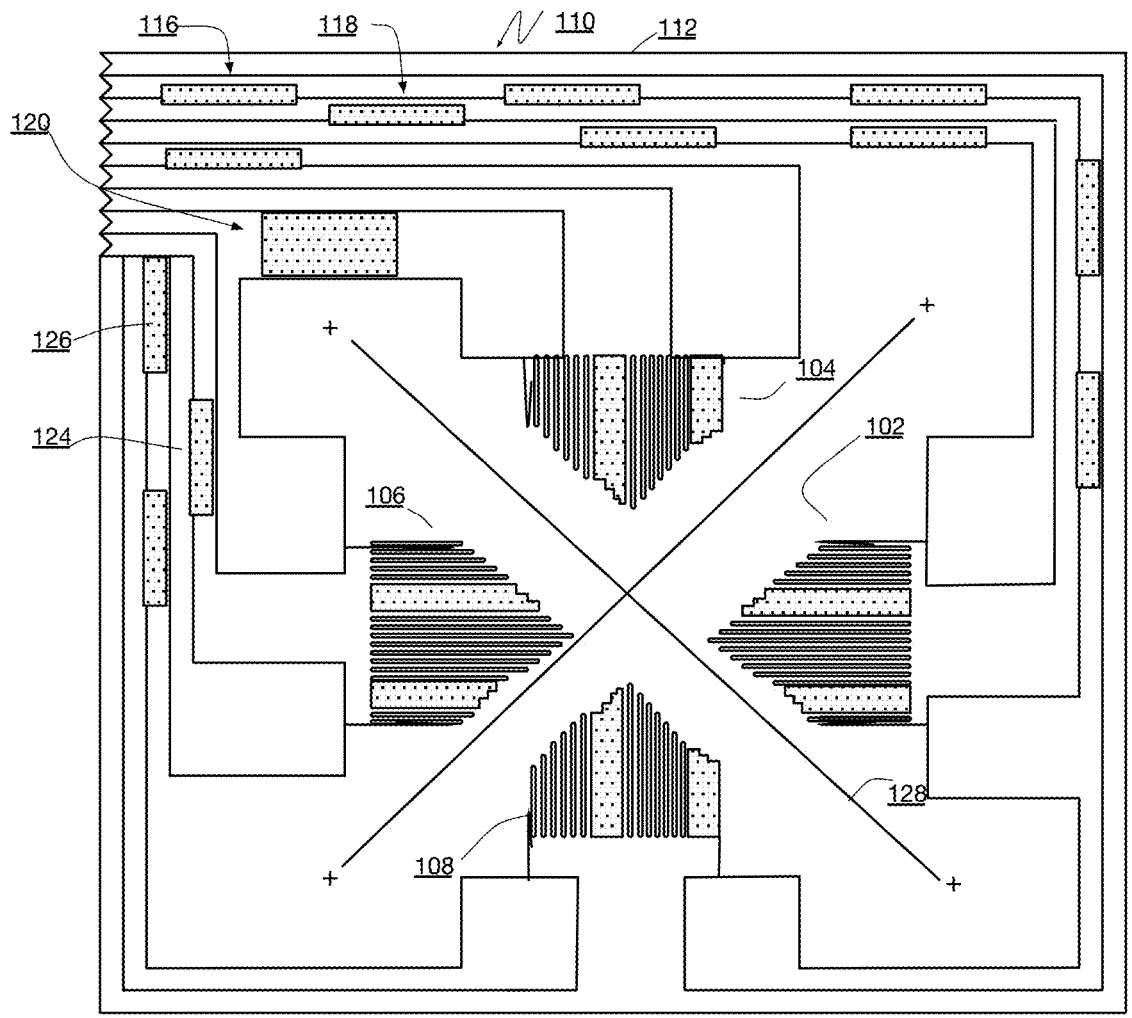
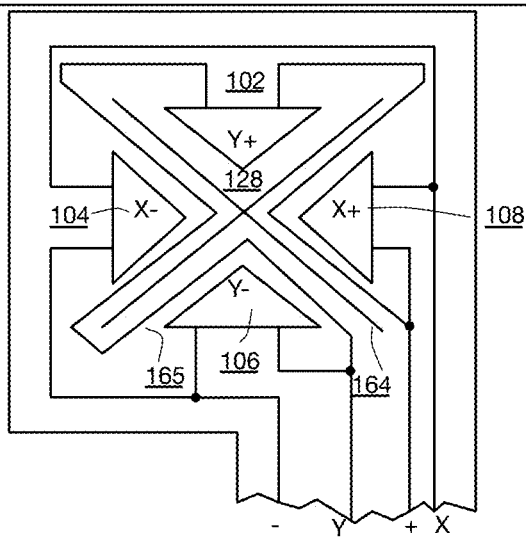
**Fig. 40
(Prior Art)**

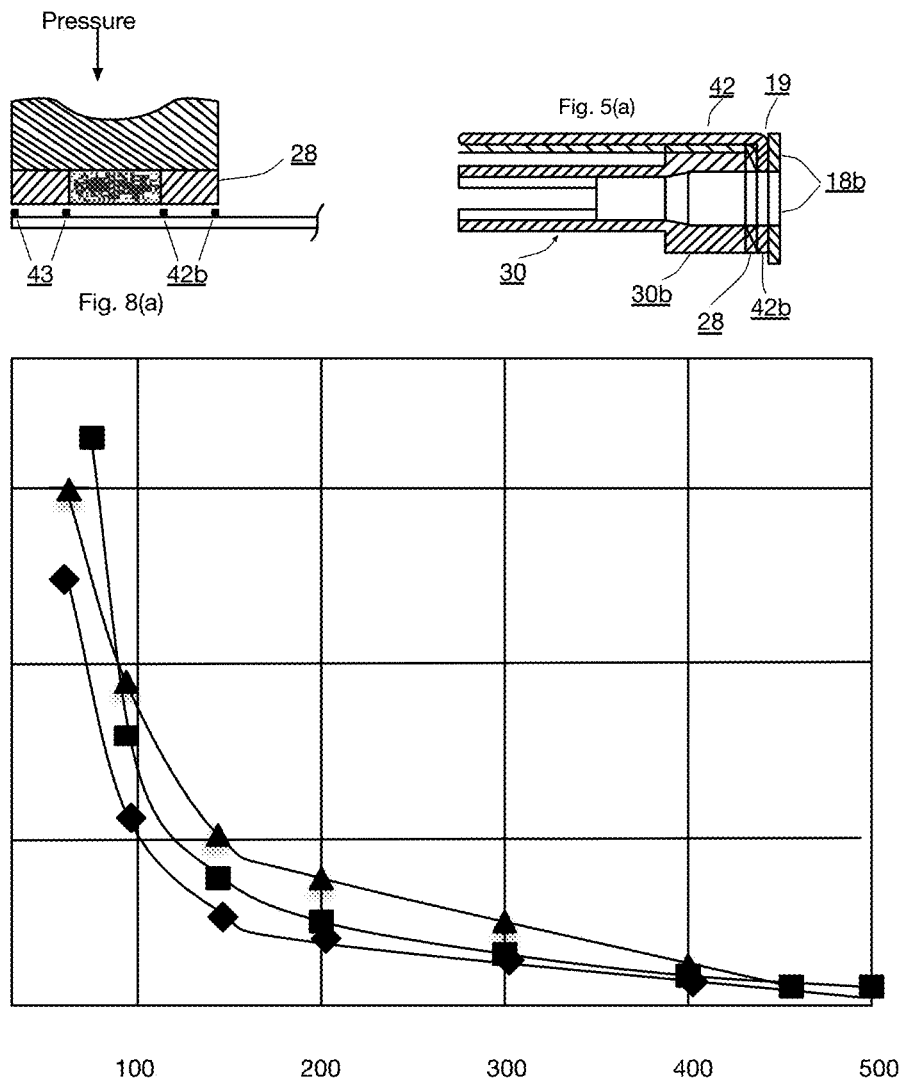
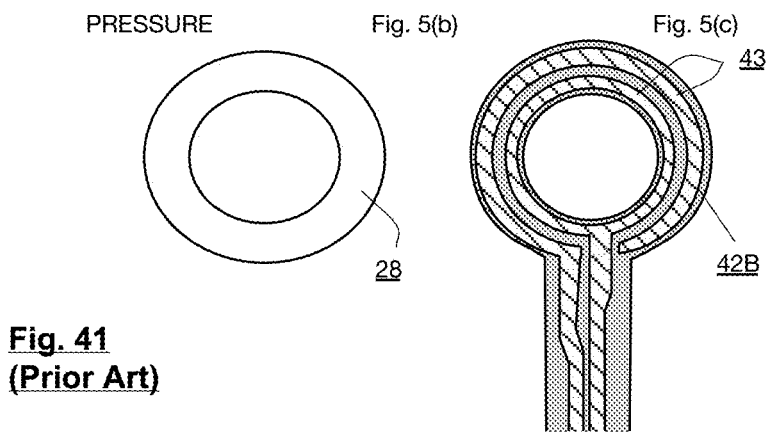
**Fig. 41
(Prior Art)**

PEN SYSTEM WITH INTERNAL PRESSURE TILT ROTATION

CROSS REFERENCE TO RELATED APPLICATIONS

The present U.S. Utility patent application claims priority pursuant to 35 U.S.C. § 120 as a continuation of U.S. Utility application Ser. No. 16/672,725, entitled "PEN SYSTEM WITH INTERNAL PRESSURE TILT ROTATION," filed Nov. 4, 2019, which is a continuation of U.S. Utility application Ser. No. 16/399,336, entitled "PEN SYSTEM WITH INTERNAL PRESSURE TILT ROTATION," filed Apr. 30, 2019, now U.S. Pat. No. 10,514,783, issued on Dec. 24, 2019, claims priority pursuant to 35 U.S.C. § 120 as a continuation of U.S. Utility application Ser. No. 15/506,137, entitled "PEN SYSTEM WITH INTERNAL PRESSURE TILT ROTATION," filed Feb. 23, 2017, now U.S. Pat. No. 10,296,108, issued on May 21, 2019, which is a U.S. National Stage Application submitted pursuant to 35 U.S.C. § 371 of Patent Cooperation Treaty Application No. PCT/US2016/041070, entitled "PEN SYSTEM WITH INTERNAL PRESSURE TILT ROTATION," filed Jul. 6, 2016, which claims priority pursuant to 35 U.S.C. § 119(e) to U.S. Provisional Application No. 62/189,161, entitled "PEN SYSTEM WITH INTERNAL PRESSURE TILT ROTATION," filed Jul. 6, 2015, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

The invention relates in general to an improved electronic pen measurement system.

Description of Related Art

Concerning circuits that sense analog signals, Sigma-Delta Analog to Digital Converters (ΣΔADC) have been known some time for performing simple analog to digital conversion, but have recently become very popular as programmable logic clock speeds have improved to the point where very good conversion function is possible. Many new ideas and work centered on improving these converters speed and functionality has been in an effort to allow this more digital conversion method to replace the more standard analog techniques. In the touch realm many improvement patents have been granted around incorporation of known capacitive sampling techniques and Delta Sigma conversion of analog to digital.

U.S. Pat. No. 8,089,289 has an example of prior art technology using a Delta Sigma Converter and showing mutual capacitive scheme using square wave drive and switched capacitor function with rectification in two embodiment drawings of the same function, as shown in FIG. 20.

U.S. Pat. No. 7,528,755 shows an example of prior art technology using a Delta Sigma Converter and showing scheme capable of signal drive or measure technique selectable via a mux as shown in FIG. 21.

U.S. Pat. No. 8,547,114 shows an example of prior art technology using a Delta Sigma Converter and switched capacitor techniques as shown in FIG. 22.

U.S. Pat. No. 8,587,535 shows an example of a prior art strategy, this state of the art mutual capacitance multi-touch system with simultaneous digital square wave patterned transmission and simultaneous receive with synchronous demodulation and pen capable, as shown in FIG. 23. This system does not allow multi-mode concurrent touchscreen sampling, does not have true simultaneous sampling due to each row using a different bit pattern which effectively scrambles the noise distribution on receipt, is not capable of self-capacitance measurements, and due to the use of square wave drive has a receive signal spectrum that contains the primary frequency as well as its harmonics which necessitate lower trace impedance to prevent attenuation of the higher harmonics across the panel.

Therefore, a need exists for a much faster sampling method that can acquire data simultaneously for different modes of, for example, self, mutual, and pen, and with simultaneous sampling of the different channels.

Also, in some applications, to reduce the sample time via signal to noise ratio improvement where possible, continuous sampling schemes and advanced filter methods, modulation and demodulation schemes, and digital domain methods are needed. To keep the cost and power usage as low as possible the circuitry should be as much in the digital realm as possible.

Finally, many different touch sensors are now available that work through the measurement of changes to impedance, and providing a system that can handle multiple sensor types and configurations, including those currently known and those to be developed in the future, is also greatly desired.

Concerning electronic pens, pressure, tilt, and barrel rotation are a part of writing and inking characteristics and even children are aware of the differences to a resultant pencil or crayon line characteristics caused by these three different manipulations of a writing instrument.

Digitizing pens in the electromagnetic and electrostatic realm typically include a method of measuring and transmitting the tip pressure to the receiving system. The receiving system may include durable glass providing high optical transparency for viewing images displayed by an underlying display device that displays images such as graphical buttons and icons or an opaque system. When a user writes, for example with a pen, on the outer surface of the substrate on the display device, the pen sends a signal that the receiving system interprets and resolves to a location determined by sensing amplitude differences between the receiving system electrodes, and through modulation or pulse timing the pressure value is transmitted using the same signal frequency as the location signal.

U.S. Pat. No. 5,633,471A shows an example of prior art technology using a pressure sensor disk to measure the pressure transmitted through the pen tip as shown in FIG. 41.

Pressure has typically been measured internal to the pen body with a single motion axis sensor measuring changes to resistance, capacitance, inductance, or light intensity. These solutions typically work through a motion of a rod mechanism transmitting axial force from the tip of the pen to the sensor mechanism. As seen from the above drawing the result versus pressure curve is non-linear. The disadvantage to the aforementioned solutions is the drop in transmitted force to the sensor as the pen is tilted towards the surface.

Tilt determination is very important to prior and state of the art electromagnetic and electrostatic pen systems. In a typical system the pressure signal decreases as the tilt increases by the cosine of the tilt angle. Without a method of measuring the tilt angle the pressure determination becomes more and more unsure.

U.S. Pat. No. 5,414,227 shows an example of tilt and orientation using a plural set of continuous ring electrodes for transmit and receive as shown in FIG. 42.

In some pen systems the tilt and orientation of the pen are determined through two electrodes, the primary location electrode and a secondary vertically displaced electrode. At some angle of tilt the two received signals show orientation and tilt.

In some pen systems the tilt and rotation position of the pen barrel are determined through extra signal producing transmitters around the tip main transmitter. These transmitters inject a signal relative to the electrode position and the proximity of the sensor and the relative energy distribution of the said energy to the rows and columns.

U.S. Pat. No. 8,963,88982 shows an example of tilt and rotation using the tip and an extra single or broken ring electrode elements as shown in FIG. 43.

U.S. Pat. No. 8,638,320 B2 shows an example of tilt and rotation using the shape of the tip or tip and extra broken ring electrode elements as shown in FIG. 44.

Distance from the detecting surface greatly reduces the capacitance coupling energy of a shaped electrode or separate electrodes. If alternate frequencies or digital bit patterns are used these methods can be effective but have some limitations. For example, a shaped electrode does not show rotation orientation and even at angles less than 45 deg from the perpendicular the detection shape will not have enough information for an accurate tilt.

Using multiple electrodes solves the perpendicular rotation orientation and tilt angle resolution at low perpendicular angles through increased pen and system complexity but at higher angles only a single separate electrode will present to the surface of the sensor and so at higher angles barrel rotation resolution will be low but tilt angle is improved. Pressure and tilt have good resolution at 45 deg but at the pen barrel becomes flatter to the surface plane the pressure resolution drops.

FIG. 37 A diagram showing the multi electrode solution broken ring solution resolutions at different pen angles and also showing the multi electrode continuous ring solution resolutions at different pen angles.

Even in state of the art solutions FIG. 44 using a broken ring electrode solution the pressure and barrel rotation resolutions drop at low angles to the plain.

Pressure and tilt on these prior art systems is heavily linked but the values are produced through very different and separate mechanisms with different resolutions, noise characteristics, and group delays.

"Hover" is the ability of digitizing pens to interact with the system without touching the surface. Surface contact typically indicating an inking or clicking action. Electromagnetic (EMR) and electrostatic (ES) systems by default work without direct contact to the electrodes. EMR and ES pen systems generally have the hover capability for which distance from the surface is limited mostly due to signal to noise considerations. While ES systems hover's location is good, orientation, tilt, and barrel rotation has not generally been usable due to poor signal resolutions.

"Motion Detection" is the ability for a device to, at a minimum, determine if it has been moved. A simple motion detection can be useful on a digitizer pen as a low power to high power mode. Advanced schemes exist to measure this such as micro machined cantilever beam accelerometers or such. These systems have been reduced to small size, work well, and have much reduced cost but are still system cost adders.

"Proximity Detection" is the ability for the device to determine if it has been picked up, set down, or if it is close to the touch surface. This would typically be a self-capacitance measurement on grounded systems but generally would be measured through multiple electrodes and a mutual capacitance measurement.

"Ground System" in pen systems the ground path is often neglected and assumed low impedance which is definitely not the case. Any current transmitted through the pen tip primary electrode or secondary electrodes to a receiving system must also pass through the barrel of the pen, the users body, the air space surrounding the user or through the floor and finally to the system which may also be floating and so only the small capacitance between the user and the device containing the receiving system may be present. These paths represent variable impedances Therefore, a need exists for a method of improved pressure, tilt, barrel rotation for normal and extended pen angles generated from a single system of internal measurements as well as other capabilities such as proximity, switch detection, slider, and high resolution touch zone sensing.

SUMMARY

The invention relates in general to an improved pen pressure measurement system capable of pressure, tilt, and barrel rotation among other solutions to prevalent problems in the touchscreen pen realm. Whereas the prior art typically uses a single point pressure sensor or an optical sensor, some embodiments of the present invention use multiple, typically 4 sensors (which can be four segments of one device), such as capacitive sensors, pressure sensitive resistors, or stress sensors. The four sensors can measure axial displacement, which corresponds to the pressure with which the tip is pressed against a surface, and/or lateral displacement, which corresponds to tilt and/or rotation of the tip. In preferred embodiment, the multiple sensors can measure displacement in x, y, and z, whereas typical prior art pen sensors measure displacement in Z only.

Accordingly, an object of some embodiments of the present invention is to provide a system directed to a digital realm pen and positioning system with enhanced function in the determination and transmission of pressure, tilt, and barrel rotation.

The present invention in some embodiments implements a "Nib Collet Pivot Mechanism" (NCPM) coupled to a multi-axis strain sensor, pressure sensor, or electrostatic multi-element electrode configuration. Further, the NCPM can be designed to transfer force applied to the tip of the nib to the internal multi-axis strain or pressure sensor, or with applied force change the spacing between the NCPM and the electrostatic multi-element electrode configuration with minimal nib movement. In some embodiments the NCPM is constructed with a back pivot to equalize the force distribution of pressure applied to the tip so that lateral force is measurable and distributed in a positive and negative manner. Further, in some embodiments the NCPM is preloaded with pressure via compression or tension to move the response of the multi-axis sensors into the middle linear region of their respective ranges. The preferred embodiment of the NCPM uses the electrostatic multi-element electrode configuration, is preloaded with pressure via compression, and is constructed with a back pivot.

According to some aspects of the invention, channel drivers and capacitive sensing mechanisms are provided as disclosed in PCT patent application PCT/US16/38497, Jun. 21, 2016, entitled "Multi-Touch Sensor and Electrostatic Pen Digitizing System Utilizing Simultaneous Functions for Improved Performance," employed with the pen electrodes to read distance changes between the NCPM and the broken electrode ring elements to a high degree of precision in order to generate multi axis measurements for internal pressure, tilt, and barrel rotation while simultaneously preforming other signal functions such as primary location signal emission, orientation, tilt, and rotation via secondary signal emissions, also while digital transmission or reception occur through known modulation techniques of the primary or secondary signals or radio transmission.

Further, the pen device and driver scheme which is very well suited towards small capacitive measurement changes can be used to implement usable features such as switches, sliders, proximity detection, high resolution touch surfaces, etc.

Further, systems herein may be capable of transmitting the data through modulation schemes or via radio transmissions.

Further, a NCPM that can be implemented into multiple types of digitizer systems such as electrostatic, electromagnetic, or passive electrostatic to add pressure, tilt, and barrel rotation measurement functions.

According to some aspects, systems that use a conductive NCPM along with a secondary continuous ring or broken ring electrode system can overcome low resolution operating conditions such as pressure for lateral force applied to the nib tip or perpendicular barrel rotation.

In one aspect of the invention, an electronic pen apparatus is provided with a pressure sensitive tip mechanism including a pivoting nib collet mechanism with a primary electrode element holding a nib and arranged to elastically pivot inside a space formed enclosed by multiple secondary electrodes. The secondary electrodes are arranged at different locations around the primary electrode such that gaps are formed between each respective secondary electrode and the primary electrode. A first drive/receive circuit is electrically connected to the primary electrode and configured to drive a primary analog electrode signal onto the primary electrode. Second drive/receive circuits are connected to the secondary electrodes, each configured to transmit a secondary analog electrode signals and simultaneously sense the primary analog electrode signal coupled across the gaps.

In some embodiments, the second drive/receive circuits are each configured to transmit a different secondary analog sensor signal on each of the secondary electrodes. The different secondary analog sensor signals may each comprise different frequencies from the other secondary analog sensor signals. Some version have a rear elastic buffer receiving a rear end of the pivoting nib collet mechanism constructed to elastically deform to allow limited axial movement of the pivoting nib collet mechanism. An additional z-axis electrode may be provided on the other side of the rear elastic buffer in some versions, to measure z-axis (longitudinal) movement of the primary electrode.

In other embodiments, the longitudinal movement is sensed through movement of the primary electrode relative to the secondary electrodes, using a processing circuitry operably coupled to the first and second drive receive circuits and operable to sense total contact pressure on the pen nib by sensing and recognizing changes in the gaps between the primary electrode and the secondary electrodes. The primary electrode element may be tapered from front to rear, and in which the secondary electrodes are arranged such that the gaps are generally uniform when the pivoting nib collet mechanism is not in a pivoted condition.

In some embodiments, the first drive/receive circuit is also operable to, simultaneously to driving the first analog electrode signal, sense an external signal coupled into the primary electrode from an external touchscreen or pad. An external touch sensor may be included in some embodiments, with a touch sensor array and a plurality of row and column drive/receive circuits coupled to respective rows and columns of the touch sensor array, the row and column drive/receive circuits operable to simultaneously sense touch sensor analog sensor signals on the touch sensor array and the primary analog electrode signal coupled from the pen to the touch sensor. The row and column drive receive/circuits may be further operable to simultaneously sense the secondary analog electrode signals coupled from the pen to the touch sensor.

In preferred versions, the row and column drive/receive circuits of the external touch sensor further are constructed with a voltage-following sigma-delta A/D converter combined with a sigma-delta D/A converter having a sigma-delta output filter for driving the row or column electrode, the voltage-following A/D converter connected to follow a reference signal on a first reference comparator input by producing a feedback output at a virtual signal node on a second comparator input, the sigma-delta output filter also connected to the virtual signal node. Drive signal generation circuitry is coupled to the reference comparator input of the drive/receive circuit, and operates to generate a mutual analog sensor signal at one or more first frequencies. The drive/receive circuit of these versions is operable in a first mode to drive a mutual signal to the electrode, and operable in a second mode to sense said mutual signal from the electrode, and the drive signal generation circuitry is further operable in both modes to simultaneously sense the primary analog electrode signal at one or more pen frequencies different from the first frequencies.

In some embodiments, the first and second drive receive circuit of the pen each are implemented with a voltage-following sigma-delta A/D converter combined with a sigma-delta D/A converter having a sigma-delta output filter for driving their respective electrode, the voltage-following A/D converter connected to follow a reference signal on a first reference comparator input by producing a feedback output at a virtual signal node on a second comparator input, the sigma-delta output filter also connected to the virtual signal node. Drive signal generation circuitry is coupled to the reference comparator input of each drive/receive circuit, and operable to generate the primary analog electrode signal at one or more pen frequencies for the first drive receive circuit, and to generate the secondary analog signals at one or more different pen frequencies for the each of the secondary electrodes.

In preferred embodiments, the drive/receive circuits of the pen primary and secondary electrodes are constructed similarly to the drive receive circuits described herein for the touch sensor row and column electrodes, and can be implemented with any of the various drive/receive circuit variations described, with various pen counts and use of digital I/O pins. That is, such versions employ the same voltage-following sigma-delta A/D converter design able to drive and sense multiple frequencies simultaneously to and from the electrode. Other implementations may employ an analog op-amp voltage following circuit for the pen electrode drive/receive circuits, or any other suitable circuit capable of driving and receiving the relevant signals simultaneously. The pin count, size, and cost reduction achieved by the preferred drive/receive circuits is not as important in the pen because fewer electrodes are driven.

In some embodiments, the pivoting nib collet mechanism includes a front elastic buffer holding a front end of the pivoting nib collet mechanism and constructed to elastically deform to allow limited pivoting and axial movement of the pivoting nib collet mechanism. In some versions, the gaps between the primary and secondary electrodes may be air gaps, or they may be filled with a flexible dielectric or insulator. In a preferred version, four secondary electrodes are used in the pivoting nib collet mechanism, spaced at equal angles around the circumference of the primary electrode, whose axial direction is aligned with the pen axis. In other versions, more secondary electrodes may be used, such as 5, 6, 7, 8 or more, for example. Preferably the electrodes are at the same longitudinal position and spaced at equal angles around the circumference of the primary electrode.

In some aspects of the invention, the tilt and direction of the pen primary electrode, connected to the pen nib, may be measured by sensing signals coupled from the secondary electrodes into the primary electrodes. Because the coupling path is the same whether coupling into or out of the primary electrode, similar measurement accuracy is provided. In these versions, the primary electrode's drive receive circuitry is configured to simultaneously receive and demodulate separate signals on different frequencies from each of the secondary electrodes.

According to some aspects of the invention, a pivoting nib collet mechanism is provided which, instead of opposing primary and secondary electrodes which capacitively couple signals across a gap, employs other types of pressure sensors such as pressure sensitive resistors, stress sensors, or other suitable pressure sensors. In such an embodiment, the multiple secondary electrodes are replaced with multiple pressure sensors coupled to a central pivoting body around its perimeter. Pivot angle and direction are determined from these sensors. The primary electrode is electrically connected to the center, and multiple secondary electrodes are provided radially outward from the pressure sensors in order to capacitively couple the primary and secondary electrode signals to the external touch sensor.

According to another aspect of the invention, a method is provided for sensing multiple attributes of an electronic pen tip. The method includes driving a primary pen electrode, connected to a pen nib projecting from the pen tip, with a primary analog electrode signal. The method allows the primary pen electrode to elastically pivot with respect to multiple secondary pen electrodes arranged at different locations around the circumference of the primary pen electrode. While driving the primary electrode signal, the method senses the primary analog electrode signal on each of the secondary pen electrodes. It then interprets the signal levels of the sensed primary analog electrode signals on the secondary electrodes to estimate a pivot angle of the pen nib. It also interprets the signal levels of the sensed primary analog electrode signals on the secondary electrodes to estimate a pivot direction of the pen nib. It may further interpret the signal levels to measure a total contact pressure or displacement of the pen nib. Because these signals are sensed on the pen, the interpretation may be performed in processing circuitry on the pen, or data may be transmitted to a paired device such as a touch sensor, and the interpretation of the received signal levels performed there.

In some embodiments, while driving the primary analog electrode signal onto the primary electrode, the methods senses the location of the electronic pen tip on a touch sensor by sensing the primary analog electrode signal on at least one row electrode and at least one column electrode of the touch sensor. It may also drive the multiple secondary pen electrodes with a different secondary analog electrode signal for each secondary electrode.

In some embodiments, simultaneously to driving the primary electrode with its signal, the method senses the orientation of the electronic pen tip relative to the touch sensor by sensing one or more of the secondary analog electrode signals on the touch sensor. In some embodiments simultaneously to driving the primary electrode with its signal, the method, sensing barrel rotation of the pen tip relative to the touchscreen over time by sensing changes in magnitude of two or more of the secondary analog electrode signals on the touch sensor.

In some embodiments, the method may employ at least four secondary pen electrodes driven with secondary analog electrode signals on at least four different frequencies. The method may also, simultaneously to driving the primary electrode with its signal, measuring a total contact pressure on the pen nib by sensing and recognizing a changes in respective gaps between the primary pen electrode and the respective secondary pen electrodes. The method may also, simultaneously to driving the primary electrode with its signal, sense an external analog signal coupled into the primary electrode from an external touch sensor or pad.

In various aspects, methods of the present invention may operate with voltage following sigma-delta A/D converters as described herein to simultaneously drive and receive signals on the same electrode. Some methods may drive a pen signal at a pen frequency onto the pen primary electrode, and receive on that electrode a touch sensor signal coupled into the pen from contact with a touch sensor. Some methods may drive secondary pen electrodes with secondary analog signals at different frequencies that the primary analog signals, and receive these signals after they are coupled into a touch sensor through capacitive coupling, while simultaneously receiving touch sensor signals on the same electrodes. Such methods may receive such coupled signals from the primary pen electrode and one or more of the secondary pen electrodes in order to sense rotation of the pen tip, all these signals received on different frequencies simultaneously on the same touch sensor row or column electrodes to which they are coupled. In other aspects of the invention, the method senses pivot angle, pivot direction, and possibly total contact pressure with more conventional pressure sensors arranged around a pivoting nib collet mechanism. Some of these methods also drive a primary pen electrode connected to the pen nib with an analog pen electrode signal for coupling into a touch sensor, and receive it there simultaneously with various touch sensor signals described herein.

According to another aspect of the invention, a pen and touchscreen system for simultaneously measuring touch and pen inputs on a touch sensor. The system includes multiple drive/receive circuits each adapted to be coupled to a single row or column electrodes of the touch sensor, each drive/receive circuit operable in to drive at least one touch sensor analog signal to its respective electrode on at least one or more touch sensor frequencies, and further operable to simultaneously sense a pen primary analog electrode signal coupled into the respective electrode at one or more pen frequencies different from the touch sensor frequencies. The system also includes an electronic pen including a pivoting nib collet mechanism with a primary electrode element holding a nib and arranged to elastically pivot inside a space formed enclosed by multiple secondary electrodes. The secondary electrodes arranged at different locations around the circumference of the primary electrode such that gaps are formed between each respective secondary electrode and the primary electrode. A first pen drive/receive circuit is electrically connected to the primary electrode and configured to drive the pen primary analog electrode signal onto the primary electrode, and second pen drive/receive circuits are connected to the secondary electrodes, each configured to transmit a secondary analog electrode signals and simultaneously sense the pen primary analog electrode signal coupled across the gaps. Other aspects may instead sense individual secondary electrode signals on the primary electrode instead, because the capacitive coupling path is similar for either direction.

In some embodiments, the system further includes a touch sensor coupled to the multiple drive receive circuits, while in others the pen tip circuitry and the touch sensor circuitry may be sold without the touch sensor itself, or the body of the pen itself, to be installed on suitable pens and touch sensor devices. In some embodiments, the system also includes an electronic device housing the touch sensor.

In some embodiments, the pen further comprises processing circuitry operably coupled to the first and second drive receive circuits and operable to sense total contact pressure on the pen nib by sensing change in the gaps between the primary and secondary electrodes. It may also extract an estimate of longitudinal (z-axis) pressure on the pen nib by sensing and recognizing a common change in the gaps between the primary electrode and the secondary electrodes.

Each of the multiple touch sensor drive/receive circuits may be operable in a first mode to drive a mutual analog sensor signal to its respective electrode at one or more first frequencies of the touch sensor frequencies, and operable in a second mode to sense said mutual analog sensor signal from the electrode, and the drive signal generation circuitry may further be operable in both the first and second mode to simultaneously sense the pen primary analog electrode signal at one or more pen frequencies different from the first frequencies. Each of the multiple touch sensor drive/receive circuits may further be operable in the first mode or the second mode, or both, to simultaneously generate a self analog sensor signal at one or more second frequencies of the touch sensor frequencies, different from the first frequencies, and to simultaneously sense said self analog sensor signal.

In some embodiments, each of the multiple touch sensor drive/receive circuits may further be implemented with a voltage-following sigma-delta A/D converter combined with a sigma-delta D/A converter having a sigma-delta output filter for driving the row or column electrode, the voltage-following A/D converter connected to follow a reference signal on a first reference comparator input by producing a feedback output at a virtual signal node on a second comparator input, the sigma-delta output filter also connected to the virtual signal node; further comprising drive signal generation circuitry coupled to the reference comparator input of the drive/receive circuit, operable to generate the mutual analog sensor signal at the one or more first frequencies. Digital filter circuitry and demodulation circuitry may be coupled to respective ones of the multiple drive/receive circuits and operable to separate and filter the simultaneously sensed pen analog sensor signal from the respective signals on the touch sensor frequencies.

In view of the foregoing, some aspects of the present invention provide a digitizing pen with internal improved pressure and barrel rotation sensitivity and resolution at low angles to the plane of the receiving pen digitizer system and improved tilt resolution at all angles through use of multi-axis sensor to improve the accuracy of the resultant coordinate position returned to more closely match the position of the contact point of the nib tip through improved ability to calculate offsets and to improve the general writing experience, drawing, and simulation of artistic tools and media such as square chalk, leaded pencils, brushes, and edged/spatula instruments.

Some embodiments use the disclosed pressure mechanism with radio-type transmission capability to allow a relative motion digitizing mode where the pen can act independently of the receiving touch system to direct cursor movement.

According to some aspects of the invention, a pen system is provided that generates pressure, tilt, and rotation information through the use of a multi-axis strain, pressure, or capacitive electrode element configuration and methods of measurement calibration and signal transmission. Some embodiments may have a multi-axis tip sensing capable of pressure, tilt, and barrel rotation where the primary electrode element's pivot mechanism is made conductive and acts as the primary location electrode for the purpose of coupling to and from a receiving system and enabling measurement of the device location. A secondary set of surrounding electrodes are may be formed for the purpose of coupling to and from a receiving system and enabling measurement of the device orientation and tilt. Such surrounding electrodes may send a single signal to the plural secondary electrode elements enabling receiving system measurement of the device orientation and tilt. The surrounding electrodes can send separate signals to the plural secondary electrode elements for the purpose of coupling to and enabling receiving system measurement of the device orientation, tilt, and rotation. In some versions, some or all of the electrode elements are part of a flex circuit with connection scheme or can be connected via compression contact to measurement and processing circuitry with a flex electrode.

In some embodiments, the pen system includes a signal generation, conditioning, and measurement system for the continuous simultaneous production and measurement of changes to signals on the multi-axis strain or pressure sensor. The primary electrode element pivot mechanism may be made conductive and act as the primary location electrode, with a secondary set of surrounding electrodes coupling to the primary electrode and changes in capacitance between electrodes being measured internally to determine the devices multi-axis pressure, tilt, and barrel rotation. Such a system may include a signal generation, conditioning, and measurement system for the continuous simultaneous production and measurement of changes to signals on the primary and secondary electrode elements for the purpose of coupling and communicating to and from touch system as well as measurement of internal sensor capacitance change.

In another aspect, all or some the electrodes in the pen may be driven with a small high frequency signal with dither. This is the same type of signal as the self-capacitance signal on the multi-touch system and functions in the same manner to effect a continuous self-capacitance signal which is transmitted simultaneously with the other electrode signals, and can be measured simultaneously. This feature is helpful to overcome the internal hysteresis of the channel driver. This signal may be used to measure proximity to other surfaces or the users touch.

The pen system may be capable of transmitting data generated on the pen through field modulation or radio type transmission.

In another aspect, a pen system is provided with multi-axis pressure, tilt, and rotation mechanism capable of relative motion data generation on a non-touch digitizing surface and transmission through a radio type transmission to act independently as a relative position generation device.

In yet another aspect, a pen system is provided with multi-mode functionality capable of absolute electrostatic digitizing position via emitted field energy interaction with an enabled receiving system such as a touchscreen device, or relative motion data generation on a non-enabled surface and transmission through a radio type transmission to act independently as a relative position generation device.

Various versions may include a similar multi-axis tip assembly for performing alternate functions at an opposite end of the positioning systems barrel with relative X,Y,Z functions for user interaction with the receiving system.

In another aspect of the invention, a pen system is provided using drive channels and methods, to drive the described electrode elements in the pen device, as covered by co-pending and co-owned PCT patent application PCT/US16/38497, filed Jun. 21, 2016, and entitled "MultiTouch Sensor and Electrostatic Pen Digitizing System Utilizing Simultaneous Functions for Improved Performance."

These together with other objects and advantages which will become subsequently apparent reside in the details of construction and operation as more fully hereinafter described and claimed, reference being had to the accompanying drawings forming a part hereof, wherein like numerals refer to like parts throughout. Different applications have different requirements so not all embodiments meet all of the objects or provide all of the advantages described above.

BRIEF DESCRIPTION OF THE DRAWINGS

FIG. 2 is a supporting legend for FIGS. 2-6 and FIGS. 15-16 describing signaling schemes that may be employed in various embodiments herein.

FIGS. 20-23 show prior art circuits discussed in the background.

FIG. 31 is a diagram showing an example of electrostatic capacitive electrodes and internal and external signal interaction for FIGS. 25 and 26.

FIG. 40 is a prior art diagram showing a two axis four sensor strain gauge assembly.

FIGS. 41-44 show prior art circuits discussed in the background.

DETAILED DESCRIPTION OF EXAMPLE EMBODIMENTS

Novel features believed to be characteristic of the various inventions, together with further advantages thereof, will be better understood from the following description considered in connection with the accompanying drawings in which preferred embodiments of the present invention is illustrated by way of example. It is to be expressly understood, however, that the drawings are for the purpose of illustration and description only and are not intended to define the limits of the invention.

Provided herein are electronic pen designs, methods, and systems for improved pressure, tilt, barrel rotation for normal and extended pen angles generated from a single system of internal measurements as well as other capabilities such as proximity, switch detection, slider, and high resolution touch zone sensing. Many of the schemes herein are capable of interacting with and supplementing the complementary systems described in co-pending and co-owned PCT patent application PCT/US16/38497, Jun. 21, 2016, entitled "Multi-Touch Sensor and Electrostatic Pen Digitizing System Utilizing Simultaneous Functions for Improved Performance" and taking advantage of advanced modes of sampling and noise rejection to bring the full spectrum of pen functionality to the consumer market. Much of the disclosure from this co-pending and co-owned patent application is provided herein to illustrate its application to the pen and pen/touch systems herein.

Touch Sensor Techniques with Improved Drive, Sense, and Pen Receive Capability

Figure 1:
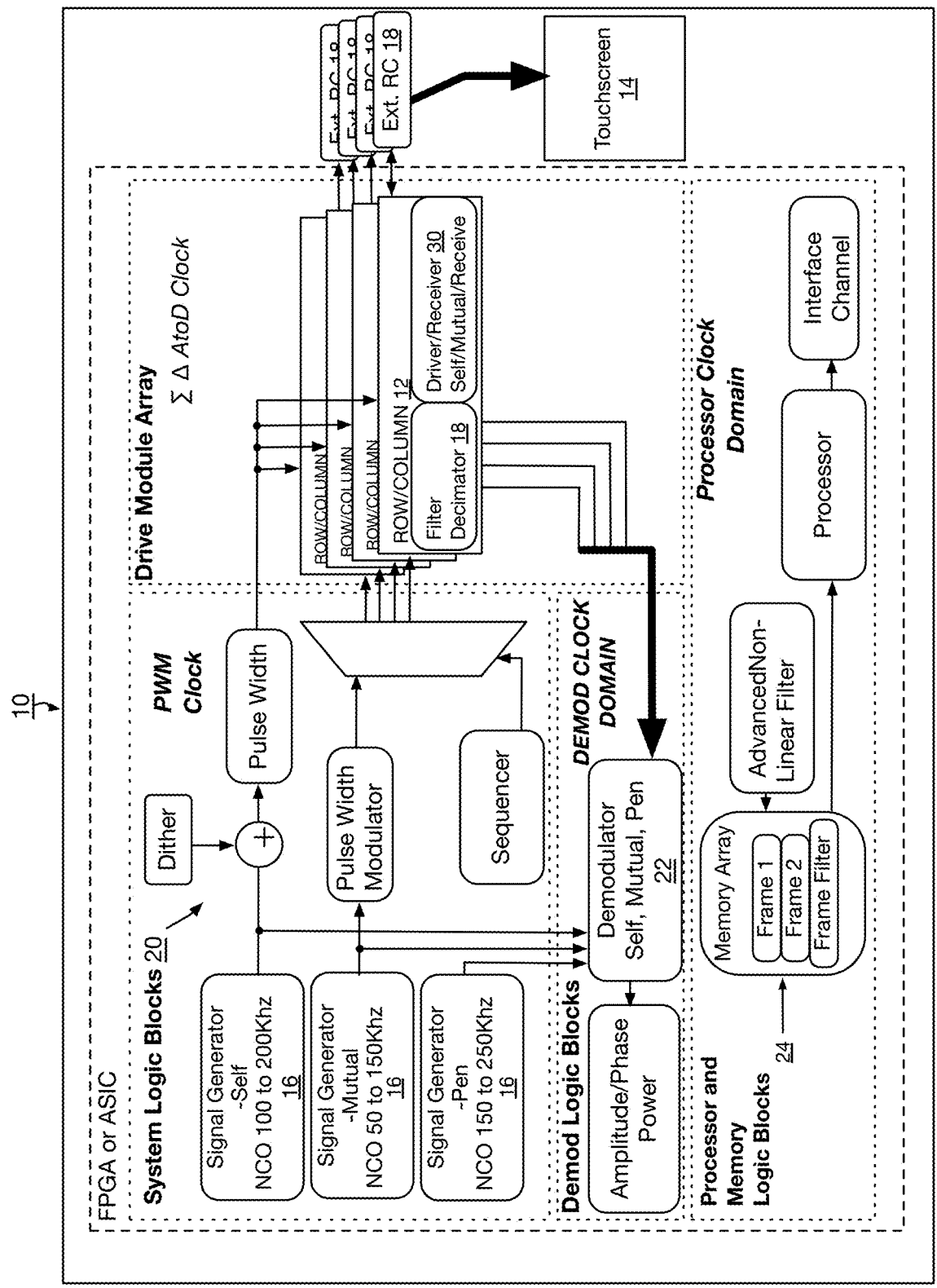
FIG. 1 shows a multi-touch pen enabled receiving system capable of performing the touch sensor portions of the pen signaling and sensing schemes described herein.

FIG. 1 is a block diagram of an embodiment of a touchscreen control system including touchscreen drive and receive circuitry 10 constructed with flexible programmable logic embedded in a semiconductor device which may be a touchscreen controller chip, or may be integrated into a larger system on chip arrangement with other system functionality as well. Typically, the circuitry appears in touchscreen or other touch sensor controller circuitry. The circuitry 10 transmits and receives simultaneously on a plurality of channels 12 to drive analog sensor signals through channel drivers 30 to the electrodes of a multi-touch sensor 14. The electrodes typically include row and column electrodes arranged in a grid, but may include other non-symmetrical arrangements of electrodes, multiple grids, or other suitable arrangements of electrodes that can cross-couple signals in response to touch or proximity. The analog sensor signals are driven at a plurality of simultaneous frequencies 16 in accordance with some embodiments of the present invention. While four channel drivers are shown in the drawing, this is to illustrate a plurality, and the preferred versions will have as many channels as there are touchscreen electrodes (rows and columns), with repeated instantiations of the drive module, including drive circuitry and receiving filters, for each channel. The diagram generally shows the digital clock domains and there functionality, the Drive Module Array, the System Logic Blocks, the Demod Logic Blocks, and the Processor and Memory Logic Blocks. The processor also includes program memory for storing executable program code to control and direct the various digital logic and digital signal processing functions described herein.

As can be seen in the diagram of FIG. 1, the system touchscreen driver and sensor circuitry can be embodied in an FPGA or ASIC. Some embodiments provide a multitouch system FIG. 1 with flexible configuration. Some embodiments provide a multi-touch system capable of operating almost exclusively in the digital realm, as described below, meaning that an FPGA or other reconfigurable or programmable logic device (PLD) may be employed to construct almost the entire circuit, without the need for op amps or other active external analog components, beyond the driver circuitry included in the FPGA or PLD. External resistors and capacitors 18 are all that are needed to supplement the digital I/O circuits of an FPGA to achieve the channel drive/receive circuits in preferred embodiments. This is because of the unique use of sigma-delta converter combinations that allow the digital I/O pins to act in a way similar to analog sensor drivers. Some embodiments provide system implementation and operation in programmable logic or custom silicon.

The other parts of the system block diagram of FIG. 1 include, generally, the lowpass filter/decimator block 18 that filters the incoming sensed signals, the system logic blocks 20, the demodulation logic blocks 22, and the processor and memory logic blocks 24, which will all be further described below. Most of the benefits of the improved touch sensor driving circuitry and control schemes come from the design of the drive/receive circuit itself, and the use of it to drive and receive different types of signals in a flexible and reconfigurable manner. Preferably the drive/receive circuitry driving the various touch sensor electrode channels is embodied in a digital device and drives and receives signals using digital I/O drivers and receivers, but in some versions analog amplifiers or other analog components may be employed with the signaling schemes described herein. This design may be referred to herein as a "digital channel driver 30", "channel driver 30," and "drive/receive circuit 30." Several variations of the channel driver will be described below, followed by a description of several unique and beneficial signaling and measurement schemes that advance the ability to accurately measure touch on many types of touch sensors.

The Digital Channel Driver:

Some embodiments of the invention use digital channel driver hardware and a single pole RC filter capable of transmitting and receiving a multitude of frequencies into a variable impedance sensor where changes to the impedance can be resolved on the digital side of the driver to determine the relative change in impedance from each sensor electrode.

Such impedance changes may manifest in several ways. A change of capacitance in a floating sensor system, when driven by a sine wave, will present as a phase change. A change in resistance in a floating sensor system will also cause a phase change, finally a resistance load change in a resistive sensor system will cause a DC offset change. These changes are changes between the generated reference signal (AC and/or DC) and the generated analog feedback signal which is an averaged representation of the digital stream of "higher/lower" signals from the 1-bit ADC.

Some embodiments employ said channel drivers to interface to multiple types of sensors such as projected capacitance touchscreens, resistive touchscreens, pressure sensitive touchscreens, strain-gauge array touchscreens, etc.

Some embodiments of the invention use said channel drivers in a parallel manner to drive touchscreens 14 or other touch sensor arrays with signal combinations allowing multiple mode simultaneous touchscreen sampling (self, mutual, and receive). Such ability requires the channel driver to be capable of a minimum of transmitting a single continuous frequency (self), transmitting an intermittent frequency (mutual TX), receiving a frequency (mutual RX), and receiving pen frequencies all through a single Delta Sigma Driver at the same instance and also handling the filter, decimation, and demodulation. Typically, these signals are generated and mixed, or generated directly, or generated and channeled, then sent into the reference of the Sigma Delta 1-bit ADC.

Figure 19:
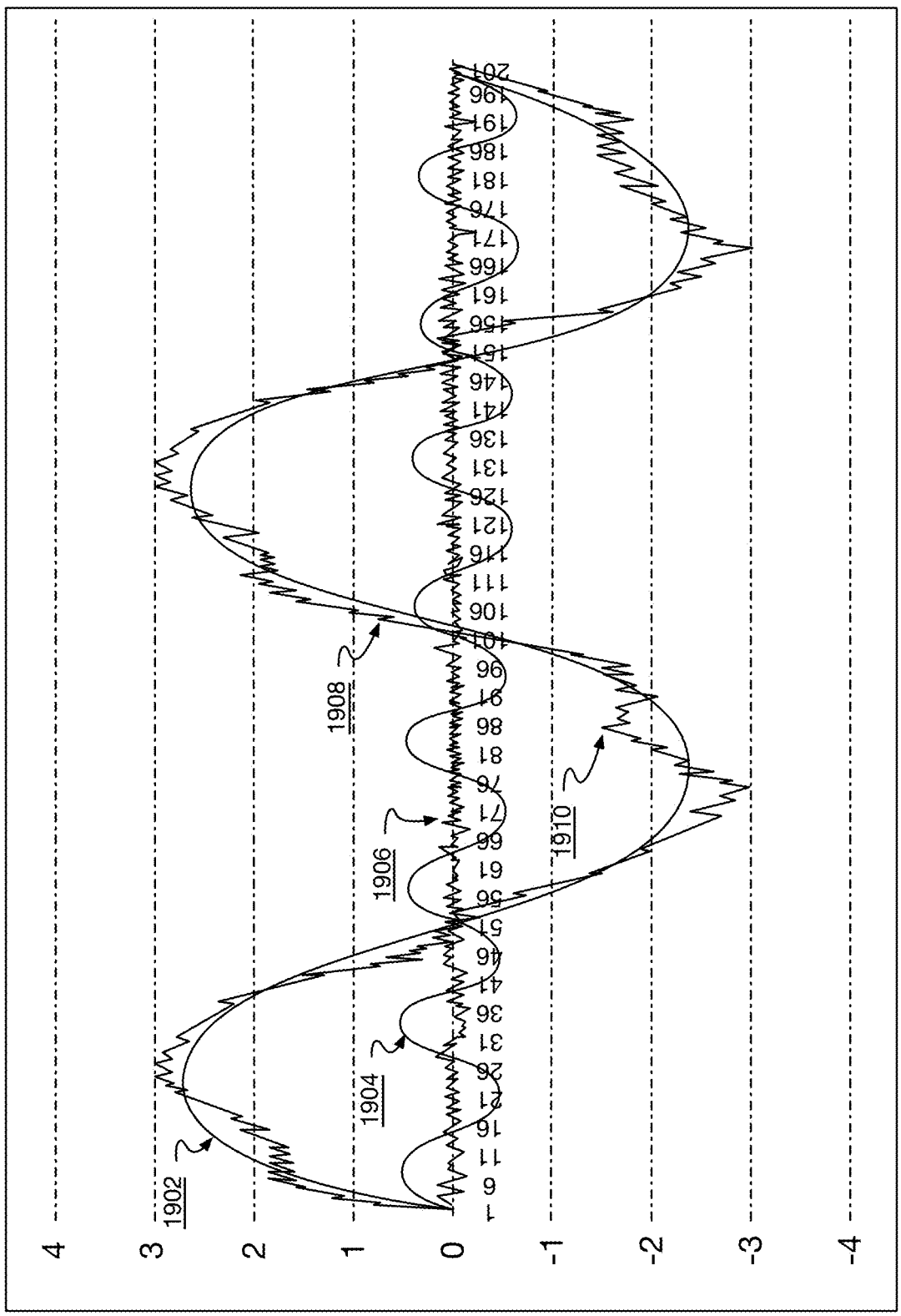
FIG. 19 is a simple simulated example of the drive channel signals showing the drive, dither, and voltage following (sensed) signals.
Figure 21:
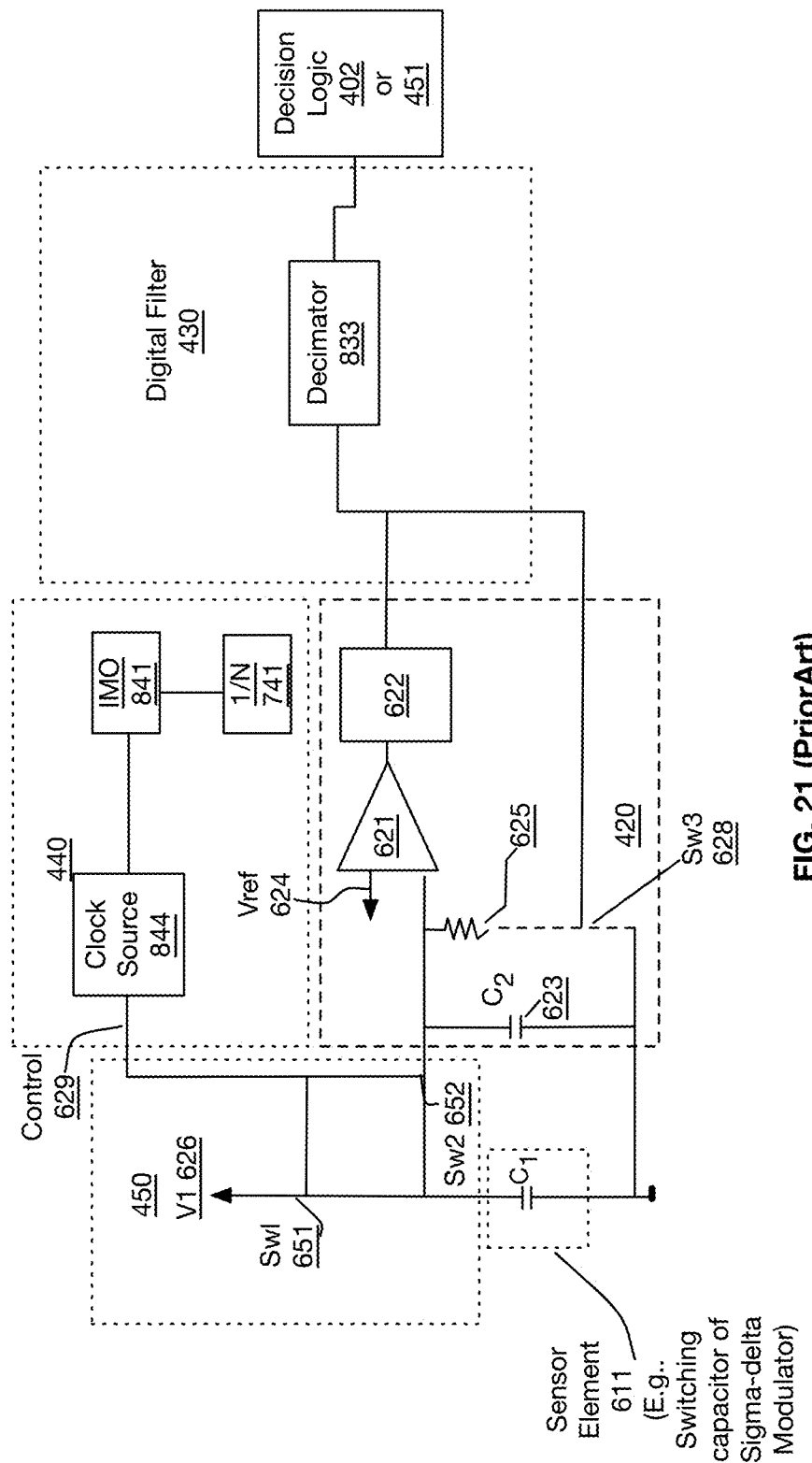
Figure 22:
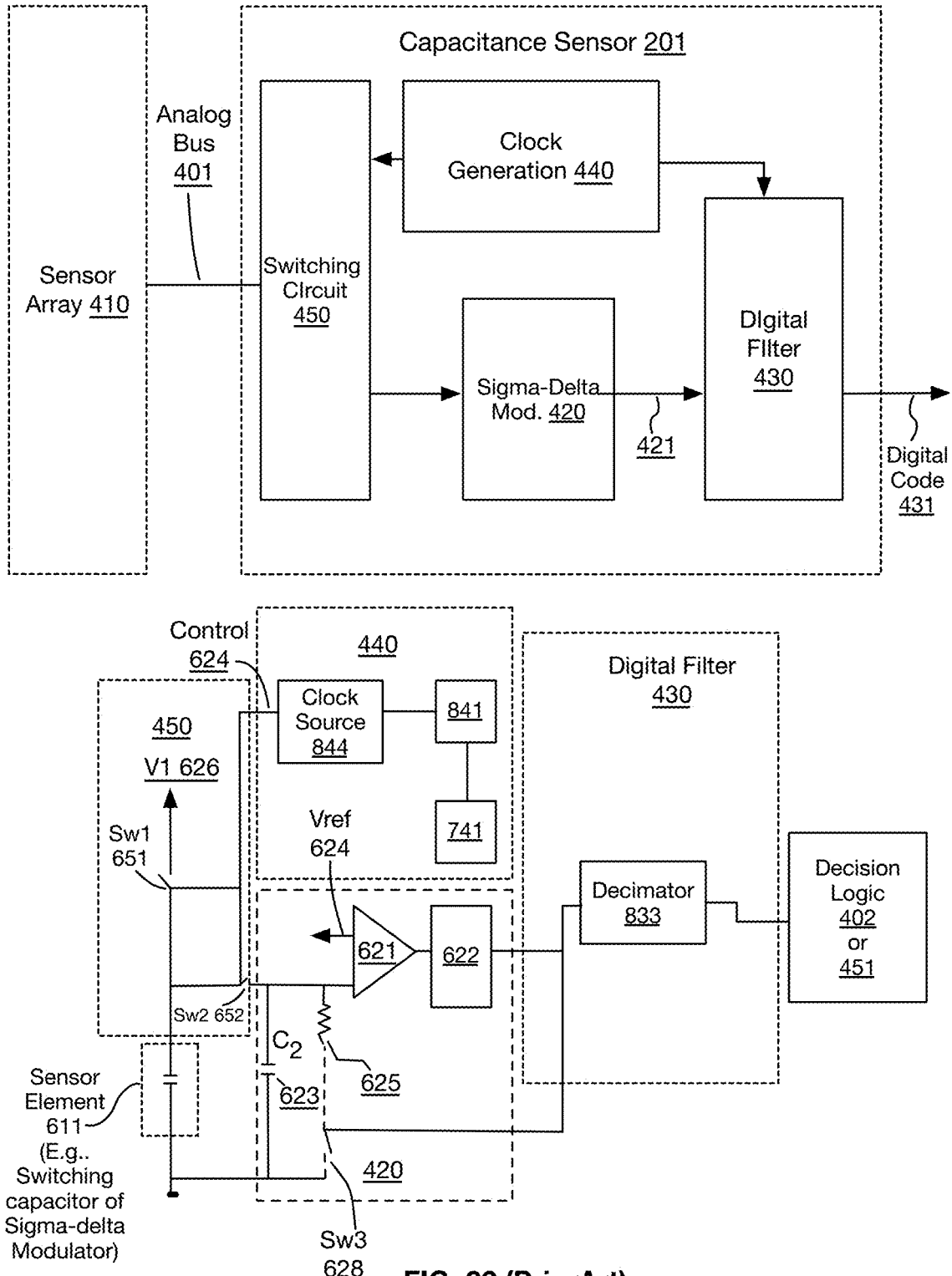
Figure 23:
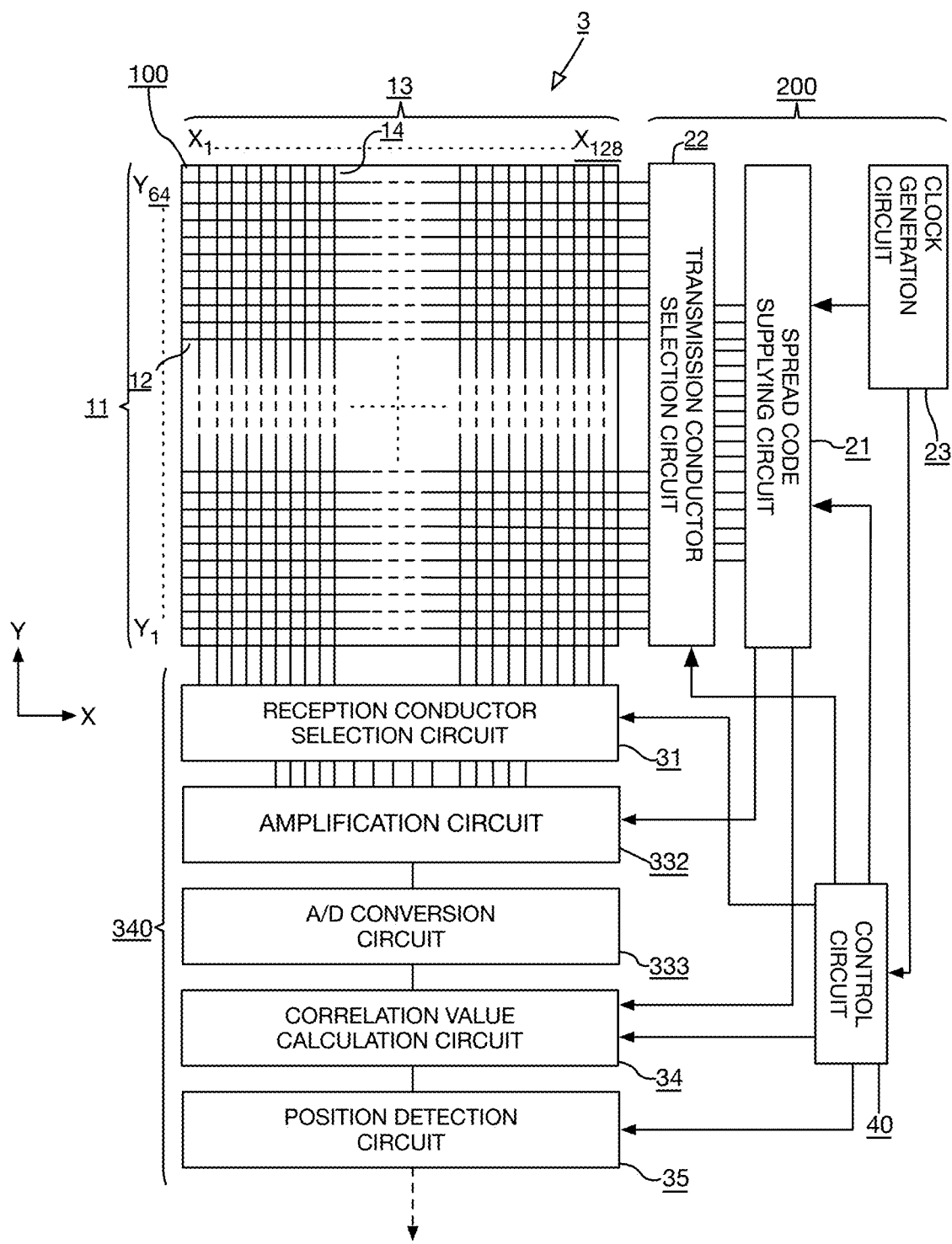

Some embodiments of the invention use said parallel channel drivers with dither signals combined with a low amplitude self-capacitance mode signal to overcome input hysteresis of the digital I/O pins employed in the drive/receive circuits 30, and allow continuous self-capacitive mode signal sampling and associated signal processing improvements, such as that described with respect to FIG. 19. By using a low frequency continuous working signal (the self-capacitance signal) that drive the one-bit digital ADC above and below its hysteresis band, the requirement for lower amplitude high frequency noise dithering is reduced for the signals received on the channel (mutual RX and Pen-generated analog sensor signals).

Some embodiments of the invention employ said parallel channel drivers to provide a capability of improved conductive contaminant (such as, for example, salt water) rejection through the self-capacitive mode method of driving all channels simultaneously to eliminate unwanted impedance paths from channel to channel allowing only impedance changes due to the user's touch and ground path.

The operation of the self-capacitance mode with all channels driven simultaneously allows for almost ideal self-capacitive salt water rejection operation due to the fact that the change to variable impedance paths happen through the users touch to ground only and changes to the impedance paths back to the touchscreen are almost zeroed. This is as close as a continuous plane driven at the frequency of interest, as possible.

Figure 7:
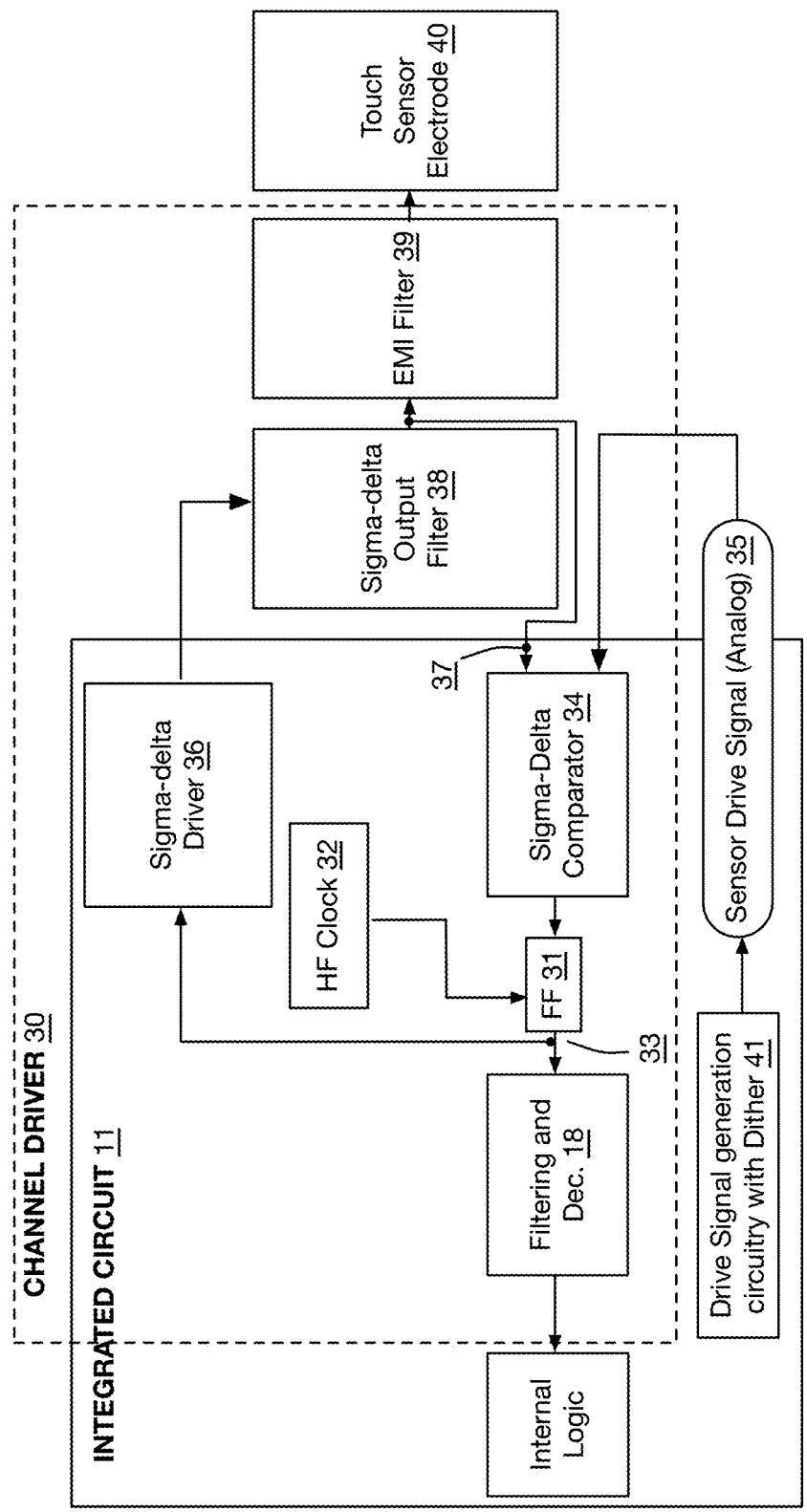
FIG. 7 is a block diagram of a channel driver and receiver circuit according to some embodiments of the invention.

FIG. 7 is a circuit block diagram of drive/receive circuitry for a channel driver according to some embodiments. Some embodiments of the invention use a hardware array of one or more channel drivers 30, as depicted generally by the components in the dotted line numbered 30, to drive and receive analog sensor signals to a sensor. Each channel driver 30 generally includes a novel voltage following sigma-delta A/D converter that includes: a sigma delta D/A converter comprised of a sigma delta driver 36 driving a digital output to which is connected a sigma-delta output filter 38, which typically an analog single pole RC filter. The A/D converter portion of the circuit is implemented with a sigma-delta comparator 34 having two inputs, one connected to the sigma-delta output filter node which drives the touch sensor electrode 40. A second EMI filter 39 may also be used to filter high frequency noise at the electrode 40.

The other input of the sigma-delta comparator, the reference input, is connected to an analog sensor drive signal 35, which contains the one or more analog frequencies (which may be modulated signals) employed to drive the touch sensor in various modes as discussed below. Sensor drive signal 35 is shown bridging the integrated circuit 11 and the external components because, while the signal is typically generated on the integrated circuit in digital form, it may be driven outside through D/A outputs in some versions, or it may be fed into the integrated circuit as a reference voltage where system design allows, as will be further discussed with respect to various versions of the circuit below. The sensor drive signal in this version is generated by drive signal generation circuitry 41. This typically includes, as further described below, digital frequency generating, and mixing the digital signals in cases where multiple signals are transmitted simultaneously. Referring now this version of the analog sensor drive signal 35, this signal produced by drive signal generation circuitry 41 feeding the reference of each of the drive/receive circuits 30, and operable to generate a mutual sensor signal (or "mutual signal") at a first frequency and a self sensor signal (or "self signal") at a second frequency different from the first frequency. The self and mutual sensor signals driving the electrodes for detecting self (same electrode) impedance changes and mutual (cross coupled from other electrodes) impedance changes are first generated digitally at respective frequency generators, which preferably generate sine waves at the respective frequencies f1 and f2, but may generate other continuously varying signals such as wavelet sequences, modulated waves, or other analog varying patterns. While generally the various signals are discussed as being at specific frequencies, they may also be a group of sub-signals carried on a set of frequencies, which will be driven together, or transmitted together in the case of the pen signal. The pen signal may include multiple electrodes transmitting multiple signals from the pen on different frequencies, which is referred to as one or more pen frequencies to identify that a single pen frequency may be used or many. Dither is also added for the reasons discussed herein. It is noted that one special case of this circuit is when the self-analog sensor signal is not used, and the circuit is employed only to receive a pen analog sensor signal on a third frequency, and to transmit the mutual analog sensor signal and, at other nodes, to receive the mutual analog sensor signal. In such case, the dither is still added to the mutual analog sensor signal. As shown, the analog sensor drive signal 35 is connected to the second comparator input, which functions as a voltage follower due to the feedback connection of the sigma-delta driver 36 to the first comparator 34 input at node 37. This connection enables the drive/receive circuit 30 to act as a sigma-delta analog to digital transceiver. That is, circuit 30 both drives the signal present on reference 35 out through the sigma-delta driver portion, and to sense or receive the driven signal changes needed to follow the reference 35—which indicate the impedance changes caused by touch on the touch circuitry, or signal or noise external to the electrode, such as the mutual analog sensor signal and the pen sensor signal(s). The feedback connection at node 37 causes this node to act as a "virtual signal" node, which the entire voltage following A/D converter attempts to match to analog sensor drive signal 35. Because the impedance of touch sensor electrode 40 changes when touched based on capacitance, inductance, or resistance changes, the signal at virtual signal node 37 contains variations indicating such changes, as the sigma-delta D/A converter portion of the circuit drives more or less voltage to node 37 to keep up with the impedance changes. These changes are present in the comparator output signal at node 33, which is filtered and decimated to a lower digital sample rate at block 18, for processing by the system internal logic, such as that shown in FIG. 1, to detect and process the various touch and pen inputs. The voltage follower circuit also works to detect signals coupled into the sensor electrode 40, such as analog signals generated from a touchscreen pen, or mutual-coupled signals driven on other touch sensor electrodes and coupled into the electrode detecting the signal. The depicted circuit is therefore adapted to drive one or more analog signals, and sense one or more analog signals, at the same time by mixing the desired sensor signals to be driven into sensor drive signal 35, as will be further described below.

While a sigma-delta based channel drive/receive circuit is shown here in the preferred version to employ only digital I/O pins and not require analog op amps or analog A/D and D/A converters or switches, this is not limiting and other versions may employ such analog components, both on and off the integrated circuit. For example, the A/D converter portion of the circuit may be comprised of a digital input with an AC capable generated reference threshold or an analog comparator with one input accepting an AC capable generated reference.

Recently, much work on sigma-delta A/D converters has been done with the goal of producing a high frequency high resolution solution capable of replacing the more standard analog versions of A/D converters such as successive-approximation, integrating, and Wilkinson ADC. Much work has been directed towards accuracy and improvements in linearity. In the present invention resolution, speed, and repeatability are the key features required for successful touchscreen function. Standing alone, a simple Sigma Delta ADC, without accuracy and linearity, will find very few applications. Coupled to the concurrent driving modes and simultaneous sampling of the present invention as well as internal calibration of the touch system, these and other limitations of the sigma-delta ADC become trivial issues to the system operation. The sigma-delta driver and sensor designs herein are much less sensitive to nonlinearity, low input impedance, and accuracy issues than typical applications of such ADC designs.

As employed in some embodiments herein, the touchscreen driver and receiver circuitry includes a hardware array of channel drivers 30 such as that of FIG. 7, with internal logic operating on a high frequency clock 32. The digital input and output logic if allowed to run free could switch and oscillate up to the capabilities of the silicon hardware possibly producing very high unwanted frequencies. The loop is controlled and limited to a known frequency via the clocked flip-flop 31 which is set to a speed compatible with the silicon hardware and of a value favorable to external filtering and internal resolution.

Some versions of the touchscreen driver and receiver circuitry herein also include a hardware array of channel drivers utilizing a filter and decimation chain to move the data from the high frequency low resolution realm of the one-bit sigma delta A/D converter to the low frequency high resolution realm of function needed for further signal processing.

Figure 11:
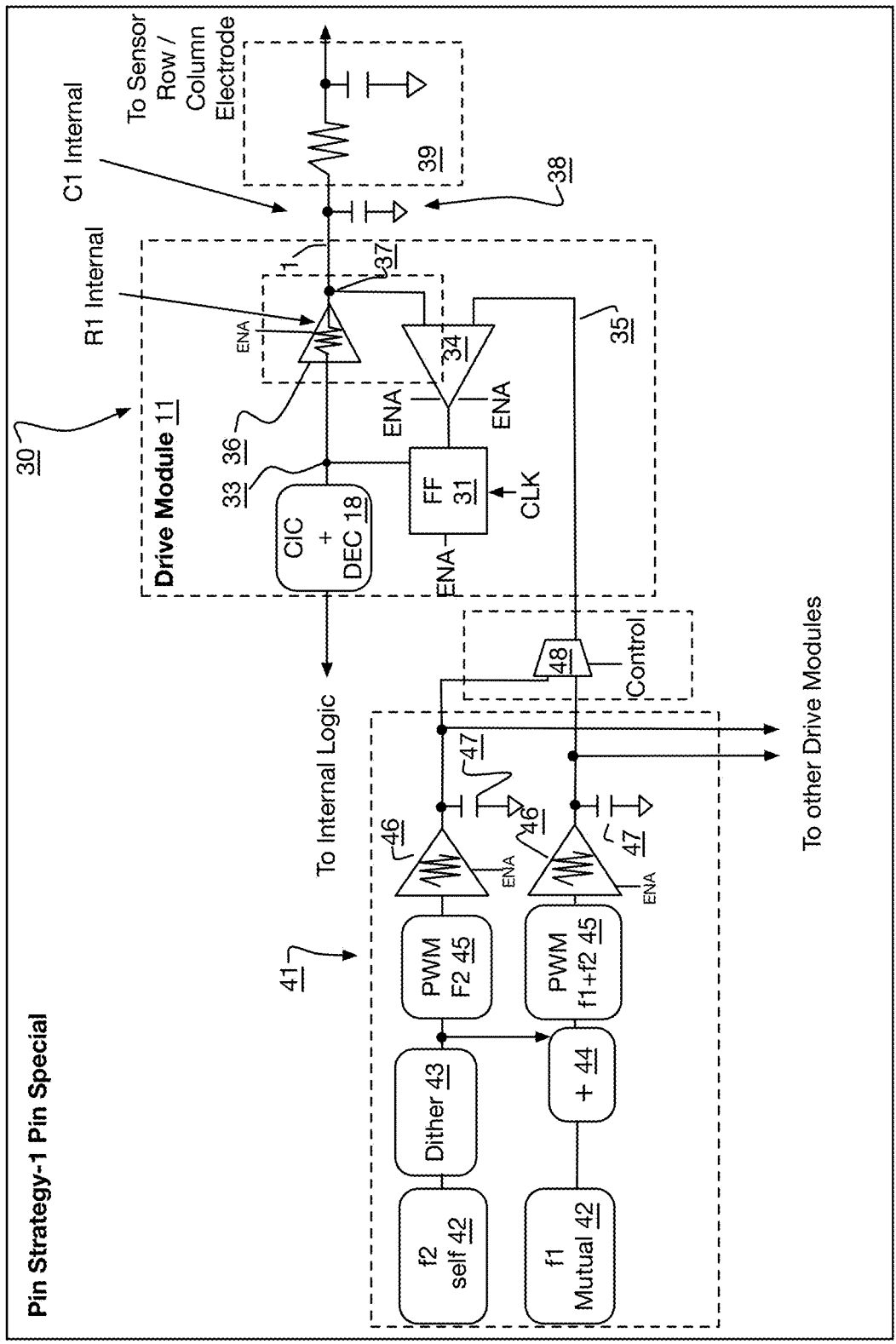
FIG. 11 is a schematic diagram showing an embodiment of a drive/receive circuit in a 1-pin configuration of programmable logic with special requirements.

FIG. 11 is a schematic diagram showing an embodiment of the circuit of FIG. 7, implemented using one pin of a programmable logic device, with special requirements that may require customization of present generation of programmable logic I/O circuitry. The preferred embodiment of the channel driver depicted in FIG. 11 uses a single pin, labeled 1, per channel and functions without any limitation as to the mutual transmit mode as discussed herein, but may require custom silicon at the present time due to the need for internal analog channels, analog switches, output and input buffer simultaneous function, and also higher digital buffer output impedance settings more in line with use with smaller output filter capacitance C1. Current output buffer impedance near the range of <1 000 ohms where 5 k to 10 k ohm would allow much smaller C1 values. For FPGA solutions that provide such features, only custom configuration, and not custom circuit modification, are required to achieve the depicted design.

The depicted circuit includes a channel driver and receiver circuitry 30, with the internal or onboard portions of circuitry 30 (on the IC) identified by block 11, and the sigma-delta output filter 38 implemented with an internal resistor R1, and an external capacitor C1. The portion labeled "Drive Module" represents the internal portions of the drive channel circuit, which are repeated for each channel. The EMI filter 39 is implemented with external resistors and capacitors as shown. EMI filter 39, in this example, is a lowpass RC filter with a cutoff frequency of approximately 1 Mhz. Filter 39 functions to reduce the outgoing noise from dither, the PWM signal noise, and clock EMI that may emanate from channel driver 30. It also functions to reduce EMI (electromagnetic interference) from the sensor electrode, and to reduce ESD (electrostatic discharge) noise coming in from the sensor electrode. The sigma-delta driver circuit 36 is implemented with the digital output driver for pin 1, which is connected to both the external portions of the sigma-delta filter, and connected back to the voltage following A/D circuit input. The voltage following sigma-delta A/D circuit includes comparator 34, which in this embodiment is implemented with the comparative input receiver of the built-in drive receive circuitry of the IC. In this version the comparator of circuit 34 is fed with analog sensor drive signal 35. The comparator 34 output is fed to flip-flop 31, where it is clocked through with the local, high frequency clock signal CLK to control the sampling rate of the signal passed through to the flip-flop 31 output 33. This output 33 carries the high-frequency digital received signal which is passed to the CIC filer and decimator 18, and also fed back to the sigma-delta driver 36 as a feedback signal. Using such feedback to receive the analog signal at virtual signal node 37, while driving the comparator reference input with the analog sensor drive signal 35, provides the voltage following A/D converter is connected to follow a reference signal on a first input by producing a feedback output at a virtual signal node on a second input, the sigma-delta output filter also connected to the virtual signal node 37 to drive the sensor electrode.

The received signal at node 33 is lowpass filtered and decimated to a lower sampling rate at CIC and decimator 18. While a CIC filter is used here, this is not limiting and any suitable lowpass digital filter arrangement may be used. The output of filter and decimator 18 is fed to the demodulation logic blocks (FIG. 1), where it is processed and interpreted to detect touch inputs on the touch sensor electrodes.

Referring now to the analog sensor drive signal 35, this signal is produced by drive signal generation circuitry 41 feeding the reference of each of the drive/receive circuits 30 operable to generate a mutual sensor signal (or "mutual signal") at a first frequency and a self sensor signal (or "self signal") at a second frequency different from the first frequency. The self and mutual sensor signals driving the electrodes for detecting self (same electrode) impedance changes and mutual (cross coupled from other electrodes) impedance changes are first generated digitally at respective frequency generators 42, which preferably generate sinewaves at the respective frequencies f1 and f2, but may generate other continuously varying signals such as wavelet sequences, modulated waves, or other analog varying patterns. For example, one or more of the f1, f2 and f3 signals may include a groups of frequencies, such as three sine wave frequencies, in which the received magnitudes are accumulated together after demodulation. Frequency sweeping, hopping, or chirping methods may also be used with the analog signals of the f2, f1, and f3 (Self, Mutual, Pen) measurements. Prior art techniques that employ square waves for the sensor signals are generally not the best selection for these signals because the square waves contain harmonics which cause deleterious effects when they pass through the sensor electrodes, and the sensor measurement is not available across the entire period of the wave. This version generates sine waves at the f1 and f2 frequencies, which are sufficient different frequencies that they can be easily demodulated separately or separated by filters in the receiver logic portions of the system. The self sensor signal is fed to a dither circuit which adds dither to the signal to improve the resolution and overcome hysteresis issues in the A/D converter portion of circuit 30, as further described below. A common dither may be added to all self sensor signals, or independently generated dithers may be used. The dithered self sensor signal is added to the mutual sensor signal at adder 44. Dither as used herein is the addition of a low magnitude noise signal, typically shaped in the frequency domain to cover a desired bandwidth. The frequency components of the noise are usually selected to be above the final usable system frequency range, and the noise therefore gets filtered out of final readings. Dither noise is often added to A/D systems to improve resolution by breaking up quantization noise (step noise). Herein it is also used to overcome the 1-bit A/D hysteresis by randomly pushing the input voltage below and above the hysteresis band exhibited by the comparator circuit. After dither is added to the signal shown, the two branches are then separated PWM (pulse width modulation) modulated at PWM modulators 45. Then, the PWM signals pass to a sigma-delta D/A converter implemented with a digital output driver 46 (having an internal resistance) and a sigma-delta output capacitor 47. The output of these two D/A converters is then an analog dithered self signal at f2 frequency and a combined analog self and mutual signal having f1 and f2 added. These signals may be routed to feed other channel drive/receive circuits as depicted, to avoid duplicating the signal generation circuitry and to provide drive signals at a common phase. Analog switch or multiplexor 48 provides the ability to control whether the drive/receive circuitry 30 drives both self and mutual signals, or only the self signal at f2. This enables selection of modes and the mutual scanning function described below. The self and dither may be set to zero to provide a pure mutual signal at frequency f1 should the sensing scheme employed with a particular design require only the mutual signal to be driven at some point. It should be noted that while the depicted circuit generates analog versions of both the self and mutual signals, some versions may include a control selection switch feeding only one D/A converter, selecting the mode off2 or f1+f2 before converting the signal to analog (the version of FIG. 9 has such a design). Each drive/receive module may also generate their own self, mutual, or self and mutual signals, but such a design needlessly replicates the signal generation circuitry. For versions in which separate mutual frequencies are desired for each row, each drive receive circuit 30 may be fed with a separate mutual signal, driven at other frequencies such as f4, f5, f6, fn, up to the number of rows or columns that are used for mutually coupled signal detection. Thus, the full range of driving and receiving schemes discussed herein, including the driving processes of FIG. 6 and FIG. 15 may be applied with this embodiment.

The output of drive signal generation circuitry 41 is the analog sensor drive signal 35, which is fed to the reference input of comparator 34, part of the voltage following sigma-delta A/D converter. This circuit acts both to drive the sensor electrode, which can be done directly or through a filter 39, and to sense changes of the sensor electrode impedance as discussed above. The circuit, and the other versions described herein, can also receive other signals coupled into the sensor electrode, such as mutual signals coupled from other electrodes, or a pen signal coupled directly into the connected electrode by an active pen used with the touch sensor array.

The circuit of FIG. 11 is preferred because it uses fewer output pins, only one per drive/receive channel, and so an array of such circuits driving approximately 100 I/O pins of the integrated circuit may be employed to drive a 50-row by 50-column touch sensor such as a touchscreen, touch pad, or touch sensitive fabric using PEDOT variable resistive electrodes. However, implementing the circuit of FIG. 11 and other 1-pin equivalents thereof on an FPGA platform requires first a comparative input and digital output for each I/O pin employed, second a digital output impedance at driver 36 high enough for the required sigma-delta output filter at C1 (which output impedance is preferably in the range of 1 k Ohms to 10 k Ohms), and third, control over the analog voltage references (feeding the vref of input comparators) and other analog components such as analog switches. Some present FPGA products may allow such control, while others do not. Therefore a custom ASIC or a customized FPGA product is needed in some cases to achieve the circuit of FIG. 11. The different transmit receive modes herein, including those of FIG. 3, FIG. 4, FIG. 5, FIG. 6 and FIG. 15 may be applied with this embodiment.

Figure 10:
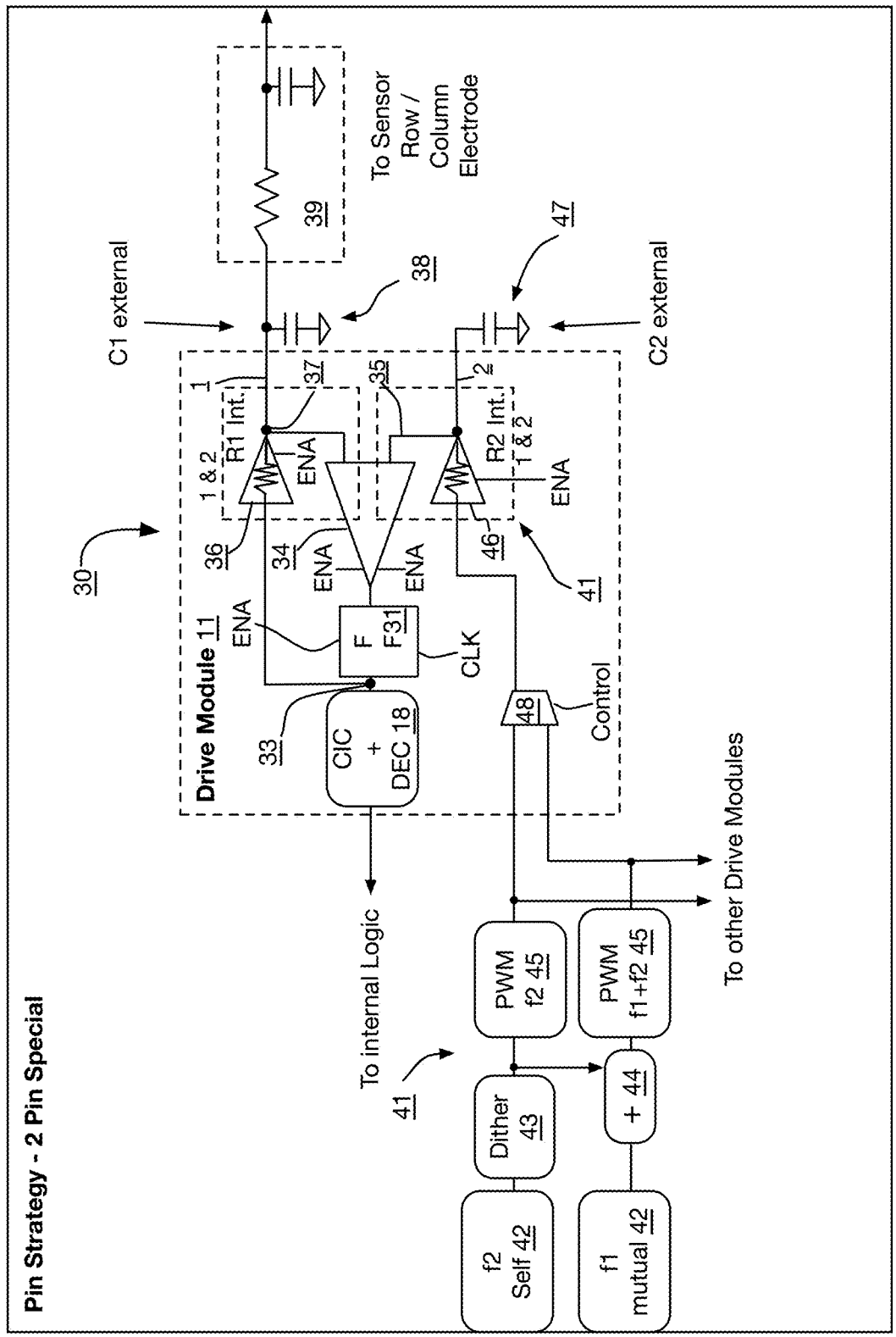
FIG. 10 is a schematic diagram showing an embodiment of a drive/receive circuit in a 2-pin configuration of programmable logic with special requirements that may not be available in present generation programmable logic.

Another embodiment of the channel driver FIG. 10 uses two pins per channel and functions without the mutual transmit mode limitations discussed herein with respect to some other embodiments. It does not require internal analog channels and switches as the embodiment of FIG. 11 does, but may still require custom silicon at the present time due to the need for output and input buffer simultaneous function and also higher digital buffer output impedance. The depicted embodiment of FIG. 10 functions similarly to the version in FIG. 11, but employs two pins 1 and 2, and uses an external capacitor C2 external for the sigma-delta output capacitor 47 of the single sigma delta D/A converter for the sensor drive signal, made up of driver 46 and capacitor 47. The drive signal generation circuitry 41 also includes the driver 46 and external capacitor 47. This capacitor 47 is connected to the pin to filter the sigma-delta D/A conversion, and the resulting signal 35 is routed internally from the pin to the comparator 34 reference input, similarly to the design of FIG. 11. The depicted design may be used where on-chip capacitors are not available near the drivers. This design selects between the sensor signals of f2 or f1+f2 with a digital switch 48 rather than an analog switch. Alternately, the signal to be driven may be generated directly without the need for a selection switch, however this scheme provides ability to feed other drive/receive circuits with the digital versions of the two drive signals and avoid duplicating most of the drive signal generation circuitry 41. The requirements to use this design with an FPGA implementation are first a comparative input and digital output for each 110 pin employed, second a digital output impedance at driver 36 high enough for the required sigma-delta output filter at C1. The different transmit receive modes herein, including those of FIG. 3, FIG. 4, FIG. 5, FIG. 6 and FIG. 15 may be applied with this embodiment.

Figure 9:
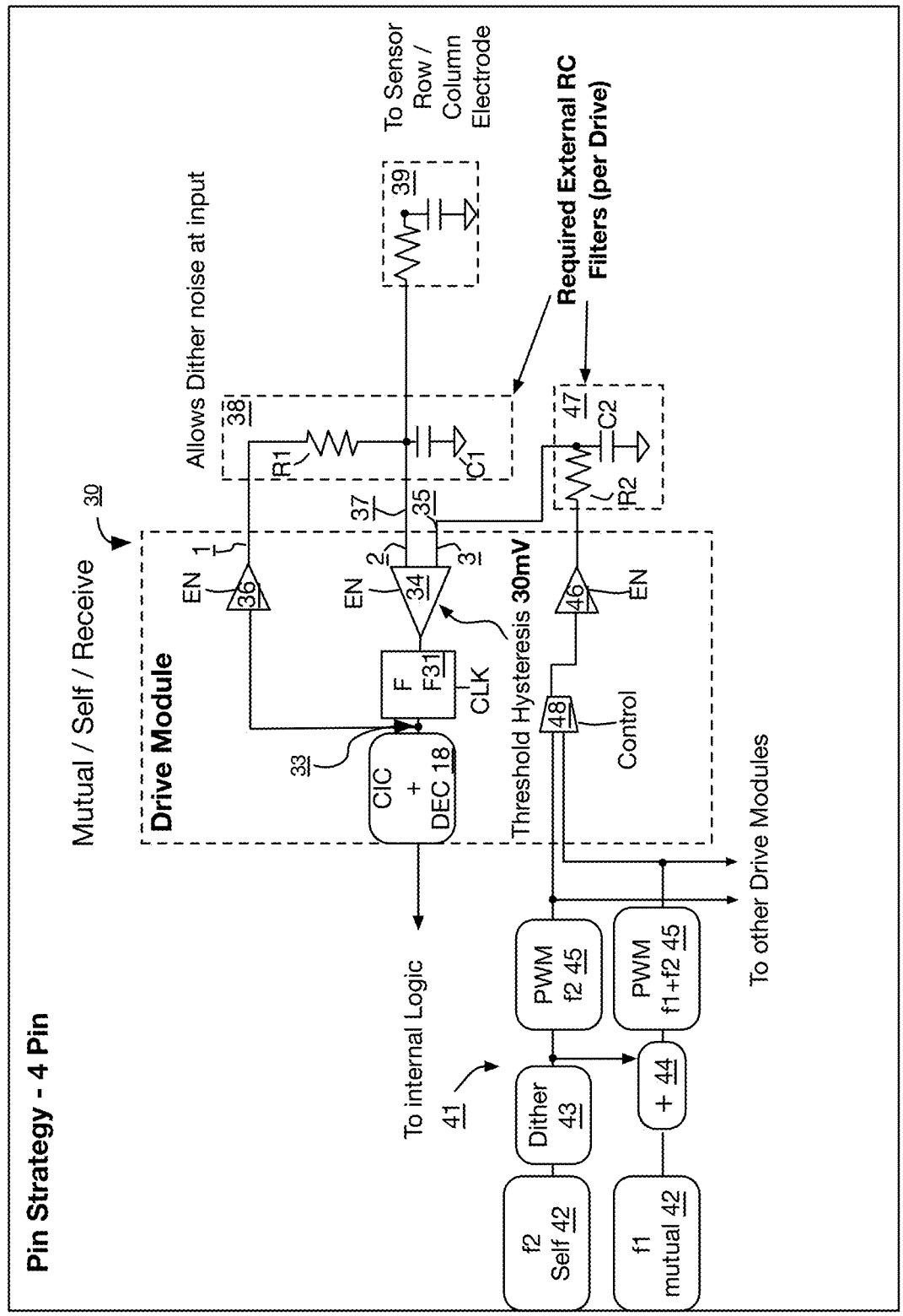
FIG. 9 is a schematic diagram showing an embodiment of a 4-pin configuration drive/receive circuit.

FIG. 9 shows another embodiment of the channel drive/receive circuitry, which is capable of the same function as the previous two examples but uses four pins labeled 1-4. This embodiment will work on most present day programmable logic devices but requires two differential digital input and two digital output pins plus two resistors and two capacitors to operate per channel. The digital output drivers at pins 1 and 4 do not require especially high output impedances for this version. Generally the drive signal generation circuitry 41 is constructed the same as the previous version, with the control switch 48 being a digital switch because the PWM signals from PWM modulators 45 are still digital entering control switch 48. The sigma-delta D/A converter converting the sensor signal to analog is implemented with a digital output driver 46 and a sigma delta output filter made up of output capacitor 47 and resistor R2. This sigma-delta output filter is preferably a single pole RC filter as depicted, with a cutoff frequency of approximately 1 Mhz. This filter output is the analog sensor drive signal 35, which is connected from the filter output capacitor 47 back into pin 3, to the reference input of comparator 34.

The drive/receive circuit 30 again uses a voltage following sigma-delta A/D converter driven at its reference input with analog sensor signal 35 to achieve a sigma-delta analog to digital transceiver. The sigma-delta D/A portion of the voltage following circuit in this version includes digital output driver 36 at pin 1, and a sigma delta output filter 38 built of external resistor R1 and capacitor C1. The example filter in this version is a single pole RC filter with a cutoff frequency of about 1 Mhz. The various single- and multi-frequency driving and receiving schemes described herein may all be used with this embodiment, including the driving process of FIG. 3, FIG. 4, FIG. 5, FIG. 6 and FIG. 15.

FIG. SB shows another embodiment of a channel driver, which can also work on present day programmable logic device designs, requiring only two differential digital input comparator pins and one digital output pin for a total of three 110 pins per channel used. Its only limitation in this regard is that the mutual capacitive mode transmit channel (the mutual signaling is typically used to measure mutually coupled capacitance but may be used to measure mutual inductance or resistively coupled signals), of which there may be only one active at a time, cannot act as a receive for self or pen receive. In the depicted embodiment, the drive signal generation circuitry 41 is common to all the transmitting drive modules, and is connected to the circuit 30 at separate locations, the f1 mutual sensor signal being digitally generated and fed to be pulse-width modulated in the PWM f1 block 45 in the upper left of the drawing. This circuitry is internal to the IC. This modulated f1 mutual sensor signal is fed to a digital control switch 58, which passes through either the output of the sigma-delta AIC converter at node 33, or the PWM f1 signal, to the sigma delta driver 36, which is configured as a sigma-delta D/A converter by the connection to the sigma-delta output filter 38 connected to pin 1. The output of filter 38 is, similarly to the previous figure, connected to virtual signal node 37, which is connected to the voltage-following sigma-delta A/D converter input on pin 2. Node 37 is also connected to the EMI filter 39 and, through this filter, coupled to the row electrode to send and receive the sensor signals similarly to the other versions herein. In this version, as can be seen, the reference input of the voltage-following sigma-delta A/D converter, at pin 3, is connected to the analog self sensor signal. This signal is produced by the other portion of the drive signal generation circuitry 41, which as shown takes a dithered version of the f2 sensor signal and digitally pulse width modulates and drives this signal out an output, where it is filtered by sigma-delta D/A output filter 47, and then is fed to the comparator reference node at pin 3. The filter 47 is typically external to the IC, and the dithered f2 self sensor signal is driven out a pin to this filter. This pin is not counted in the pin count of the circuit because this single self sensor signal is used to drive all the other self signal transmitting at other drive channels, as shown by the arrow going to other drive modules. The mutual sensor signal, in this version, is fed to the other channel drive modules as a digital PWM signal, as seen at circuitry 41 in the upper left of the drawing. The received signal at node 33 is continuously filtered and decimated through to the internal receiver logic at block 18, similar to the other embodiments herein. It should be noted that one distinction between the circuit of FIG. SB and that of FIG. SA is the difference in the threshold hysteresis from approximately 30 m V and approximately 150 m V due to the use of a comparator input in FIG. SB versus a digital input in FIG. SA. The digital input with a higher hysteresis has more requirements for dither which is shown in FIG. SA injected in the A/D feedback loop at dither block 43.

In operation, it can be understood that the depicted circuit will typically operate to drive to the sensor electrode and sense from the sensor electrode the f2 self sensor signal, and simultaneously receive the f1 signal if it is coupled through from other crossing sensor electrodes. When in the course of scanning the mutual signal on individual electrode channels, the drive process reaches this channel, the logic changes switch 58 to feed the f1 mutual signal out, and the digital signal passed out of the drive module to internal logic is not used during this time.

Figure 3:
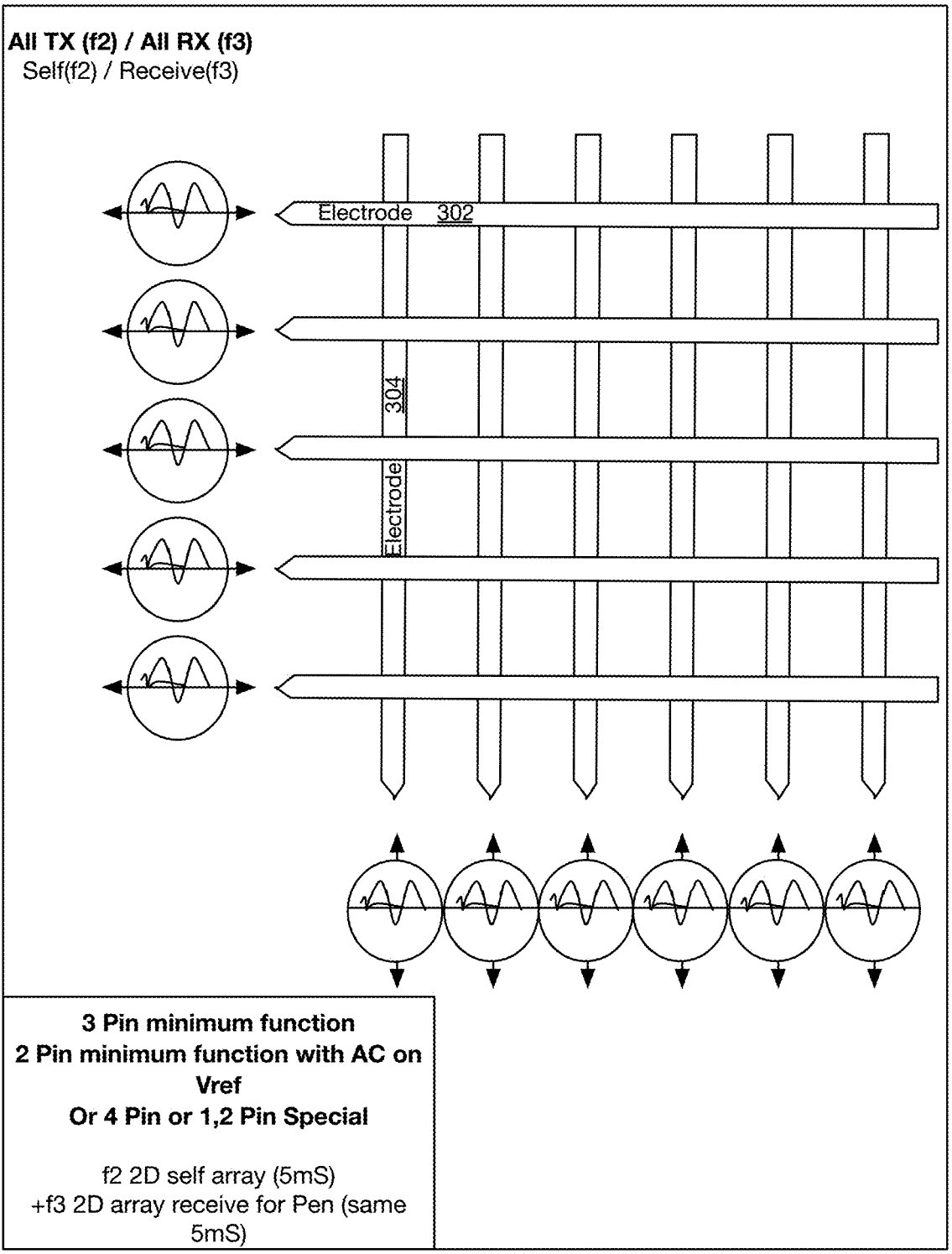
FIG. 3 is a diagram of an embodiment of a simultaneous drive method showing a multi-mode state (Self+Receive) and indicating in notes the different pin configurations capable of achieving such.
Figure 4:
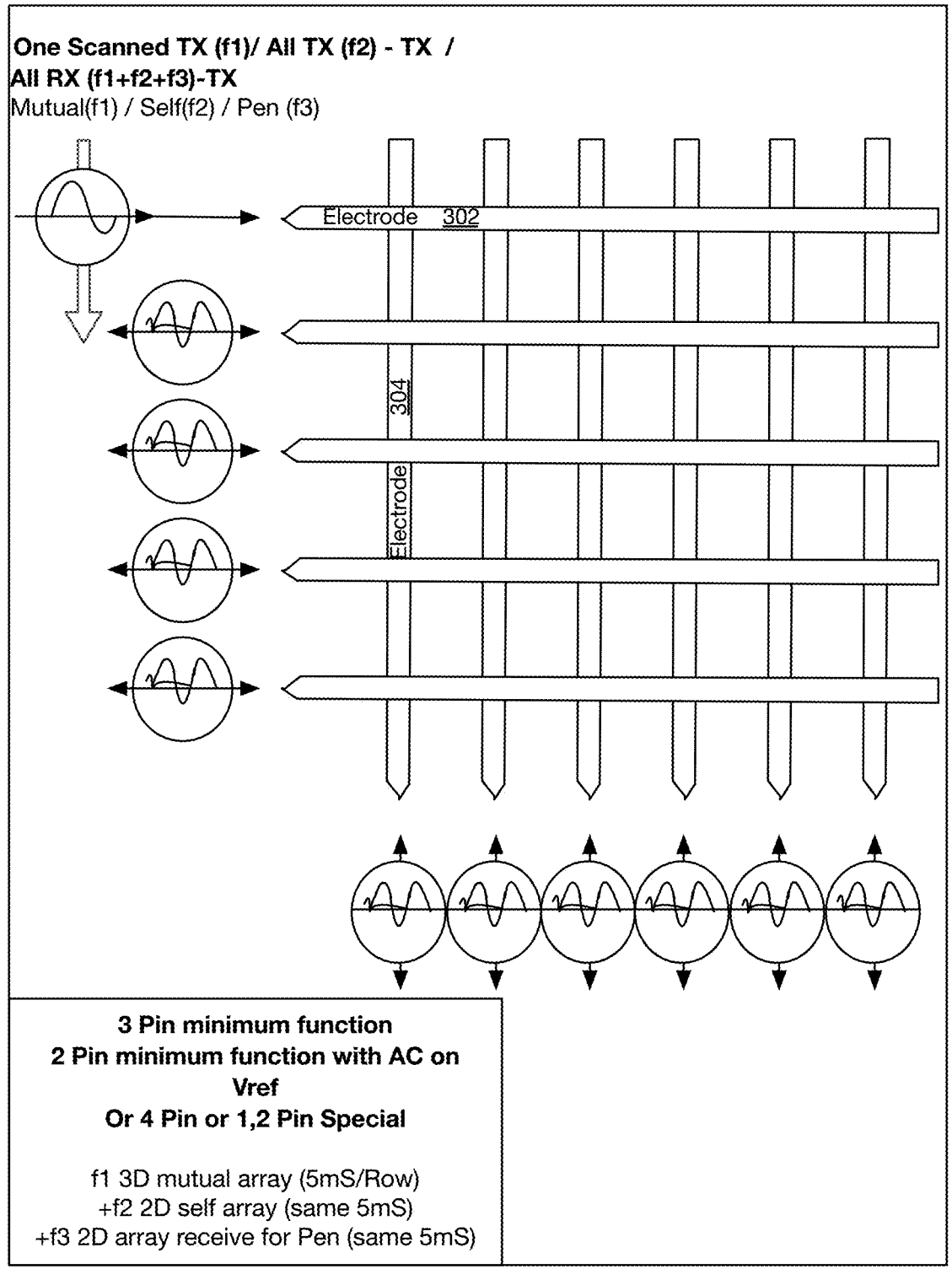
FIG. 4 is a diagram of an embodiment of a simultaneous drive method showing a multi-mode state (Self+Receive+Mutual Scan) and indicating in notes the different pin configurations capable of achieving such.
Figure 5:
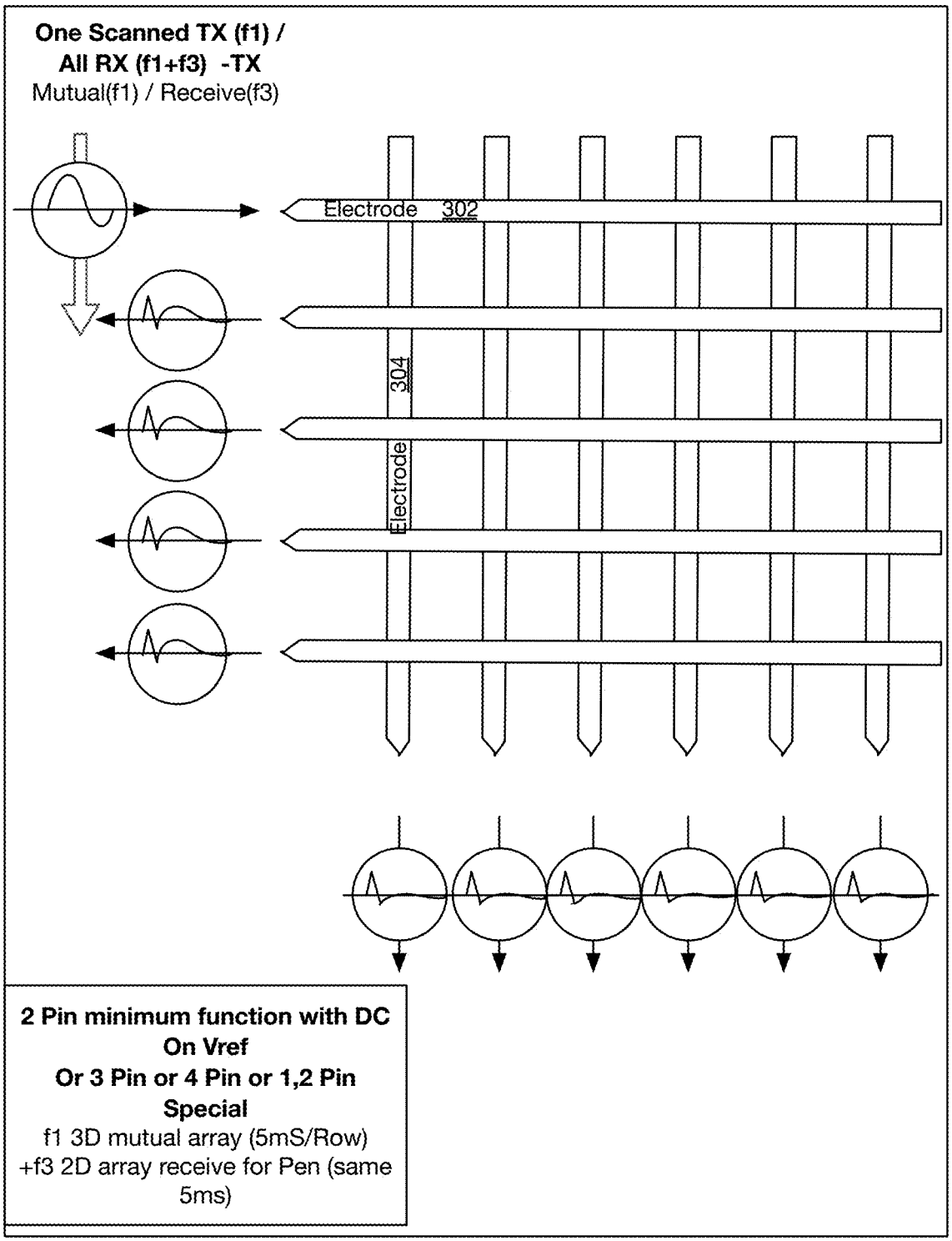
FIG. 5 is a diagram of an embodiment of a simultaneous drive method showing a multi-mode state (Receive+Mutual Scan) and indicating in notes the different pin configurations capable of achieving such.

The signal driving and receiving schemes shown in the diagram of FIG. 3 showing self-capacitive and receive signals, the diagram FIG. 4, showing mutual capacitance and self-capacitance without the mutual TX channel, and pen receive mode without the mutual TX channel, and in the diagram of FIG. 5, showing mutual capacitance and pen receive mode without the mutual TX channel, may be applied with the embodiment of FIG. SB.

Figure 8A:
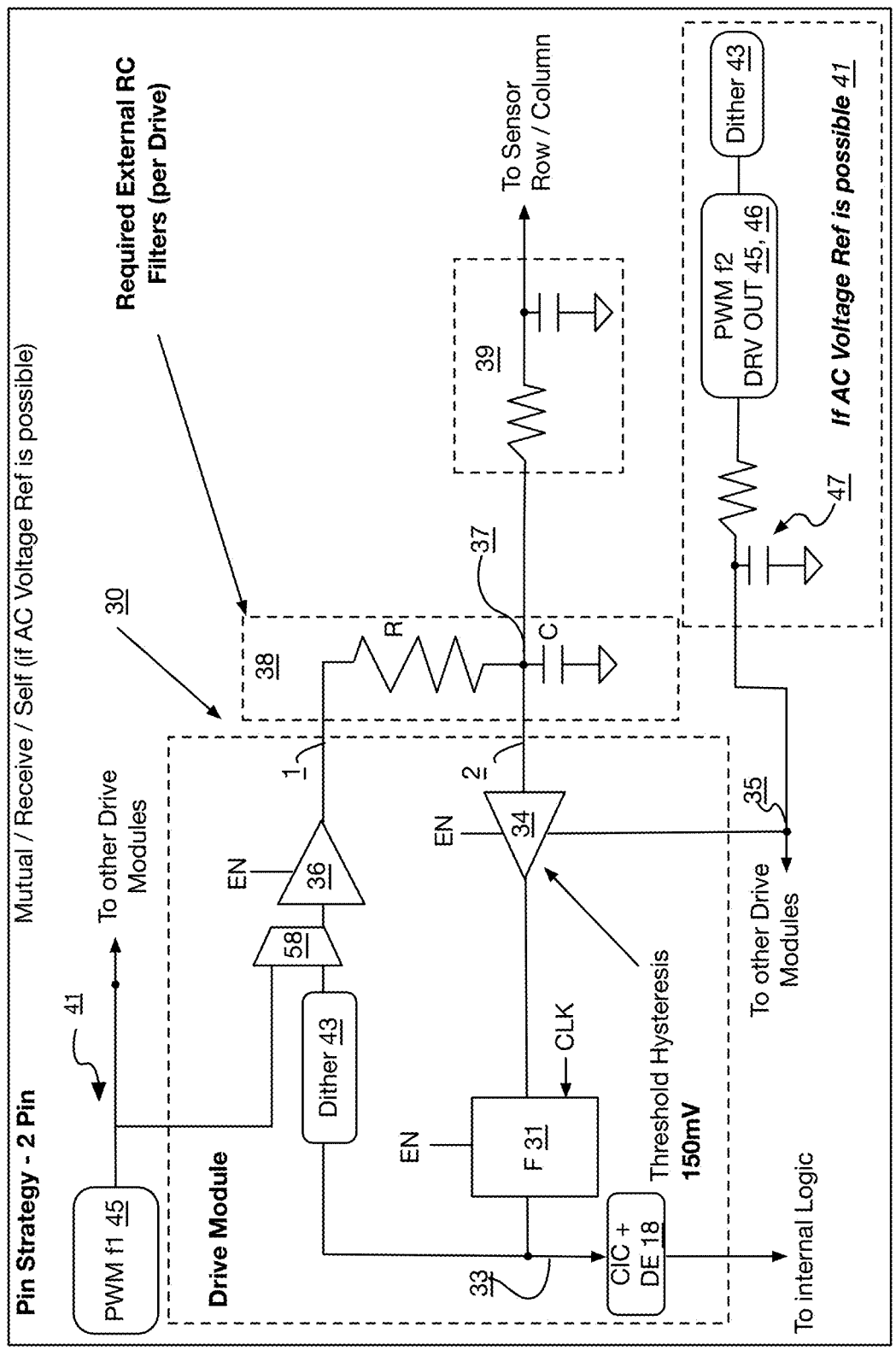
FIG. 8A shows an example of a channel driver configuration using 2 pins where any digital signal combination can be generated and sent to the driver. This diagram shows two possible frequency combinations but any combination is possible.
Figure 8B:
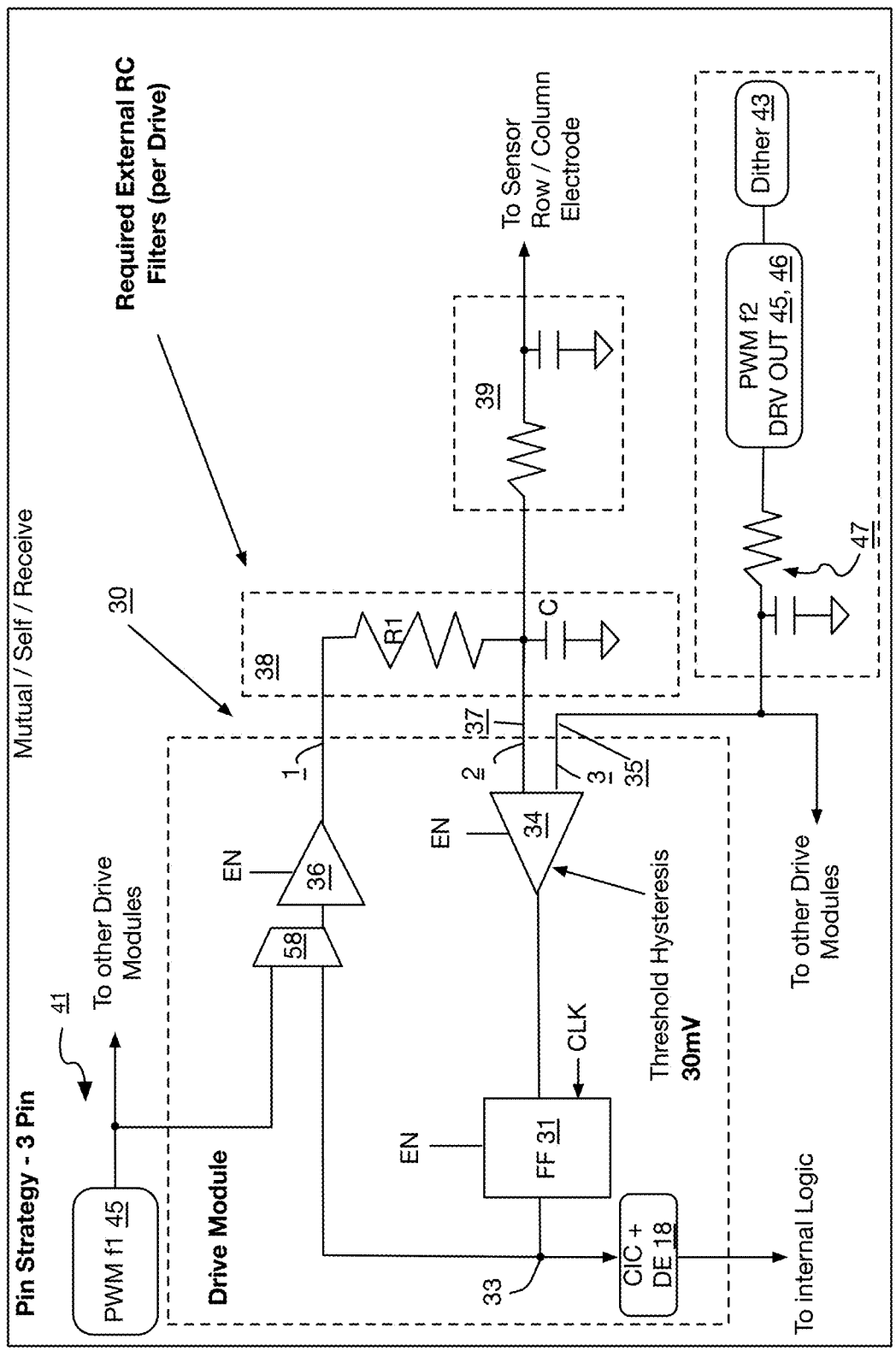
FIG. 8B is a schematic diagram showing an embodiment of a 3-pin configuration drive/receive circuit.

FIG. 8A shows another embodiment of a channel driver, which is similar in function to the example of FIG. 8B, and is similarly limited in the mutual capacitive mode when transmitting. However, this circuit uses only two digital pins, and so may be better for use in a high channel count system. The depicted channel driver circuitry 30 may be employed with in situations where a controllable AC voltage reference is available for digital input pins, as seen by the f2 self sensor signal being fed to the voltage reference of the pin 2 receiver, which functions as the sigma-delta comparator in this embodiment. Typically, a digital input pin functions as a comparator but FPGA or PLD designs do not always provide ability to control the reference voltage of such pins. Where that capability is available, the present circuit may be used, with a common self signal driven out a pin at PWM and driver 45, 46, and filtered to create an AIC version of the self sensor signal 35, then fed into a single pin to the driver reference voltage for all digital input receivers. As shown on the drawing, this scheme is only possible if on an FPGA or PLD an AIC voltage may be fed to the digital input pin references. If not, the scheme must be implemented with a custom ASIC, in which case a 1 pin solution is preferred. Many present day programmable logic devices exhibit about a 150 mV hysteresis on the digital input pin, which is considerably greater than the approximately 30 m V hysteresis show on the specs for analog comparators in the same hardware. Use of analog comparators is therefore preferred to obtain better signal-to-noise ratios, however the depicted circuit may still enable multi-touch capability with much improved economics over other previous sensor driver circuits. The remainder of the circuit functions similarly to that of FIG. SB, and may be used with the same self, mutual, and pen transmit and receive schemes as the circuit of FIG. SB.

Some alternate embodiments include a solution employing more analog circuitry, which may be embodied in an ASIC or in circuitry external to the IC, such as a higher order A/D converter and higher order D/A converter in the voltage-following sigma-delta converter. Also the use of op-amps configured as voltage follower buffers feeding high resolution analog to digital converters could be used as channel drivers. These solutions are not ideal due to greatly increased silicon real estate requirements and associated analog signal handling requirements.

Some versions may include a numerically controlled oscillator(s) generating one or more frequencies for drive signals. Such oscillators are well understood and common knowledge in the field.

Referring now to the processes of driving and receiving touch sensor signals, which may be done with circuits described herein or other circuits, generally various driving and receiving schemes are described with respect to FIGS. 2-6 and FIGS. 13-17.

FIG. 2 is a legend for interpreting the signaling diagrams of FIGS. 3-6, 13, and 15. At the top, symbols are given for the various analog sensor signal frequencies f1 (used for mutual coupled signals), f2 (used for self sensed signals at the same electrode), and f3 (used for a pen injected signal). Next the symbols for transmitting and receiving the various signals are shown. The f2 self signal is shown with a two-way arrow because it is received or sensed on the same electrode as it is transmitted or driven. The Receive symbol is shown with only an incoming arrow for reception and some small mixed frequency symbol. The f3 pen frequency is shown only as a Receive because it is transmitted from an external pen electrode as the pen is moved over and on the touch sensor by a user. The scanning of the mutual transmit symbol, over a series of lines (rows or columns) is shown by the symbol with a wide arrow through it. Below that, the preferred clock frequency ranges for the embodiment shown in FIG. 1 are listed.

FIG. 3 is a diagram showing an embodiment of a simultaneous drive method showing a multi-mode state (Self+Receive), and indicating in the notes the different pin configurations herein capable of achieving the signaling scheme. The depicted sensor electrodes in the array are, in this version, the rows 302 and columns 304 of a touchscreen or touch sensor array. As discussed herein, other types of touch sensor array may be used, and a capacitive multi-touch sensor is preferred. The symbols indicate that second frequency f2 self sensor signal is transmitted on each row 302 and column 304 electrode, and sensed on the same electrodes, the sensing is done simultaneously with transmitting, as described above with respect to the drive/receive circuitry. Simultaneously with sending and receiving the second frequency f2 self sensor signal, the third frequency f3 pen sensor signal is received or sensed on all rows and columns, transmitted of course from a pen used with the touchscreen or touch sensor. While all rows and columns are shown employed in the depicted method, at a minimum not all rows or columns have to be used to perform the method. A sub-group may be selected, or a group of all rows and columns.

Figure 13:
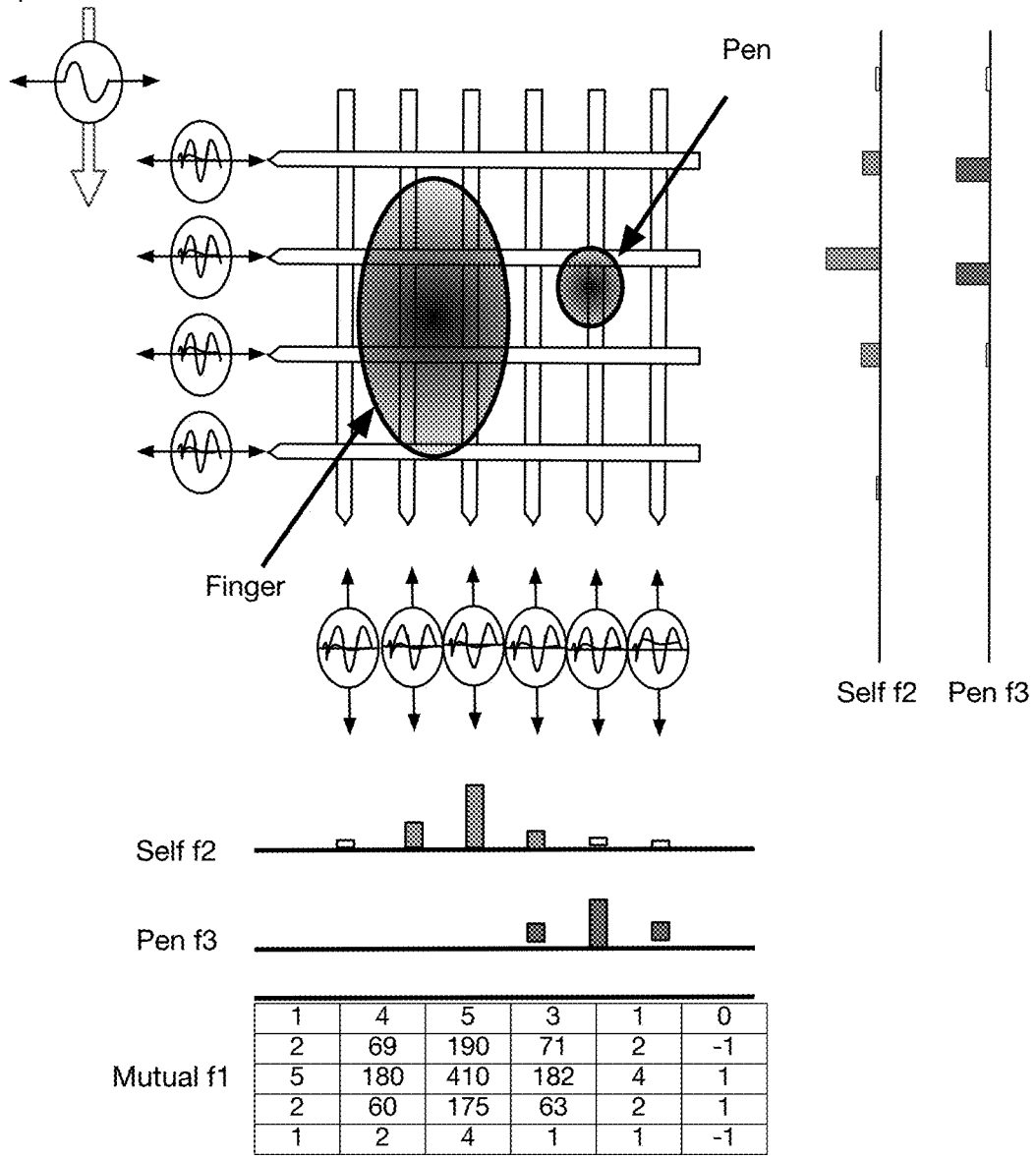
FIG. 13 is a diagram showing the resultant signal energies from both human contact and the pen digitizer which are all sampled in the same 5 mS frame.
Figure 14:
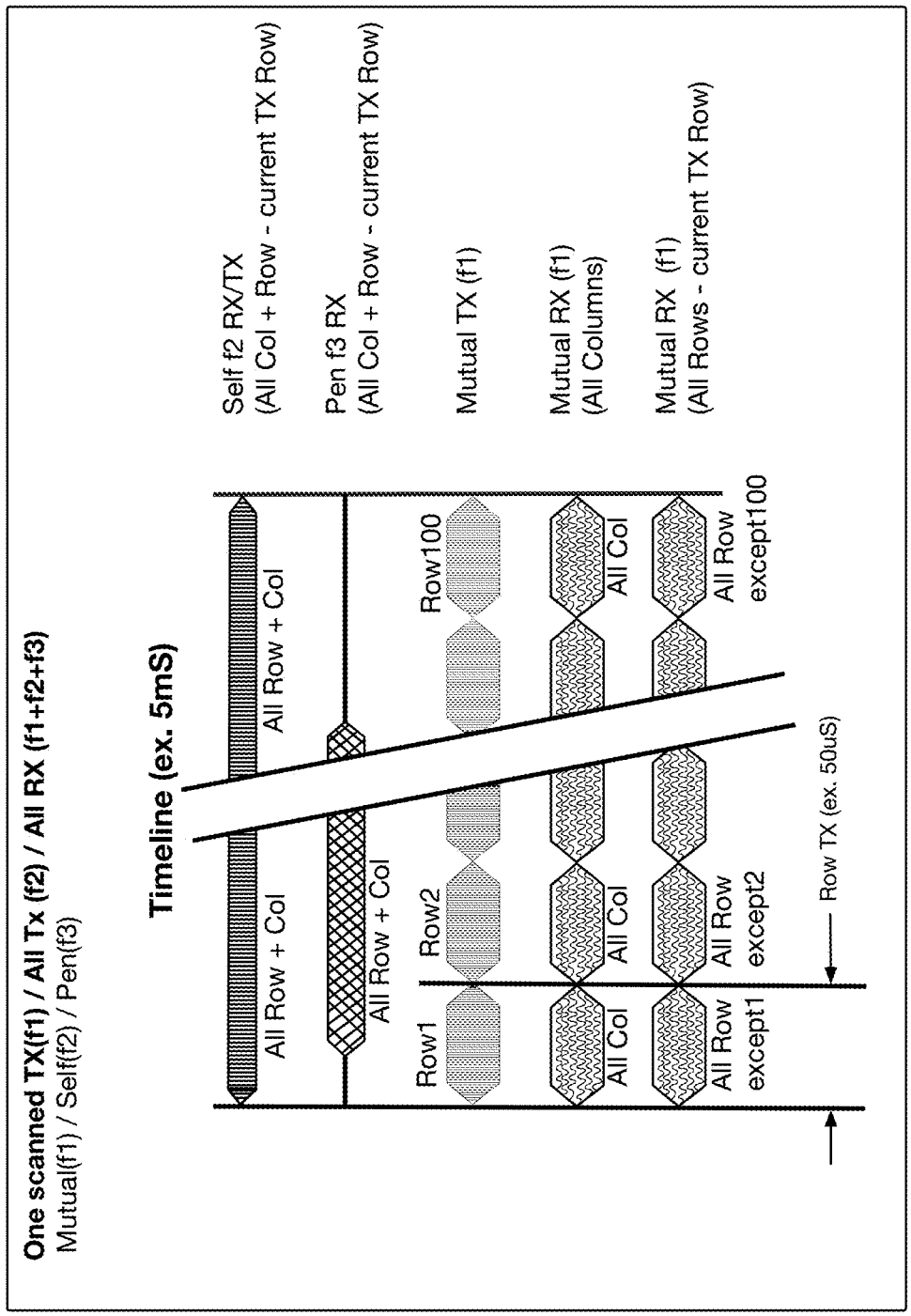
FIG. 14 is a timing diagram showing a single capture frame with simultaneous Self, Pen, and Mutual scan for FIG. 13.

FIG. 4 is diagram showing an embodiment of a simultaneous drive method with a multi-mode state (Self+Receive+Mutual Scan), and indicating in notes the different pin configurations capable of achieving such. As shown by reference to the symbol legend, the first frequency f1 mutual analog sensor signal is scanned over successively over each row 302, preferably at a 5 ms total cycle, and received at all the rows 302 and columns 304 except the one currently transmitting. When the depicted scan cycle reaches a row, the drive receive circuitry in that row changes modes to transmit the f1 mutual sensor signal. This f1 mutual scanning process may, of course, be done with the columns rather than rows, as their orientation is not important. The scanning process starts again at the first row when the last row is completed. The second frequency f2 self-sensor signal is transmitted and received/sensed on all rows and columns simultaneously except the one currently transmitting. Finally, the third frequency f3 pen sensor signal is received on all channels simultaneously except the one currently transmitting. FIGS. 13 and 14 also describe this signaling scheme. FIG. 13 is a diagram showing the resultant signal energies from both human contact and the pen digitizer which are all sampled in the same 5 mS frame as used in the example timing scheme for FIG. 4. As with the other drawings, the particular time period is not limiting and other time periods may be used. FIG. 14 is a timing diagram showing a single capture frame with simultaneous Self, Pen, and Mutual scan for FIG. 13. As can be seen in FIG. 13, the sensing of the f2 frequency self-signal provides data stored in a two-dimensional formal, with one dimension being the location from which the data is sensed, along the columns as shown on the bottom, and the other being the signal magnitude of the data point. More such 2-dimensional data is received from the rows as shown on the Self f2 data set to the right of the array. The size of the bar for each data point represents the signal intensity. The sensed Selff2 data points show touches on the touchscreen as indicated by the finger touch shown at the large oval on the array. Similarly, 2-dimensional data is received for the Pen f3 frequency, with the received pen data shown for the columns marked Pen f3 and showing a spike where the pen is depicted placed on the touchscreen. The rows also receive a data spike as seen in the Pen f3 data along the right side of the figure, the data spike centered around the depicted pen location. As discussed above, the Pen f3 data represents a signal generated on the pen and coupled into the sensor array, typically capacitively coupled, such that the closest rows and columns to the pen receive a stronger signal while most rows and columns will not detect a signal. Finally, in FIG. 13, the data detected through sensing the f1 mutual analog sensor signal is provided as a 3-dimensional array, because each detected signal magnitude has a row and a column location associated with it, which are the row (or column) for the active mutual TX line when the data point is detected, and the column (or row) at which the data point is detected. The third dimension is the magnitude of the signal, providing a three dimensional data array like the Mutual f1 array depicted at the bottom of FIG. 13. One benefit of the drive/receive circuit designs provided herein is that they allow the third frequency f3 pen data to be received simultaneously using the same circuitry employed to sense self data and mutually coupled data. Typically, previous systems either required a separate array to detect pen data or need to switch the circuitry to a pen mode, not sensing self or mutual data, to detect the pen, and then switch back to sense touch from one of self or mutual signals, in a continuous cycle. As shown in the timing diagram of FIG. 14, the depicted signaling process is shown for a 100 row touchscreen or touch sensor over an example cycle period of 5 ms. As shown in the top row of the timing diagram, all rows and columns may receive the self sensor signal on f2 continuously, except the currently transmitting row "current TX row" on which the Mutual TX signal on the first frequency f1 is transmitted. The next row of the timing diagram shows that all rows and columns, minus the currently transmitting mutual row "Mutual TX" again, may receive the pen signal Pen f3. The pen timing diagram is shown as filling less than all of the time scale depicted because the pen signal is not always received, only when a pen is near or touching the touchscreen or touch sensor.

Still referring to the timing diagram of FIG. 14, the next row labeled Mutual TX (f1) shows the mutual signal being transmitted on each row by sequentially scanning it down the rows from row 1 to row 100. The example time period on each row is given as 50 uS. The row below shows that the mutual signal reception (sensing) is done on all columns, to receive any mutual signal coupled through to any column by touch on the touch sensor, and the row below that shows the mutual reception is done on all rows except the row on which the mutual signal is transmitted. While the depicted scheme scans the mutual analog sensor signal over all the rows, of course the columns could be scanned instead or both rows and columns could be scanned in sequence: Further, less than all of the rows or columns might be scanned with the mutual signal in any particular control scheme. A group may also be selected of less than all of the rows and columns to transmit and sense the self signal. A method of driving and receiving signals to and from a multi-touch sensor generally includes (a) for each of a first group of electrodes comprising row or column electrodes of the multi-touch sensor, sequentially scanning a mutual analog sensor signal through the group of electrodes by feeding it to respective sigma-delta D/A converters connected to the respective electrodes, the mutual analog sensor signal comprising a first frequency; (b) while performing (a), for each of a second group of electrodes comprising row electrodes or column electrodes of the multi-touch sensor, simultaneously driving a self analog sensor signal through a sigma-delta D/A converter onto pins coupled to the respective row electrodes or column electrodes, the respective self-capacitive analog sensor signals comprising a second frequency or a data pattern modulated at a second frequency; (c) for each of the second group of electrodes used in (b), simultaneously sampling touch sensor data for at least two different modes of self and mutual, the touch sensor data comprising sensed altered sensor signals at the first and second frequencies, altered by the impedance of the row or column electrodes.

FIG. 5 is an embodiment of a simultaneous drive method showing a multi-mode state (Receive+Mutual Scan) and indicating in notes the different pin configurations capable of achieving such. As with the above versions, the first frequency f1 mutual analog sensor signal is scanned over successively over each row 302, preferably at a 5 ms total cycle, and received at all the rows 302 and columns 304 except the one currently transmitting. When the scan cycle reaches a row, the drive receive circuitry in that row changes modes to transmit the f1 mutual sensor signal. The rows and columns may, of course, be interchanged. The scanning process starts again at the first row when the last row is completed. The third frequency f3 pen sensor signal is received on all channels simultaneously with receiving the first frequency f1 sensor signal, except on the channel currently transmitting. As discussed above, at a minimum the method is performed by selecting groups of more than one electrode, which may include all electrodes. The method is generally described with the steps of or each of a first group of electrodes comprising row or column electrodes of the multi-touch sensor, sequentially scanning a mutual analog sensor signal through the group of electrodes by feeding it to respective sigma-delta D/A converters connected to the respective electrodes, the mutual analog sensor signal comprising a first frequency. While scanning the f1 mutual sensor signal, for each of a second group of electrodes comprising row electrodes or column electrodes of the multi-touch sensor, the method senses touch sensor mutual data, the touch sensor mutual data comprising sensed altered sensor signals at the first frequency, altered by coupling between the row and column electrodes. The method may further include, simultaneously to the sensing of the mutual data, for each of the second group of electrodes, the method simultaneously samples a pen analog sensor signal transmitted from a pen at a frequency different from the first frequency using the same A/D converter performing the mutual sensing. The simultaneous sampling may be performed by a voltage following sigma delta A/D converter integrated with each sigma-delta D/A converter driving the respective row or column electrodes, the voltage following A/D converter having a comparator with a first reference comparator input and a second comparator input, the second comparator input connected to the sigma-delta D/A converter output. Generally, the circuit of FIG. 7 may be used or any of the circuit embodiments identified in FIG. 5, or other suitable circuits may be used. The self-transmit signal not necessarily active in this particular method.

Figure 6:
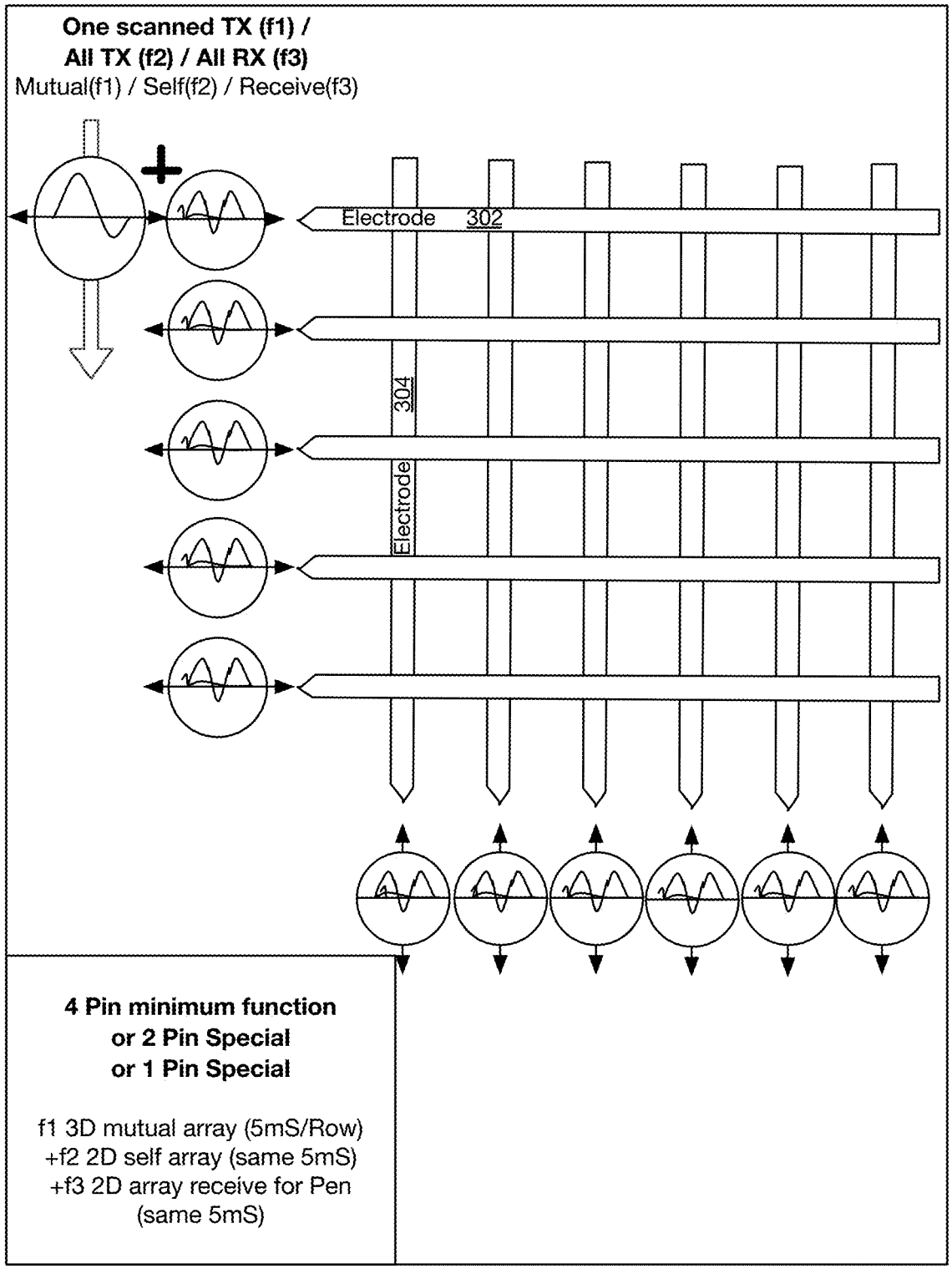
FIG. 6 is a diagram an embodiment of a simultaneous drive method showing a multi-mode state (Self+Receive+Mutual Scan) and indicating the different pin configurations capable of achieving such.

FIG. 6 is a diagram of an embodiment of a simultaneous drive method showing a multi-mode state (Self+Receive+Mutual Scan) and indicating the different pin configurations capable of achieving such. FIG. 6 shows full signal function with all modes of mutual and self, and receive active. As shown by the symbols and their legend, the first frequency f1 mutual analog sensor signal is scanned over successively over each row 302, preferably at a 5 ms total cycle, and received at all the rows 302 and columns 304 including the one currently transmitting the mutual signal. This f1 mutual scanning process may, of course, be done with the columns rather than rows, as their orientation is not important. The scanning process starts again at the first row when the last row is completed. The second frequency f2 self sensor signal is transmitted and received/sensed on all rows and columns simultaneously. Finally, the third frequency f3 pen sensor signal is received on all channels simultaneously. As discussed with respect to the other methods, groups of less than all rows or less than all columns may be employed without departing from the general methods described herein. For example, if a particular device were to not sense on particular rows or columns, but generally perform the methods herein, it would use the groups of electrodes as described herein. FIGS. 13 and 14 also describe this signaling scheme, except that for this process, the labels on the top right of FIG. 14 ofSelff2 RX/TX (All Col+Row . . . ) should not exclude the currently transmitting row as done with regard to FIG. 4, because the circuit arrangements listed (4 Pin minimum function, 2 Pin Special, and 1 Pin Special of FIGS. 9-11) allow control of the circuit modes to receive the self f2 and pen f3 signals on all rows, even that currently transmitting the mutual signal. It is understood for all of these schemes that the rows and columns may be switched, and non-traditionally shaped arrays may also be employed with the circuitry and schemes described herein.

Figure 15:
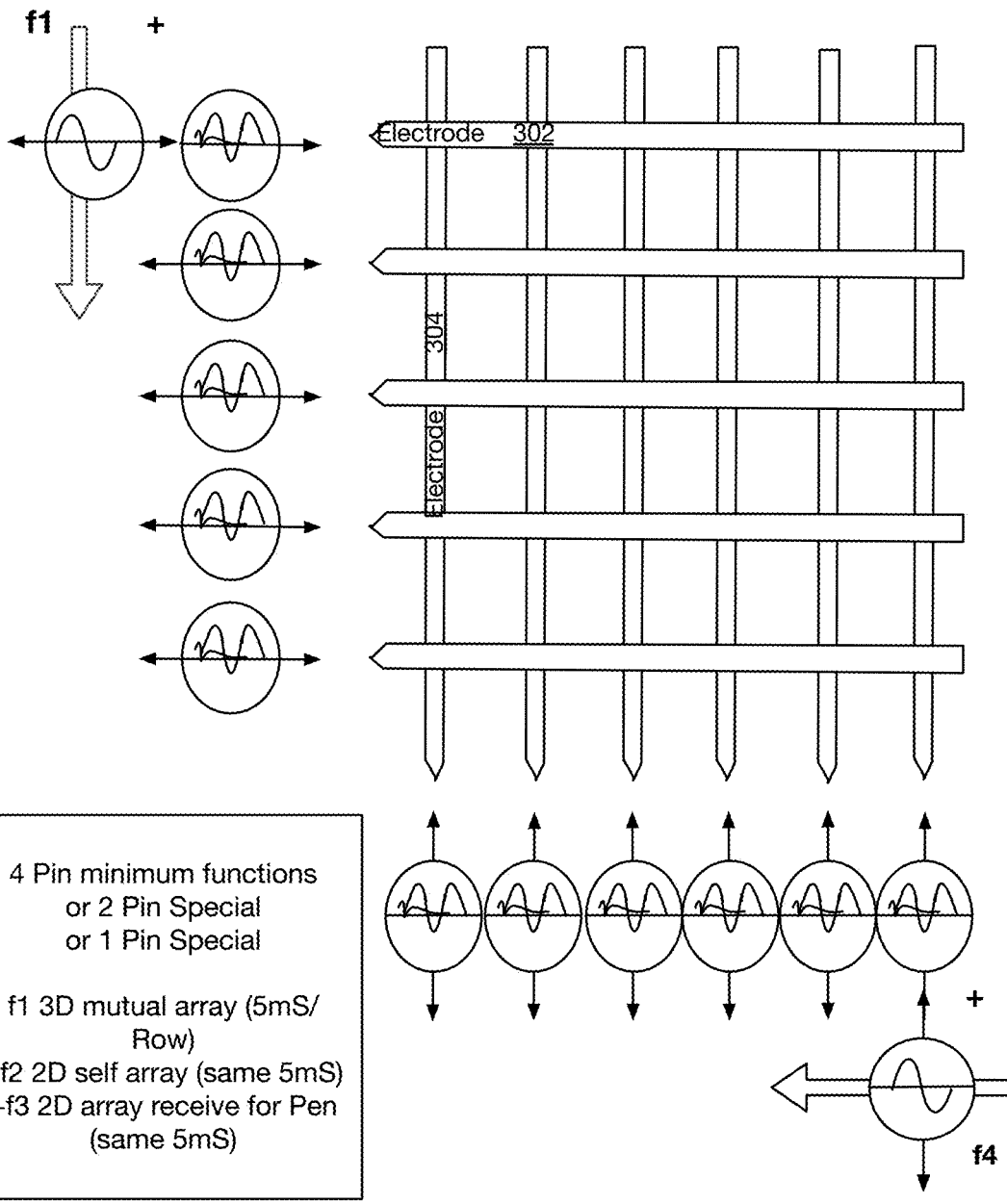
FIG. 15 is diagram showing an embodiment of a simultaneous drive method showing a multi-mode state (Self+Receive+Dual Mutual Scan) and indicating the different pin configurations capable of achieving such.

FIG. 15 is diagram showing an embodiment of a simultaneous drive method showing a multi-mode state (Self+Receive+Dual Mutual Scan) and indicating the different pin configurations capable of achieving such. The depicted method employs a dual axis scan scheme where operation during independent mutual capacitive mode or simultaneously with other sampling and driving modes can be achieved. The scan uses an additional fourth frequency for an independent mutual scan that is conducted simultaneously to the f1 mutual scan. For example, TX (transmit f1) on rows 302 and RX (receive f1) on Columns 304. TX mutual frequency f4 on Columns 304 and RX mutual frequency f4 on Rows 302. While these independent mutual scans proceed, the self analog sensor signal at frequency f2 is transmitted and sensed on all the rows and columns, and the pen signal is sensed on all rows and columns. It is understood that the same drive/receive circuitry is configured in its different modes to perform the mutual scan as it cycles through each particular row. Generally, the method can proceed with less than all rows or columns in some situations, and includes for each of a first group of electrodes comprising row or column electrodes of the multi-touch sensor, sequentially scanning a mutual analog sensor signal through the group of electrodes by feeding it to respective sigma-delta D/A converters connected to the respective electrodes, the mutual analog sensor signal comprising a first frequency. While doing so, the method for each of a second group of electrodes comprising row electrodes or column electrodes of the multi-touch sensor, simultaneously drives a self-analog sensor signal through a sigma-delta D/A converter onto pins coupled to the respective row electrodes or column electrodes, the respective self analog sensor signals comprising a second frequency or a data pattern modulated at a second frequency. For each of the second group of electrodes, the method simultaneously sampling touch sensor data for at least two different modes of self and mutual, the touch sensor data comprising sensed altered sensor signals at the first and second frequencies, altered by the impedance of the row or column electrodes. For each of the first group of electrodes and the second group of electrodes, the method simultaneously samples a third pen analog sensor signal a third transmitted from a pen at a third frequency different from the first and second frequencies. To accomplish the dual mutual scan, the method performs for each of the rows or columns that are not driven with the mutual analog sensor signal f1 (in this diagram, the columns), scanning a second mutual analog sensor signal sequentially through respective sigma-delta D/A converters onto pins coupled to the respective row or column electrodes, the second mutual analog sensor signal at a fourth frequency different from the first and second frequencies and different from a third pen frequency if a pen frequency is employed in the method. Then for each of the for each of the rows or columns that are driven with the f1 mutual signal, the method simultaneously samples touch sensor data for at least two different modes of self and mutual, the touch sensor data comprising received altered sensor signals at the second and fourth frequencies. The method may accomplish the simultaneous sampling using a voltage following sigma delta A/D converter integrated with each sigma-delta D/A converter driving the respective row or column electrodes, the voltage following A/D converter having a comparator with a first reference comparator input and a second comparator input, the first reference comparator input receiving the self analog sensor signal and the second comparator input connected to the sigma-delta D/A converter output. The two mutual signals may be added when the mutual mode is activated in the cycle by switching or coupling in the mutual signals in the manner shown in the various drive/receive circuit diagrams. The f4 mutual signal is generated digitally and may be fed to multiple channel drivers similarly to the f1 mutual signal as described in the various embodiments.

Figure 12:
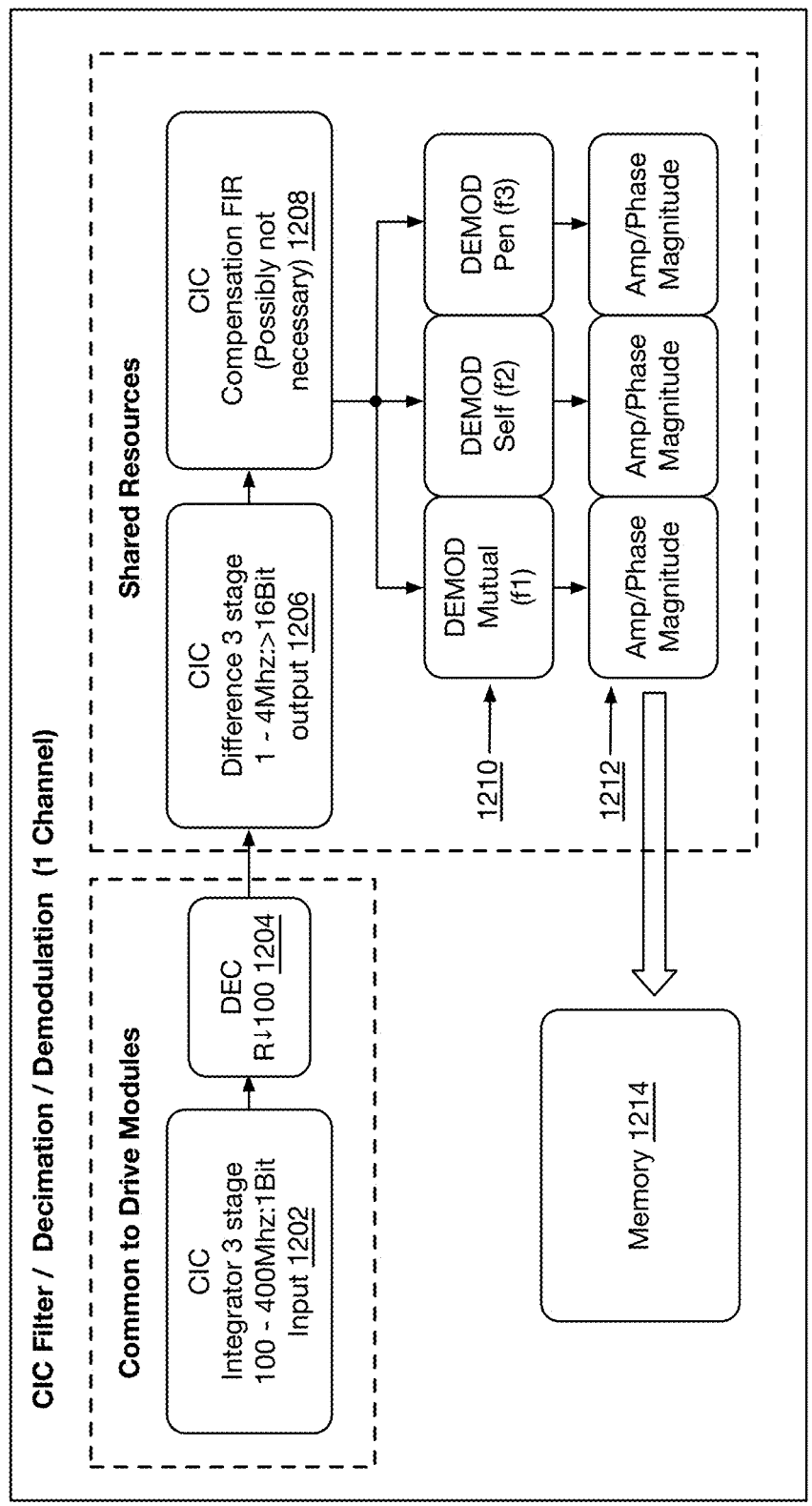
FIG. 12 is a block diagram showing an embodiment of a CIC (cascaded integrator-comb) Filter/Decimation/Demodulation/Amp/Phase sample chain showing resolution of three different simultaneous frequencies representing three separate modes of touchscreen function.

FIG. 12 is a block diagram showing an embodiment of a CIC Filter/Decimation/Demodulation/Amp/Phase sample chain showing resolution of three different simultaneous frequencies representing three separate modes of touchscreen function according to some embodiments. The received signal from the comparator output is passed to filter and decimation block, which in this version is implemented with CIC (cascaded integrator-comb) filtering, at least at the initial filtering stages. At block 1202, the filtering process starts with a CIC integrator, followed at block 1204 with a decimator reducing the sample rate to 1 to 4 Mhz. Next at block 1206, a CIC decimator is provided if necessary to remove DC components of the signal. At block 1208, a compensation FIR is provided if necessary to compensate for the effects of prior CIC filtering, such as passband droop and wide transition region.

The resulting data is sent to blocks 1210 where the signals are Quadrature Baseband Demodulated and the generated IlQ data is sent to blocks 1212 where Amplitude, Phase, and Magnitude are calculated and may be further filtered and decimated before being sent to Memory 1214 for storage and further DSP processing if necessary. The changes to the Amplitude, Phase, and Magnitude over time for each signal are then used to determine the presence of objects interacting with the sensors such as fingers or pens. Typically the Self (f2) signals change by very small phase shifts, and Mutual (f1) and Pen (f3), received signals, change in amplitude. While quadrature baseband demodulation is described here, this is not limiting and many other suitable demodulation schemes may be used to extract the sensed signals in a form usable by the system to interpret touch.

Figure 16:
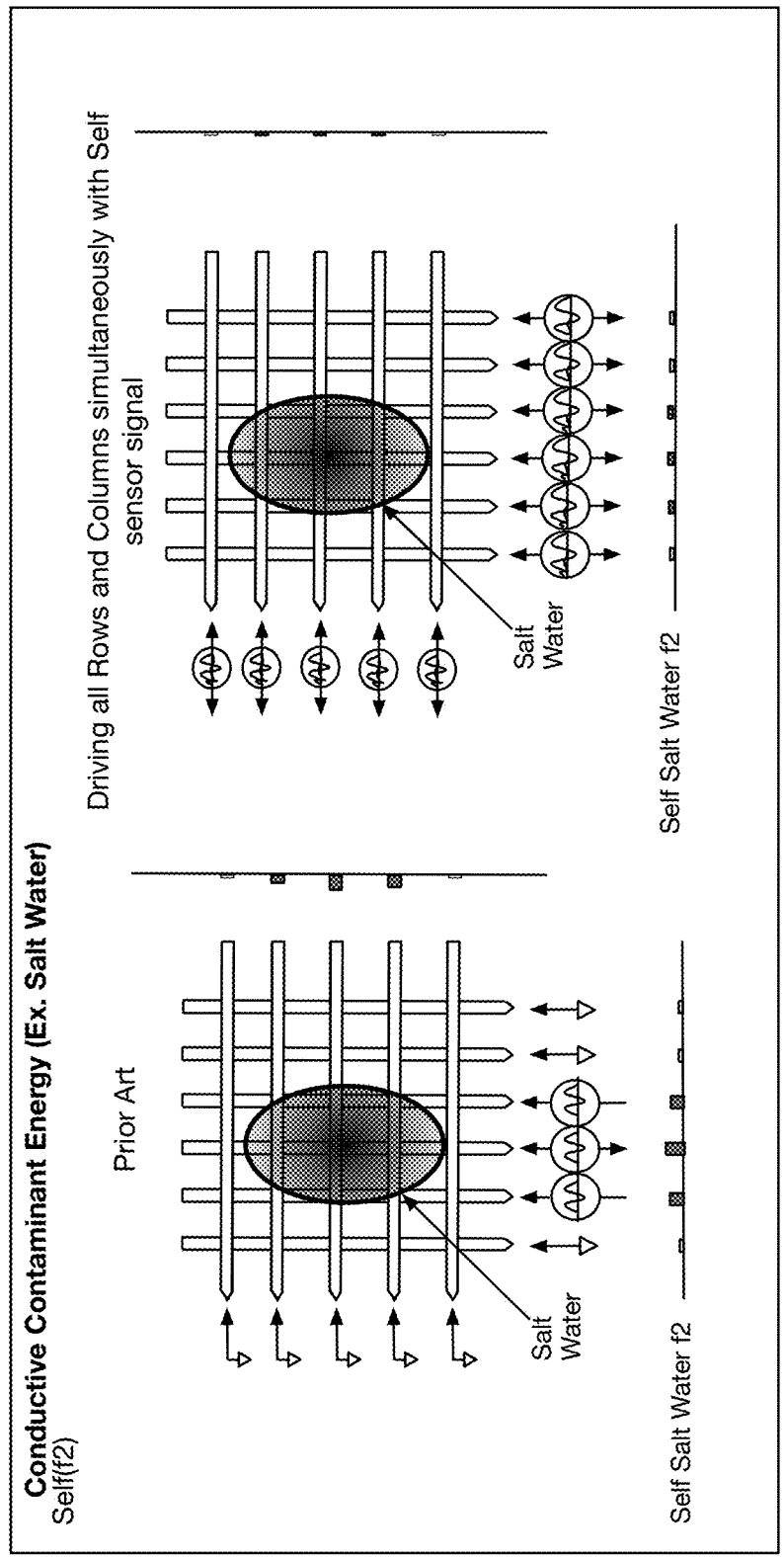
FIG. 16 is a diagram showing prior art self capacitance measurement with shielding elements and the same measure made on a system of the current invention with all electrode elements simultaneously driven.

FIG. 16 is a diagram showing prior art self capacitance measurement with shielding elements and the current invention with all electrode elements simultaneously driven. One significant advantage of the circuits herein may be observed on the figure, in that the noise caused by a conductive contaminant present on the touch sensor is greatly reduced when all rows and columns in the sensor array are driven as the circuits and methods herein enable.

Referring back to the system block diagram of FIG. 1, and the block diagrams of the pen system of FIG. 24 and FIG. 36, the systems includes several functional blocks that one of ordinary skill in the art can implement after appreciating this specification and the construction directions below.

Dither Generator:

Some embodiments of the invention use the same dither on all channels as a method of achieving very similar sampling of system and external noise or alternately introducing a simple delay for each channel to allow for controlled same dither or semi-random dither generation.

A single dither signal generator may be used to supply a dither signal all the driver channels of the device. In some cases and modes, it may be beneficial to set all the dither signals to the same instant value so as to improve simultaneous sampling external noise recognition but in some cases having semi-random dither between channels could prove beneficial. Where the dither mixing occurs in the channel driver (a non-common dither source), a simple register delay scheme of only four positions allows enough differentiation from channel to channel.

Some embodiments of the invention provide improved resolution via use of shaped dither in combination with the continuous low frequency and low amplitude self-capacitive signal used as a reference to overcome hysteresis and quantization on the self-capacitance mode signals as well as other signals of interest such as the mutual capacitance receive and or pen receive signals.

In the Sigma Delta Analog to Digital Converter, dither noise is used to improve resolution and to overcome inherent hysteresis in the digital 1-bit ADC input or comparator. In current hardware this could be as low as 30 m V and or as high as 200 m V. Without dither the hysteresis will cause reduced resolution due to quantization caused by the DAC portion of the SD ADC having to charge the RC filter beyond the value required to match the reference voltage to the point where the hysteresis threshold is overcome—this process must then have to be reversed and the RC voltage must be discharged to pass the lower hysteresis bound. This creates a stair stepped "quantized" response.

Adding dither is a way of introducing a known noise to the system that is easily removed by subsequent filtering. Dithering effectively moves the signal randomly closer to the upper or lower hysteresis threshold so the true signal can trip the upper and lower threshold in a more average way. Using a continuously changing analog signal of low frequency and low amplitude also achieves this effect to some extent. By using dither in combination with a continuous frequency of low amplitude (ex. 30 m V to 300 m V) even large hysteresis can be overcome for other low amplitude signals of interest while allowing for all-self measurement at the continuous frequency.

Figure 17:
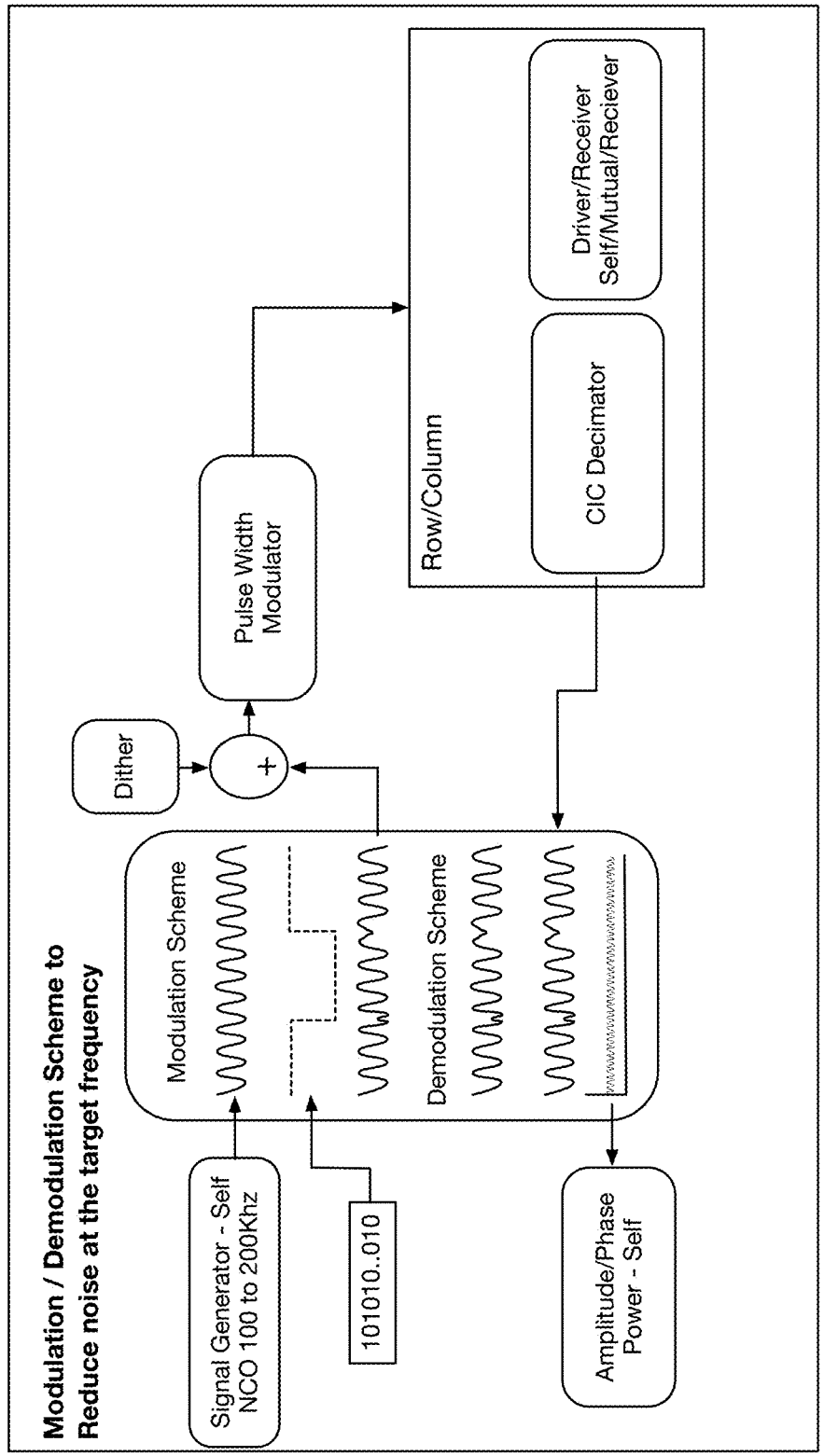
FIG. 17 is a diagram showing a phase modulation scheme to reject continuous interfering signals at the target frequency.

Advanced Modulation Schemes:

Some embodiments of the invention use well known modulation schemes, such as PSK, but directed in a novel way towards removing coherent interfering signals at the same frequency as the driving frequency. For example, FIG. 17 depicts a PSK coherent synchronous demodulation: A single frequency signal may be generated with a numerically controlled oscillator (NCO) and passed through a 50% duty cycle 180 deg phase shift modulation. This signal is dithered and then driven to touch sensor electrode as a self analog sensor signal according to the techniques herein. The recovered, or sensed, self signal is be filtered and decimated, and demodulated against the 50% duty cycle 180 deg phase modulation to produce a baseband continuous non-phase modulated signal. The single frequency is recovered with the benefit of now having any coherent interfering signal at the same frequency reduced or highly rejected.

As another example, an FSK coherent synchronous demodulation scheme may be used instead: A dual frequency signal may be generated with a 50% duty cycle. The recovered signal can be filtered and decimated and demodulated against the 50% duty cycle to produce a baseband continuous single frequency (DC) signal; the single frequency is recovered with the benefit of now having any coherent interfering signal at the same frequency reduced or highly rejected.

Figure 18:
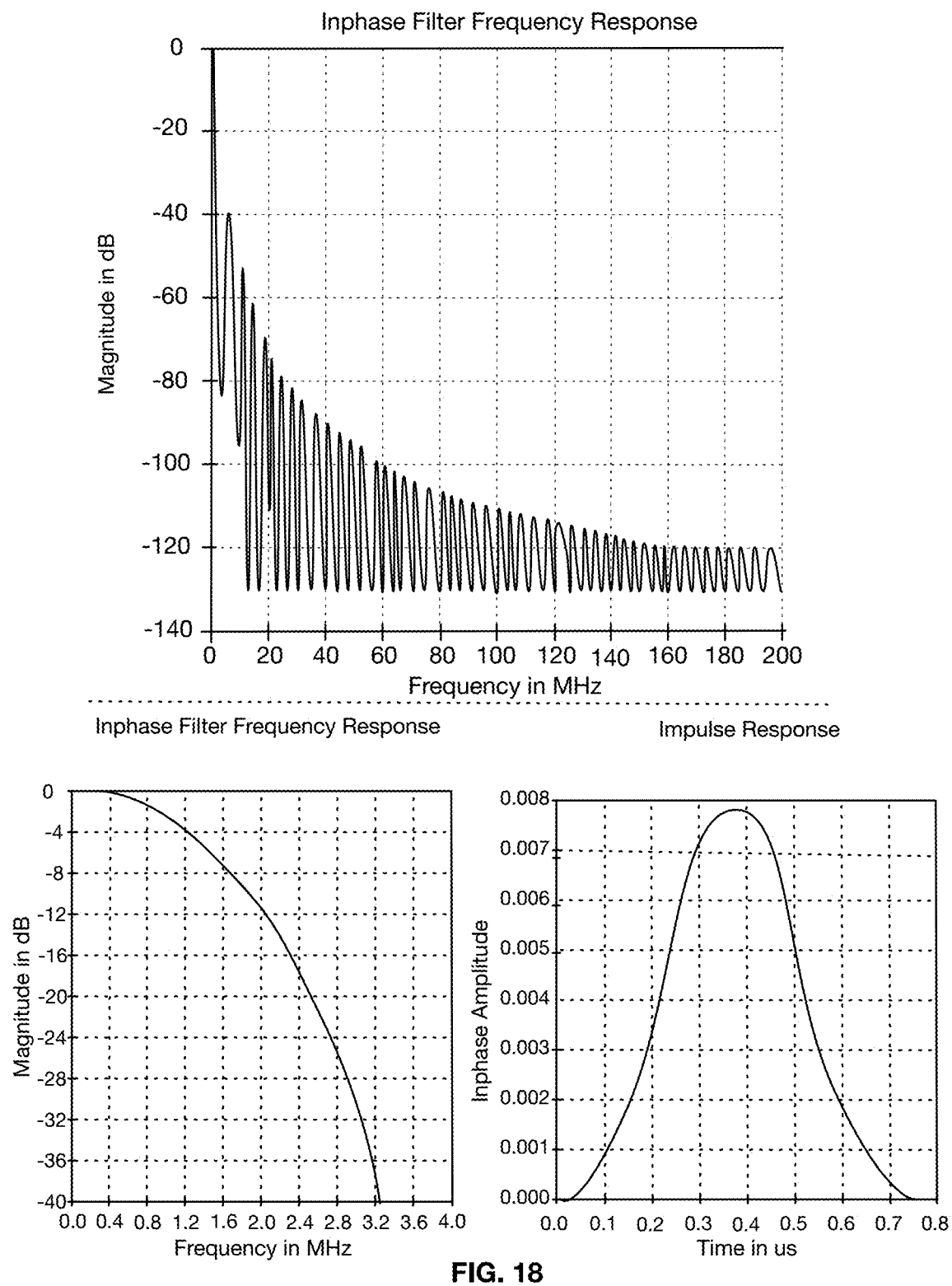
FIG. 18 is a 3rd Order, 400 Mhz, 100 decimation CIC filter.

CIC Decimator:

In an example version of the CIC decimator filter, the signal from the channel driver is converted from a 1-bit high frequency signal to a much lower frequency high resolution signal, filtered, and decimated with the CIC filter (example capability and speed as shown in FIG. 18). Decimation down ratio range of 400:1 to 100:1 will develop a final signal of 1 to 4 MHz and resolution of 14 to 16 bits per sample. These values can be adjusted to improve resolution, sample speed, and power consumption. The decimated channel signal contains the different mode signals (self-capacitance signal, for example at 200 KHz, Mutual capacitance signal, for example at 100 KHz, pen receive signal, for example at 150 KHz, and also unwanted noise signals) and these signals have to be broken out into their respective paths and further processed.

Phase and Amplitude Detector:

While many well-known methods exist for determining the phase and amplitude of a signal and picking a specific signal out of a grouping of signals (IQ demodulation being the most technical), for the purpose of this description and for simplicity the Goertzel method suffices to resolve the phase and amplitude of for each signal on a frame by frame basis. In various implementations, the Goertzel method can be modified to handle the advanced noise reduction modulation scheme described above but may be limited where for example an electrostatic pen is sending digital information using FSK, PSK, amplitude, or phase modulation, or timing between signals is concerned. Capturing this digital data will require a more advanced scheme on the pen signal path. These schemes are well understood in the industry.

Sequencing Generator:

To allow for different configurations of touchscreens to be driven and the resulting data to be mapped into memory in a known and controlled manor, a method of configuration is required that allows any driver channel to be placed into any drive order and also the resultant data to be mapped into a known area of memory such that the procedures required for the higher level blob (large noisy touchscreen contact) tracking can access the memory in an optimized and systematic way that does not require the customization of code or drivers for different size and shape sensors. This typically requires configuration arrays, a definition of how the resultant data will be mapped in memory, and definition of how and when the sensor array will be driven.

Configurable Memory Mapped Area:

The Memory Array block includes memory to store configuration arrays, resultant 2D and 3D signal levels arrays, buffer arrays, filter result arrays, and calibration arrays.

Filter Module:

To automate the repetitive tasks such as base line calibration subtraction, normalization, and filtering, the filter module works during frame data receipt and or between frames to process the received data. Processing the columns data just after completion of the row drive in the case of mutual capacitive is ideal as long as the filter processing does not interfere with the memory access of the next line of received data. Advanced memory access schemes can be used to prevent simultaneous access problems or a buffer scheme can be used to alter data in one buffer while the next buffer frame is filled.

Processor System:

Well understood and common knowledge in the field. As depicted in FIG. 1, any suitable processor core for an ASIC or FPGA may be used in various implementations.

Filter Methods:

The novel methods of noise removal herein using the simultaneous sampled data including noise, are directed towards removing coherent or spurious interfering noise signals in the touch data through the identification and removal of the noise which appears as common mode proportional changes in the sampled data.

Subtraction of common mode proportional noise in the touch data on a pCap (Projected Capacitive) sensor is a technique only possible due to the simultaneous sampling characteristics of the present invention. A user touching the system can act as an antenna and inject noise into the system. Alternately, the user may effectively act as drain to a common mode noise on the system. It is impossible to tell the difference, because the noise is only seen at the touch location and the noise is proportional to the touch energy. A hard touch typically causes the highest capacitive coupling at the center of the touch due to the curvature of a finger and the pressure applied. The finger can be thought of as a low impedance source or sink for the noise. A touch measurement at the side of the finger may have half the touch energy as a touch measurement in the center due to capacitor plate area and distance. The noise on the center reading may have a SNR of 10 and the side reading will also have a SNR of 10.

If the touch readings are randomized or split in time or demodulation method, there will be no possibility of knowing the touch energy to noise energy at any instant of time, only the average noise over time. The self-capacitive signal mode of the present invention samples all the rows and columns at the same time using the same modulation scheme and filtering so all of the rows and columns will show an impulse of noise as a plus or minus to the touch profile energy. The mutual capacitance signal mode is a line scan (row) mode with simultaneous alternate line (columns) receive so all of the alternate lines (columns) will show an impulse of noise as a plus or minus to the touch profile energy under the driven line (row). Using both self and mutual data the noise change from frame to frame can be identified and directly reduced via linear or non-linear techniques.

FIG. 19 is a simple simulated example of the drive channel signals showing the drive, dither, and following (sensed) signals. Depicted are the self drive signal 1902, the mutual drive signal 1904, a Low Frequency Dither signal 1906, the sum of these signals that is driven to the reference following node of the driver, the virtual signal node, S+M+D 1908, and the resultant sigma-delta following signal 1910 which represents the drive/receive circuit's sampled sensor signal as is it is driven by the sigma-delta following circuit onto the sensor electrode.

Electronic Pen Input

Some embodiments provide a positioning system capable of operating in combination with a pen enabled multi-touch system (such as described with respect to FIG. 1) or decoupled from the multi-touch system operation as a standalone relative input device for cursor control and erase functions.

Some embodiments of the invention provide an advanced multi-axis sensor mechanism capable of use with pressure, strain, or electrostatic measurement systems and methods of driving and sampling using a digital sigma-delta type voltage following system (for example, that of FIG. 5A) with supporting logic to simultaneously receive and emit signals internal and external to the device enabling functions such as pressure, tilt, barrel rotation, proximity, switch, slider, high resolution multi-touch zone on or under the barrel, and alternate input functions.

Several example arrangements of multi-axis sensing are described herein (for example, FIGS. 25, 26, 27, 28, and 29), which generally provide similar improved measurement of pressure, tilt, and barrel rotation, providing results such as those discussed herein (for example, with respect to FIGS. 33 and 34) achieved through use of the nib collet pivot electrode movement described below.

Figure 24:
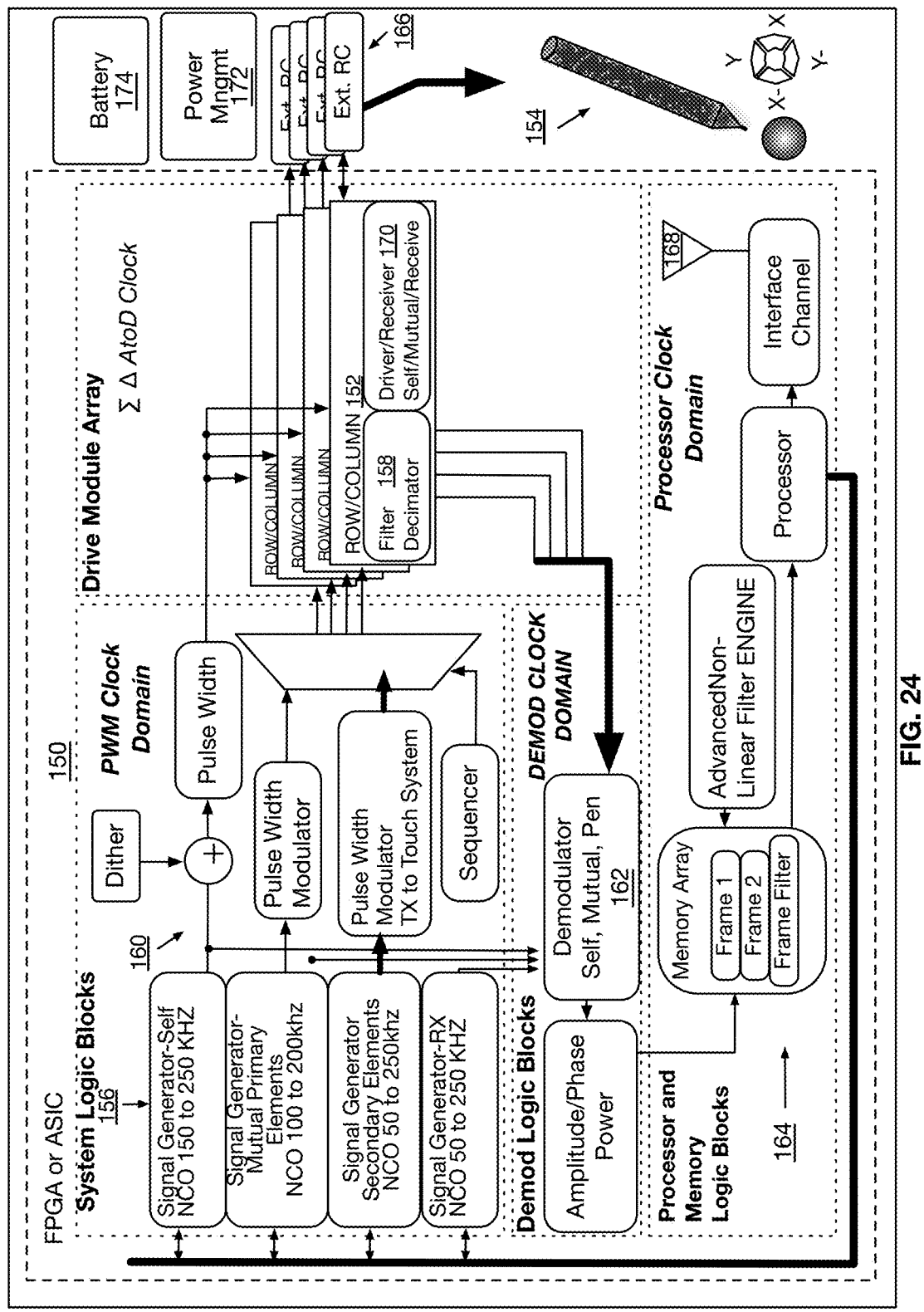
FIG. 24 is a block diagram of an embodiment of a pen control system including channel driver and receive circuitry built with digital circuitry configured to transmit or receive multiple modes simultaneously for pen pressure, tilt, barrel rotation, transmit, and receive.

FIG. 24 is a block diagram of an embodiment of a pen control system including electrode drive and receive circuitry 150 constructed with flexible programmable logic embedded in a semiconductor device which may be a pen controller chip, or may be integrated into a larger system on chip arrangement with other system functionality as well. The circuitry 150 transmits and receives simultaneously on a plurality of channels 152 to drive analog sensor signals through channel drivers 170 to the electrodes of the pen electrode apparatus 154. The electrodes of the pen apparatus are configured as asymmetrical or non-symmetrical arrangement of electrodes that cross-couple signals interior to the pen to measure pressure, tilt, and barrel rotation and exterior to interact with an enabled touchscreen system. The analog sensor signals are driven at a plurality of simultaneous frequencies 156 in accordance with some embodiments of the present invention. While four channel drivers are shown in the drawing, this is to illustrate a plurality, and the preferred versions will have as many channels as there are pen electrodes, with repeated instantiations of the drive module, including drive circuitry and receiving filters, for each channel. The diagram generally shows the digital clock domains and their functionality, the Drive Module Array, the System Logic Blocks, the Demodulation Logic Blocks, and the Processor and Memory Logic Blocks. The processor also includes program memory for storing executable program code to control and direct the various digital logic and digital signal processing functions described herein.

As can be seen in the diagram of FIG. 24, the system pen driver and sensor circuitry can be embodied in an FPGA or ASIC. Some embodiments provide a pen system FIG. 24 with flexible configuration. Some embodiments provide a pen system capable of operating almost exclusively in the digital realm, as described below, meaning that an FPGA or other reconfigurable or programmable logic device (PLD) may be employed to construct almost the entire circuit, without the need for op amps or other active external analog components, beyond the driver circuitry included in the FPGA or PLD. External resistors and capacitors for RC filters 166 are all that are needed to supplement the digital I/O circuits of an FPGA to achieve the channel drive/receive circuits in preferred embodiments. This is because of the unique use of sigma-delta converter combinations that allow the digital I/O pins to act in a way similar to analog sensor drivers. Some embodiments provide system implementation and operation in programmable logic or custom ASICs.

The other parts of the system block diagram of FIG. 24 include, generally, the low-pass filter/decimator block 158 that filters the incoming sensed signals, the system logic blocks 160, the demodulation logic blocks 162, the processor and memory logic blocks 164 and radio 168, the power management system 172, and battery system 174 are further described herein. Most of the benefits of the improved pen electrode driving circuitry and control schemes come from the design of the drive/receive circuit itself, and the use of it to drive and receive different types of signals in a flexible and reconfigurable manner. Preferably the drive/receive circuitry driving the various pen electrode channels is embodied in a digital device and drives and receives signals using digital I/O drivers and receivers, but in some versions analog amplifiers or other analog components may be employed with the signaling schemes described herein.

The components of the system block diagram FIG. 24 are substantially similar to the components of the touchscreen system diagram of FIG. 1 and the associated supporting figures and descriptions above.

Figure 25:
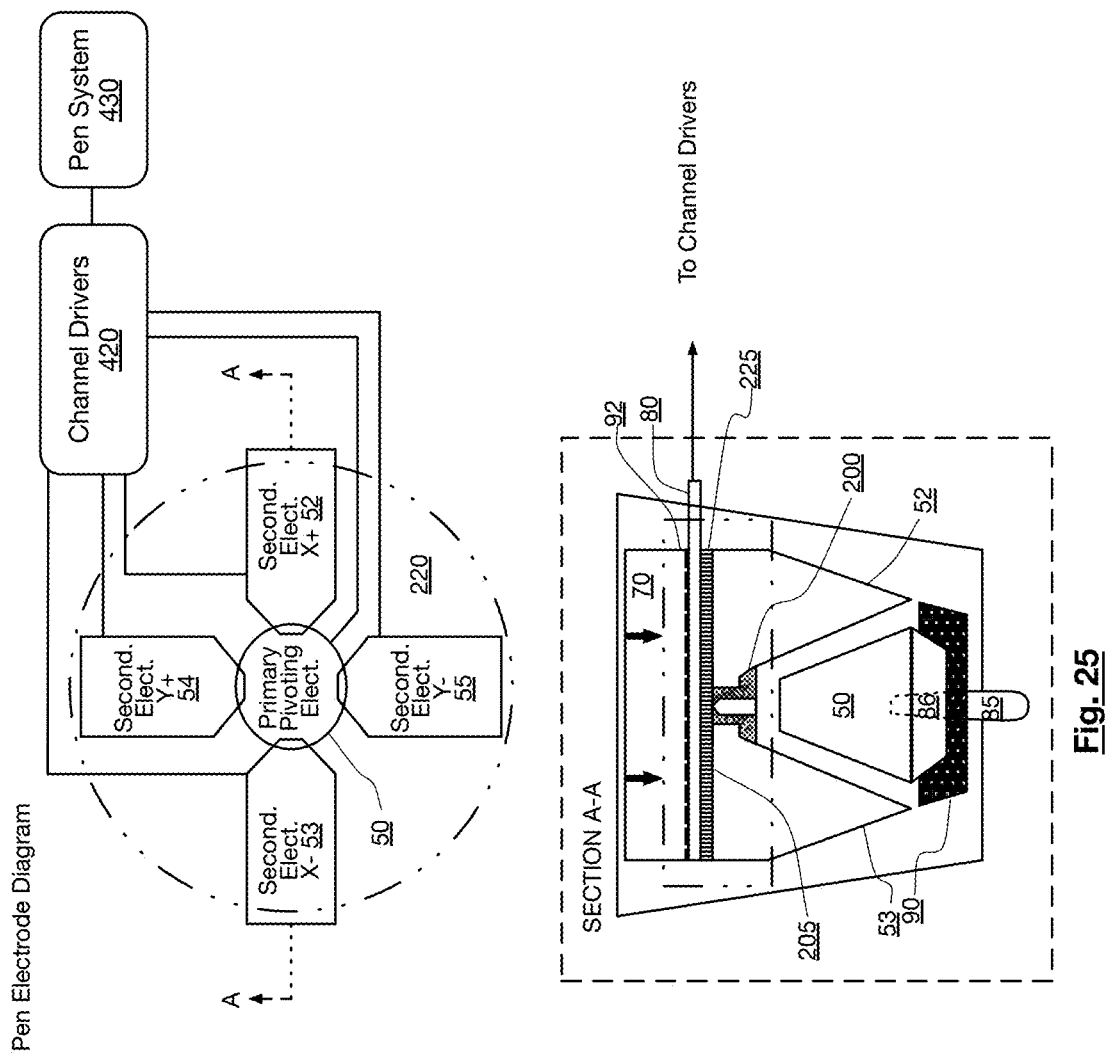
FIG. 25 is a diagram of an embodiment of a simplified cross section view of the pen pressure, tilt, and rotation mechanism and sensor.

FIG. 25 is a simplified diagram of a multi-axis pen electrode system with channel driver scheme according to some embodiments, with a cross section view taken along the direction A-A. Components of the generally preferred embodiments of the invention are further described below, and include the nib 85, the nib seal and front pivot damping buffer 90, the nib collet pivot mechanism (NCPM) and primary transceiver electrode 50, the secondary transceiver electrodes 52, 53, 54, 55, the pivot point 205, the rear pivot damping buffer 200, the conductive region buffer 225, the connection flex circuit 80, the compression buffer 92, assembly compression 70, and channel drivers 420. A dotted box labeled 220 identifies an area where alternate compression and connection embodiments typically occur, connection methods 220, which are described further below. The primary electrode 50 and secondary electrodes 52, 53, 54, 55 connect to channel drivers 420 and the channel drivers 420 connect to the rest of the pen system 430.

The Nib 85:

is a small diameter rod shaped piece of plastic, other material, or other suitable apparatus that contacts the writing surface. The nib is held into the collet pivoting mechanism 50 at the collet hole 86 by compressive force.

Some embodiments of the invention may use a conductive or semi conductive Nib. With high resolution orientation and tilt the small benefit of improved signal strength through using nib conductivity may not be necessary in some embodiments. Nib properties such as static and kinetic friction, and durability of a non-conductive nib might make a nonconductive nib preferred. A semi conductive Nib will bring the primary signal closer to the receiver and so the resolved location point may be closer to the expected inking location but the larger surface area of the primary electrode element and tilt interaction will bring the primary electrode element into closer and closer proximity with the receiving surface which will tend to pull the calculate position toward the centroid of the primary 'blob' as sensed on the touch sensor. So even with a conductive nib accurate positioning still necessitates correction adjustments.

The Nib Seal and Front Pivot Damping Buffer 90:

A flexible elastomer mechanism that preferably surrounds the nib and the front of the pivot mechanism and acts to seal, center, apply a back pressure against the pivot mechanism, and allows for controlled front lateral and axial movement at the nib.

Made from an elastomer such as silicon or other suitable material that remains pliable over the operating temperature range and does not overly deform over higher pressures, the shape of the buffer can vary to include more or less volume opposite the nib collet region or the durometer of the material can be altered to adjust its damping and the pivots movement properties.

The seal may extend through the opening barrel to prevent soil packing between the nib and the barrel but typically a softer composition of material would be used to keep this small regions compression properties (between the nib and the opening barrel) from dominating the pivot lateral movement property.

The Nib Collet Pivot Mechanism (NCPM) and Primary Transceiver Electrode 50:

In some embodiments, a mechanism part of the system allowing lateral and axial movement at the front and axial movement at the back side whose slight rocking movement with an appropriately shaped mechanism can be converted to a force, pressure, or if made conductive the space changes around the mechanism can be measured electrostatically. For embodiments that design the NCPM 50 to be conductive and driven appropriately this mechanism becomes the Primary Transceiver Electrode 50.

The Nib Collet Pivot Mechanism can be made from conductive metal, conductive loaded plastics, or metalized plastics or any similar durable conductive material. The pivot mechanism is formed at the tip with a collet 86 type opening capable of accepting a nib rod and holding it through a compression fit or threading. At the other end is a pivot point extension or mechanism. The pivot mechanism generally works by moving in an axial or lateral direction at the front nib end and only in an axial direction at the pivot point 205 (rear end).

The mechanism is sized so as to bring it in close proximity to the inside encasing barrel formed of plastic or secondary electrodes which surround the mechanism (see FIGS. 28, 27, 26, and 29). The distance is designed to be about twice as large as the allowed lateral movement at the nib on all sides. As lateral force is applied to the nib the mechanism pivots and the mechanism is brought closer to one side of the internal space and farther from the opposite side. In extreme cases of heavy axial or lateral applied force the spacing should change only to about half of the original value.

The spacing between the primary and secondary electrodes will change and a signal on the primary electrode passing to the secondary electrodes will change. The embodiment shown is a four electrode secondary system so an axial only force will create a plate spacing change equally to all four sensors and a lateral force will cause a rocking and will decrease plate spacing to one side and increase plate spacing at the opposite side.

The Secondary Transceiver Electrodes 52, 53, 54, 55:

In some embodiments, the secondary electrodes are evenly spaced inside barrel of the pen device and are used in some cases for internal signal and spacing measurement and also used for external signal interaction with a user or receiving system.

The secondary transceiver electrode elements interaction with the pivot mechanism is described as capacitive multi-electrode measurement. Signal interaction and external use is described in more detail in the following sections. The electrodes may be formed in the plastic but a design allowing the entire assembly of nib, front pivot damping buffer, primary electrode pivot mechanism, secondary electrodes, flex circuit, compression buffer and plate, etc. as an assembly that can be shuttled into the pen devices barrel is preferred for ease of assembly.

The Pivot Point 205:

In some embodiments, the pivot point at the back of the pivot mechanism performs the tasks of centering the pivot mechanism, preventing lateral movement, controlling axial movement, and electrical connection of the primary electrode. The pivot mechanism can be shaped to form a rounded off point or ball or can be formed of some other conductive material and inserted into a hole in the mechanism and is held under axial compression. The pointed region will connect to a conductive flex circuit through a Conductive Region Buffer 225 with a backing compression buffer 92.

The Compression Buffer 92:

In some embodiments, a shaped mechanism acting substantially as a dampening spring performs the primary tasks of secondary electrode compression connection to the flex circuit, pivot point axial movement settings via thickness, shape, and durometer, forward force compression mechanism Made from an elastomer such as silicon or other suitable material that remains pliable over the operating temperature range and does not overly deform over higher pressures, the shape of the buffer can vary to include more or less volume opposite the nib collet region or the durometer of the material can be altered to adjust its damping and the pivots movement properties.

The Conductive Region Buffer 225:

is an anisotropic silicon disk that conducts between the two flat surfaces via small columns of conductive filler allowing for electrical connection from flex conductors to the electrode elements without a hard wearable contact and also allows for compression of the pivot mechanism at the pivot point. The conductive regions may be small or sized to generally match the configuration of the electrodes and flex circuit at each side but alignment issues can be minimized with smaller conductive regions.

Connection Flex Circuit 80:

In some embodiments, the flex circuit is used to bring the signals from the pen system processing board (see FIG. 35, 570) to the primary and secondary electrode elements.

For this multi element capacitive scheme all that is needed is a method of connection between the electrode elements and the driver control mechanism. A flex circuit with electrodes that match to the secondary electrode alignment and the pivot point electrode can directly contact the flex electrodes with a compression buffer on the other side pressing the flex electrodes against the primary and secondary electrodes or a silicon disk with conductive regions may be used between the electrode elements and compression force applied to the back of the flex circuit, or both as shown in (see FIGS. 25, 26, 27) respectively.

The Compression Mechanism 92:

In some embodiments, a general mechanism for holding in the system and keeping a predetermined compressive force 70 between the internal parts.

The Channel Drivers 420, (see FIG. 24 152):

In some embodiments, the channel drivers are substantially the same as channel drivers 30 as used in the multi-touch system described above, and the various designs disclosed above or variations thereof may be used. Each channel is capable of overcoming the main problem with sigma delta modulation in a touch system such as the hysteresis in the sampling one bit A to D and capable of simultaneous transmit and receive on multiple frequencies per channel as well as measurement of impedance changes to the driven signals through amplitude and phase changes.

The channel drive mechanism and method allows for any type of capacitive or resistance sensing element configuration or method of sensing. Any change in impedance of an AC or DC driven sensor can be measured to a high degree of resolution and precision. Self or mutual capacitance measurements, independent or simultaneous, can be made to any type of electrode configuration such as sliders, buttons, pressure, touch arrays, or proximity plates. Resistance measurements are also possible so a push button switch with a resistance element could be used to measure the pressure on the switch. Near field or radio data transmission with frequencies in the hundred kilohertz range is possible as well as led modulation I/O with current feedback measurement.

The presently preferred channel driver for use with pen systems is the 2 Pin arrangement shown in FIG. 10.

Figure 26:
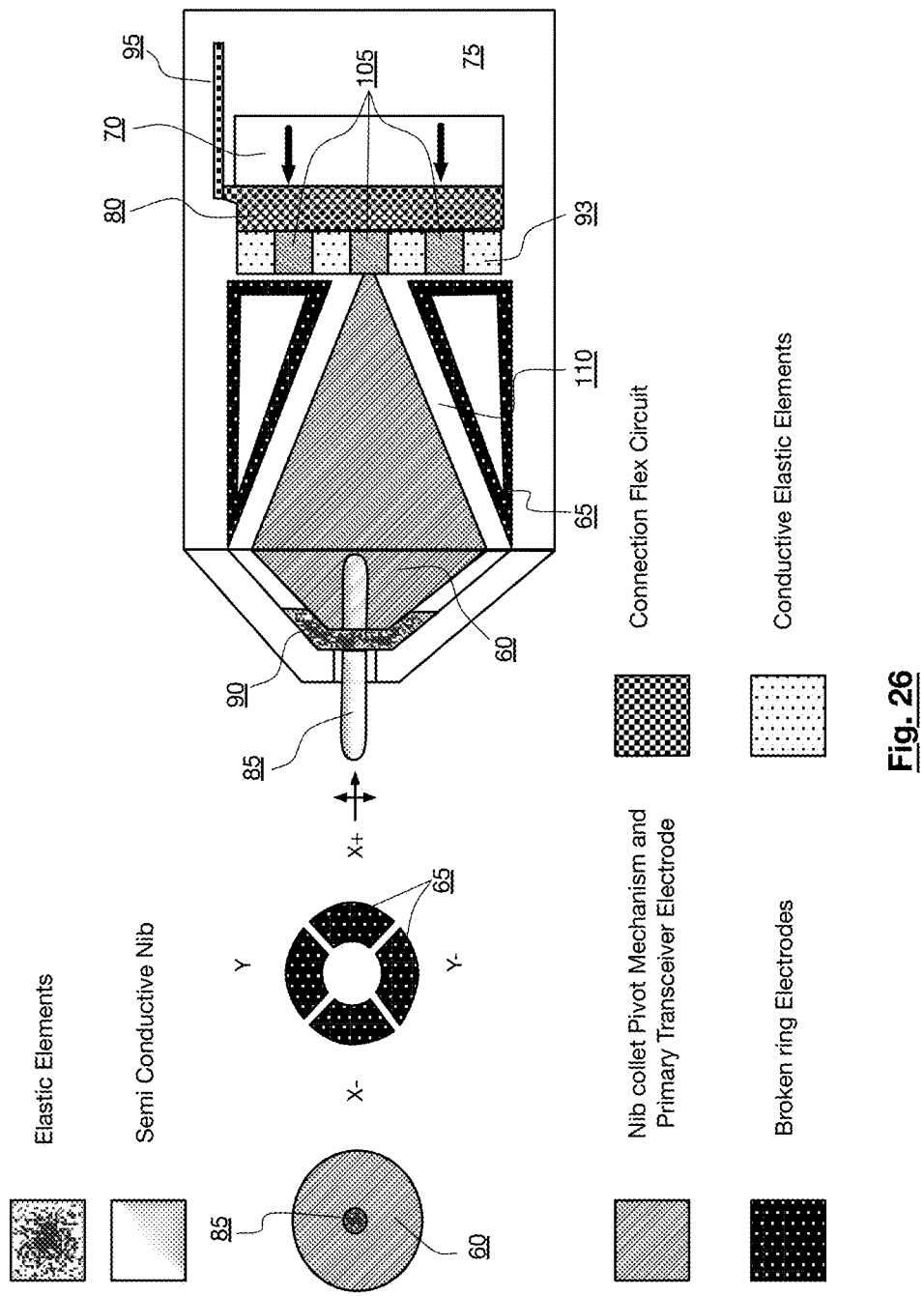
FIG. 26 is a diagram of an embodiment of a detailed cross section view of the pen pressure, tilt, and rotation mechanism and sensor created from a broken sensor ring system of four (−X, +X, −Y, +Y) electrodes used for tilt and pressure measurement with centered pivot location with connector flex circuit and method of compression and connection mechanism.

FIG. 26 is a cross section diagram of a multi-axis pen electrode system according to some embodiments. It is substantially similar to the previous figure (FIG. 25) in that it uses a four electrode electrostatic internal measurement system for determining Axial and lateral forces applied to the nib.

The differences of FIG. 26 from FIG. 25 are generally a) that it shows axial (down the barrel) views of the NCPM 60 and secondary electrodes 65 and b) the following differences in the connection scheme method at the pivot tip.

The pointed region of the pivot tip connects to a conductive flex circuit through a conductive buffer 105 without a backing compression buffer the conductive buffer itself handles the compression and the connection with the flex connection behind the conductive region. The conductive buffer 105 and non-conductive buffer 93 regions form the conductive region buffer connecting the four secondary electrodes, in this diagram grouped and called the broken ring electrodes 65, to the system.

The numbering scheme of this diagram follows that of FIG. 25 excluding the connection changes above (The Nib 85, Front Pivot Damping Buffer 90, Nib Collet Pivot Mechanism and Primary Transceiver Electrode 60, Broken Ring Electrodes 65, Dielectric Gap 110, Connection Flex Circuit 80 and Flex Tail 95, Compression Force 70, and Pen Body 75). As can be seen, similarly to the version of FIG. 25, the primary electrode element is longitudinally tapered from front to rear, and in which the secondary electrodes are arranged such that the dielectric gaps 110 are generally uniform along the longitudinal direction when the pivoting nib collet mechanism 60 is not in a pivoted condition.

Figure 27:
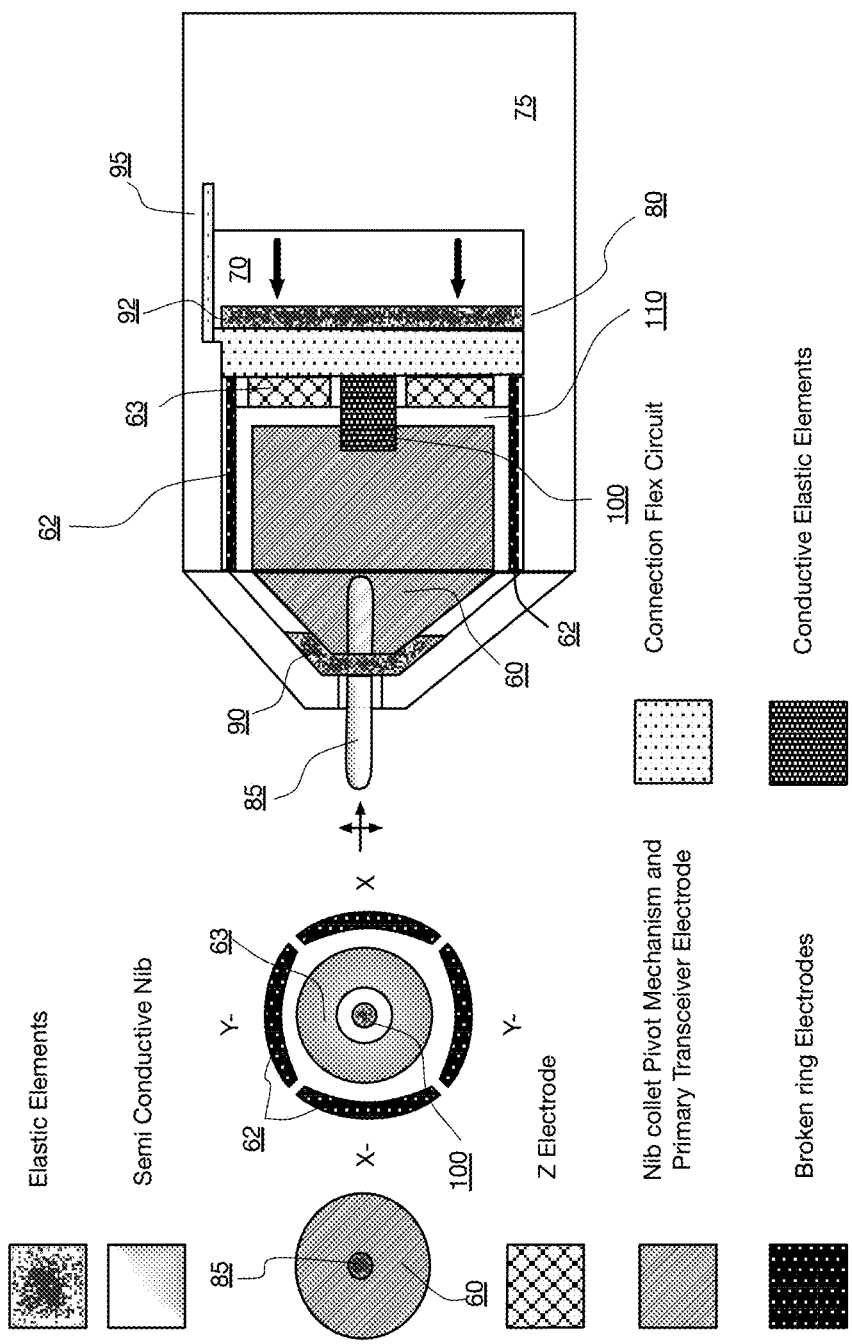
FIG. 27 is a diagram of an embodiment of a detailed cross section view of the pen pressure, tilt, and rotation mechanism and sensor created from a broken sensor ring system of four (−X, +X, −Y, +Y) electrodes used for tilt and a fifth (+1-Z) electrode used for pressure measurement with centered pivot location with connector flex circuit and method of compression.

FIG. 27 is a diagram of a multi-axis pen electrode system according to some embodiments. It is substantially similar to the previous figure (FIG. 26) but it uses a five electrode electrostatic internal measurement system. In the case of a five electrode secondary system an axial only force will not change the spacing to the four secondary sensors but the fifth flat back sensor (the Z Element 63) spacing will decrease and a lateral force will cause a rocking and will decrease plate spacing to one side and increase plate spacing at the opposite side but the fifth back sensor will have an equal increase on one side and a decrease on the other side so lateral force will cancel.

The differences of FIG. 26 to FIG. 25 are generally: a) The pointed region is replaced by a conductive Buffer Element 100, b) The Connection Flex Circuit 80 is pressed directly against the Broken Ring Electrodes 62, Z Electrode 63, and Conductive Buffer 100 by a Non-Conductive Buffer 92.

The numbering scheme of this diagram follows that of FIG. 25 excluding the connection and fifth element changes above (The Nib 85, Front Pivot Damping Buffer 90, Nib Collet Pivot Mechanism and Primary Transceiver Electrode 60, Dielectric Gap 110, Connection Flex Circuit 80 and Flex Tail 95, Compression Force 70, and Pen Body 75).

Figure 28:
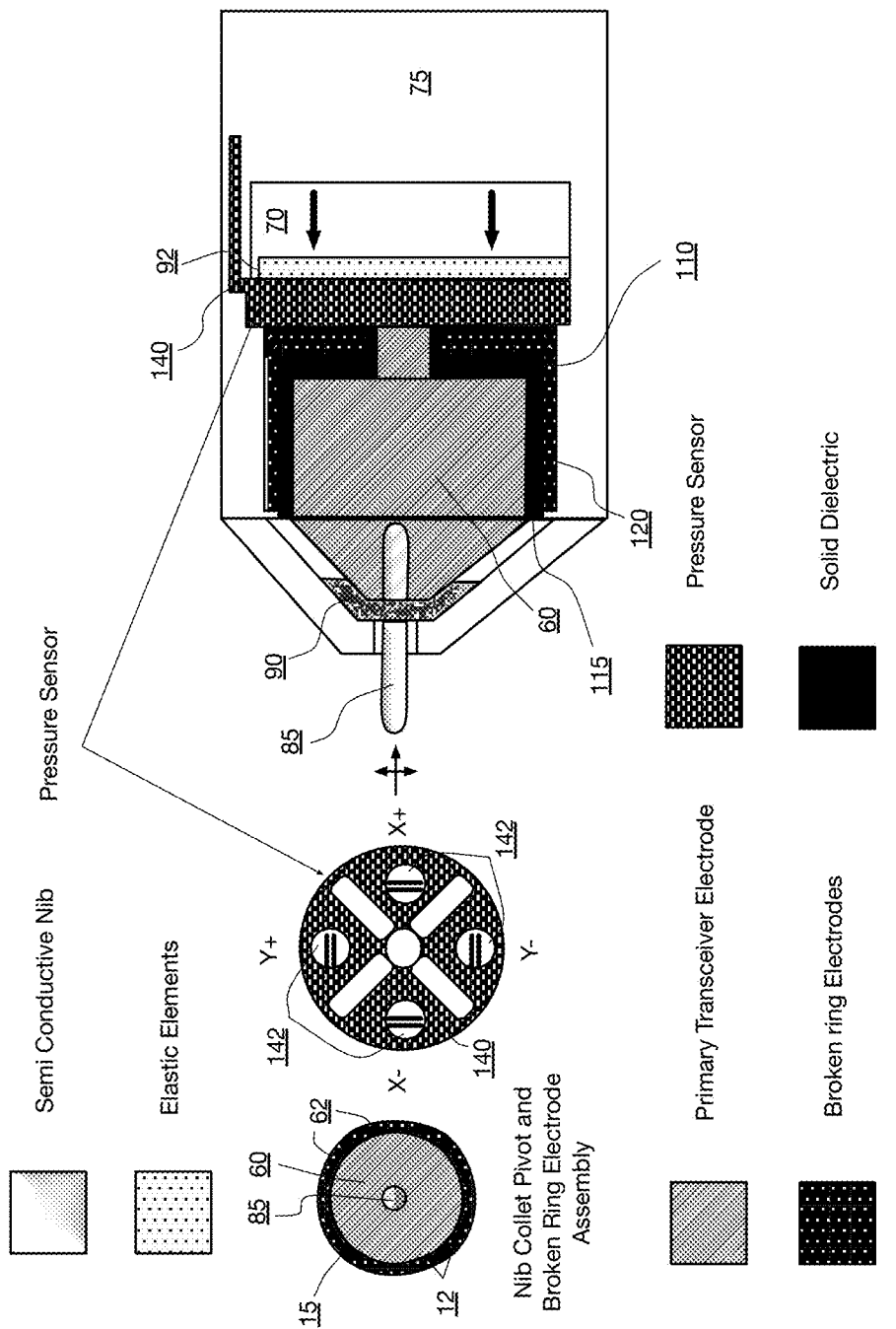
FIG. 28 is a diagram of an embodiment of a detailed cross section view of the pen pressure, tilt, and rotation mechanism with integral broken sensor ring tilt system of four electrodes with centered pivot location and pressure sensing flex circuit with compression method.

FIG. 28 shows an embodiment using Force Sensor 140 as part of the flex circuit. The configuration is substantially different and shows the Nib Collet Pivot Mechanism and Broken Ring Assembly 58 as a monolithic assembly where the Primary Electrode 60 and Secondary Electrodes 62 move together and are separated by a solid dielectric 115.

Figure 39:
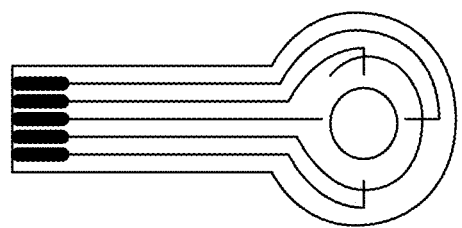
FIG. 39 is a prior art diagram showing a multiple variable resistor assembly.
Figure 42:
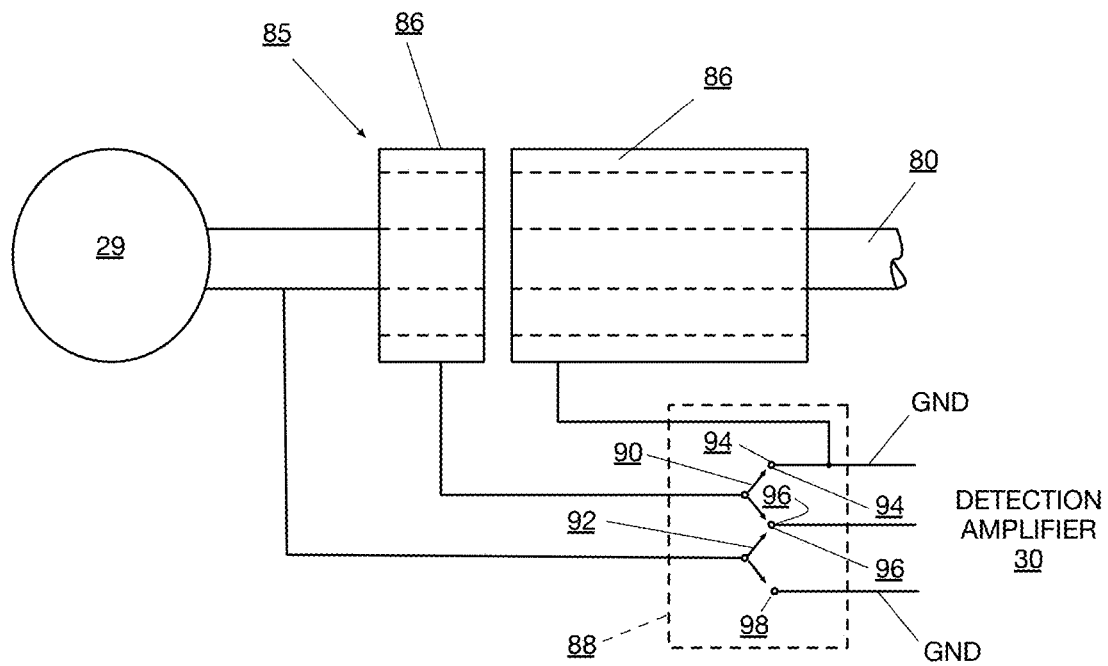
Figure 43:
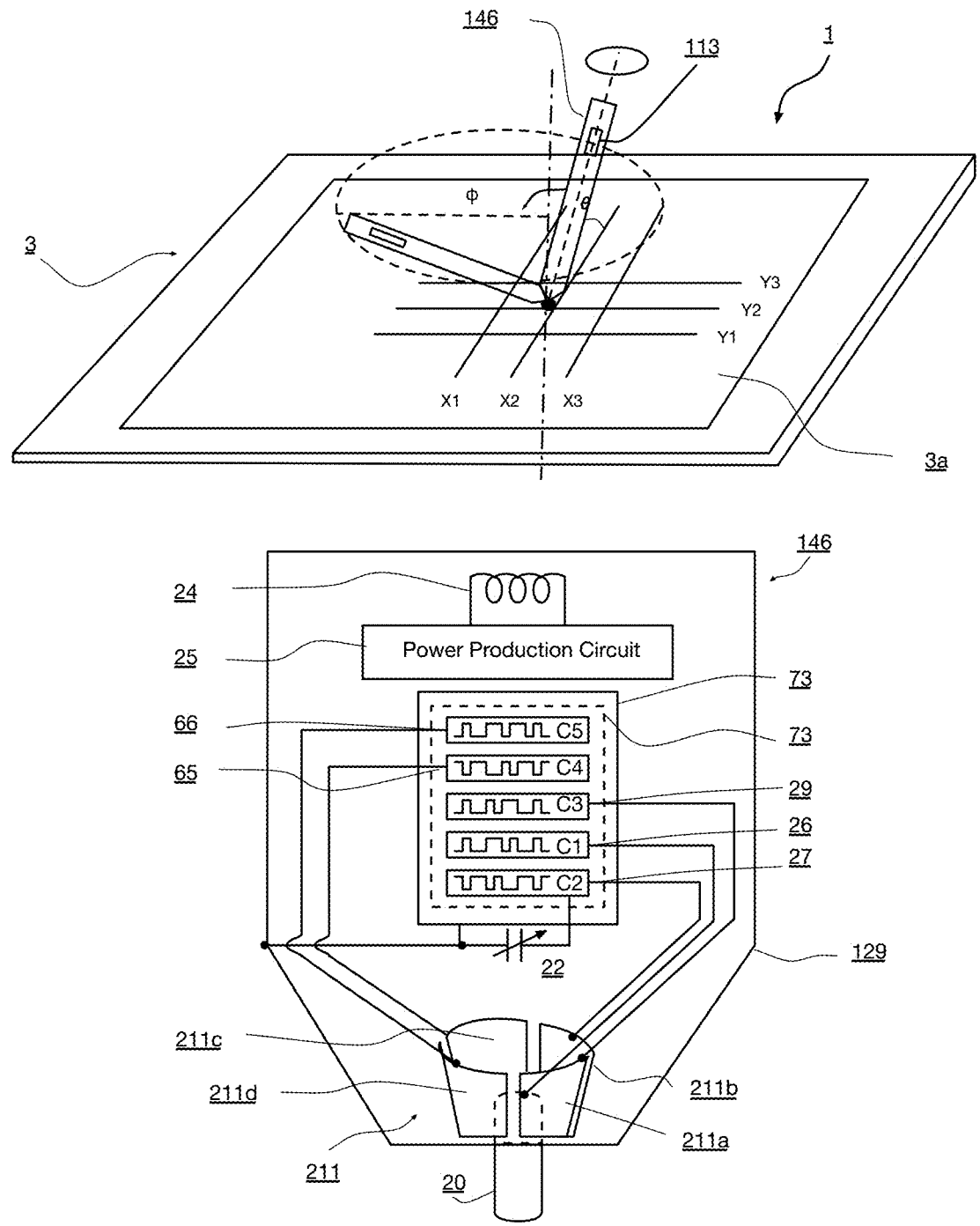
Figure 44:
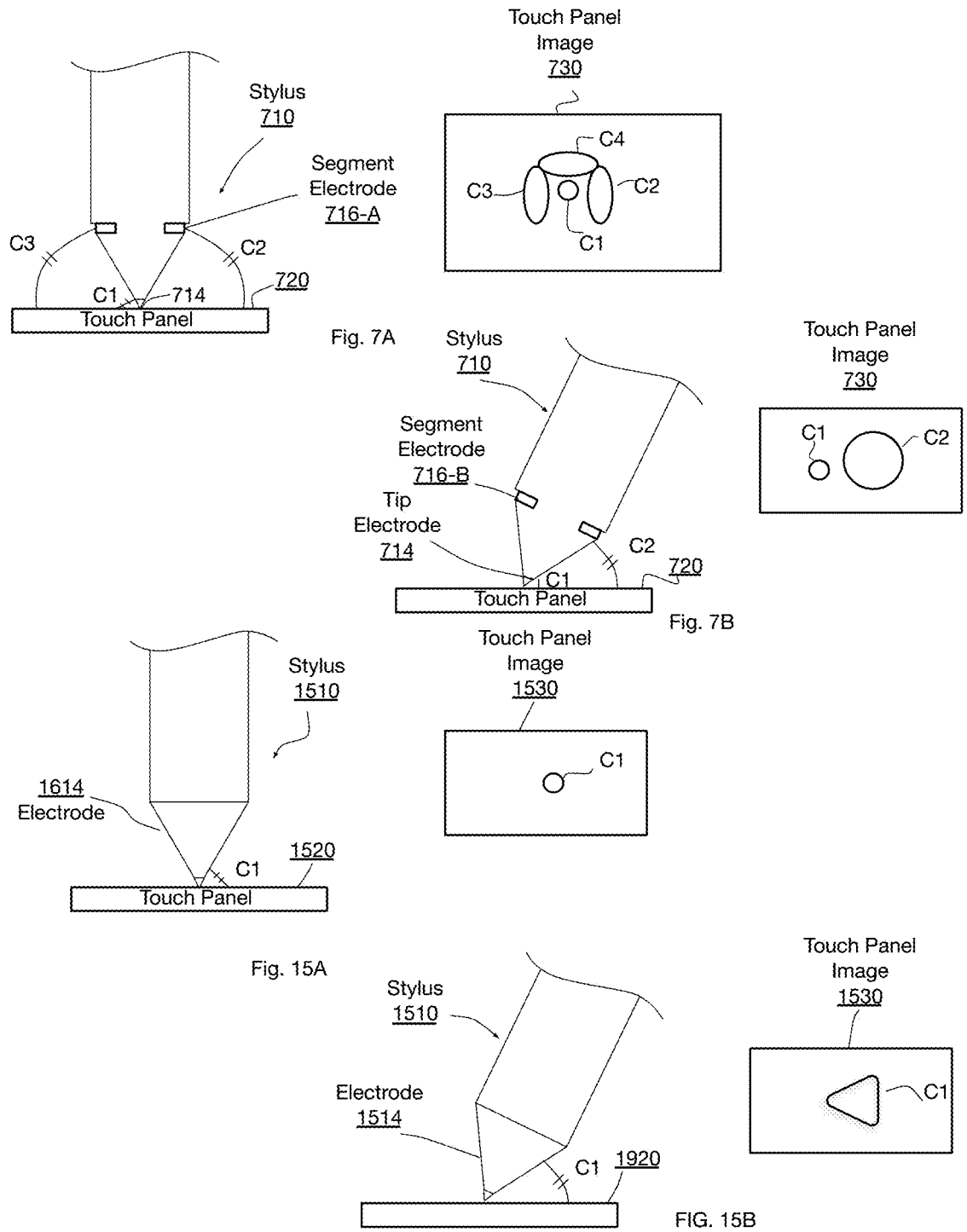

The Pressure Sensor Flex Circuit 140:

In some embodiments, the flex circuit is used to bring the signals from the processing board to the primary and secondary electrode elements contains Force Sensor Nodes 142 (Ref. FIG. 39) as part of the flex circuit.

For this multi-axis force sensor scheme, the flex circuit is the sensor but electrode connection to the primary electrode and one or more secondary electrodes may still be required. A multi-sided flex circuit with sensor elements on one side and electrode connection element on the back can be used with silicon containing conductive regions or nonconductive silicon depending on stack orientation.

Signal interaction of the multi element pressure scheme and Interaction with the Receiving system:

In some embodiments, when pressure sensors are used the external interactions are substantially the same concerning receiving system interaction as the previous description but measurements are made due to force changings to the impedance of the sensors versus electrostatic plate distance changes.

In the case of pressure sensors the back of the mechanism will be generally flat to the sensor plate and the mechanism will press in and/or rock at the pivot point transferring the force to the sensors. An axial only force will apply a force equally to all four sensors. A lateral force will cause a rocking and will add force to one side a reduce force at the opposite side.

The numbering scheme of this diagram follows that of FIG. 25 excluding the changes above (The Nib 85, Front Pivot Damping Buffer 90, Nib Collet Pivot Mechanism and Primary Transceiver Electrode 60, Dielectric Gap 110, Compression Force 70, and Pen Body 75).

Figure 29:
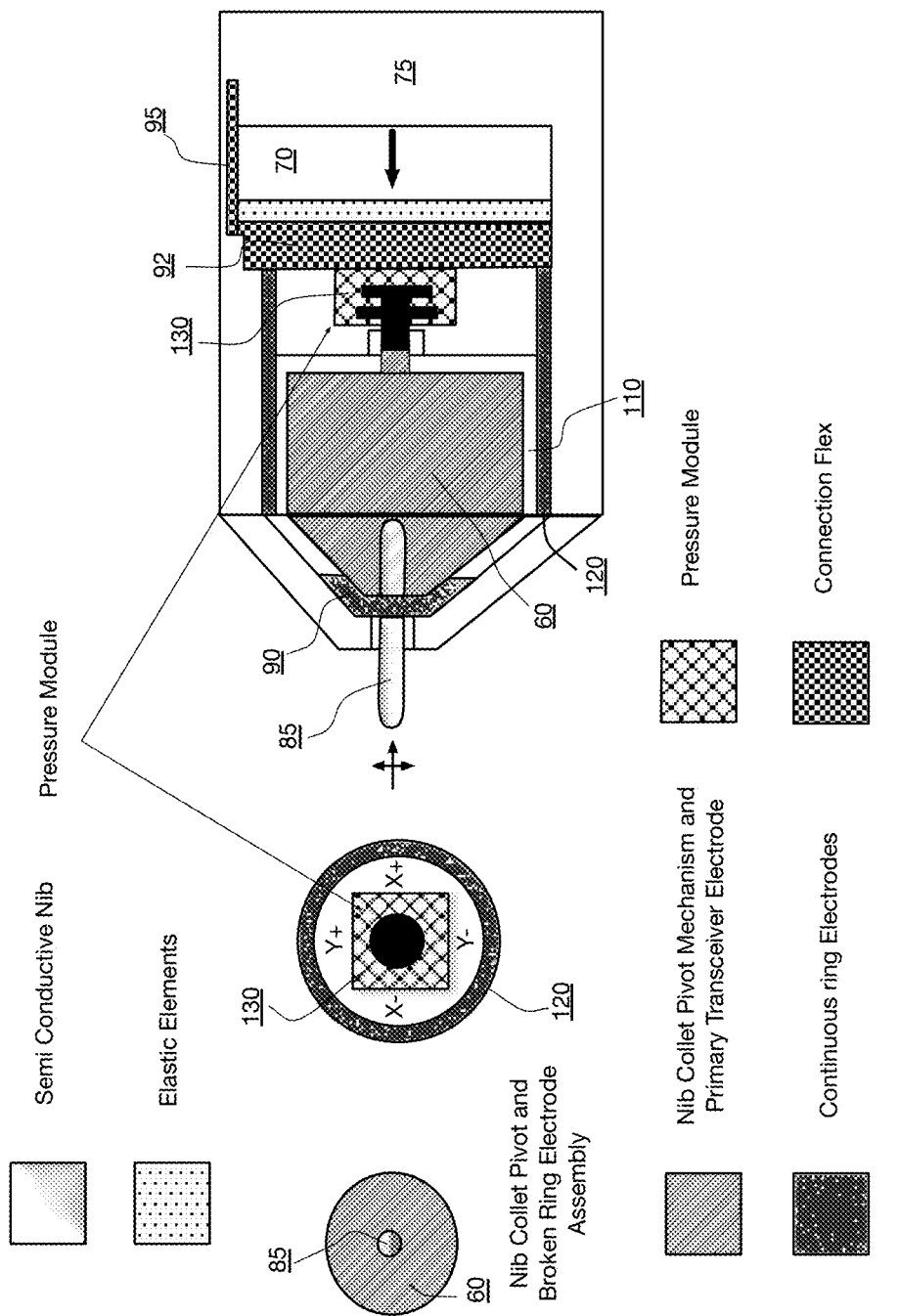
FIG. 29 is a diagram of an embodiment of a detailed cross section view of the pen pressure, tilt, and rotation mechanism and sensor module with a continuous ring tilt electrode.

FIG. 29 shows an embodiment using a Force Module 130 built into the flex tail and the diagram shows the Flex Tail 95 exiting to the outside system. The Nib Collet Pivot Mechanism 60 attaches to the Force Module 130 at the pivot point area and a Non-Conductor Buffer 92 is used to hold Compression Force 70 on the system against the Front Pivot Damping Buffer 90. The single secondary electrode shown is a Continuous Ring Electrode 120 but preferred alternate embodiments may use a four electrode Broken Ring Electrode configuration with the same advantages as the multi electrode systems above (see FIGS. 25,26,27) when interacting with an external touch system. In the case. of a stress module, the mechanism will attach to the module and the axial and lateral forces and pivoting movement will substantially be as mentioned above. The pressure and centering at the back of the mechanism is handled through the module.

The Force Module Flex Circuit 130:

In some embodiments, the flex circuit is used to bring the signals from the processing board to the primary and secondary elements also contains stress sensors that may be in modular packages at the flex tail.

Signal Interaction of the Multi Element Strain Scheme and Interaction with the Receiving System:

In some embodiments, when strain sensors are used the external interactions are substantially the same concerning receiving system interaction as the previous description but measurements are made due to force changing to the impedance of the sensors versus electrostatic plate distance changes.

The numbering scheme of this diagram follows that of FIG. 25 excluding the changes above (The Nib 85, Front Pivot Damping Buffer 90, Nib Collet Pivot Mechanism and Primary Transceiver Electrode 60, Dielectric Gap 110, Compression Force 70, and Pen Body 75).

Figure 30:
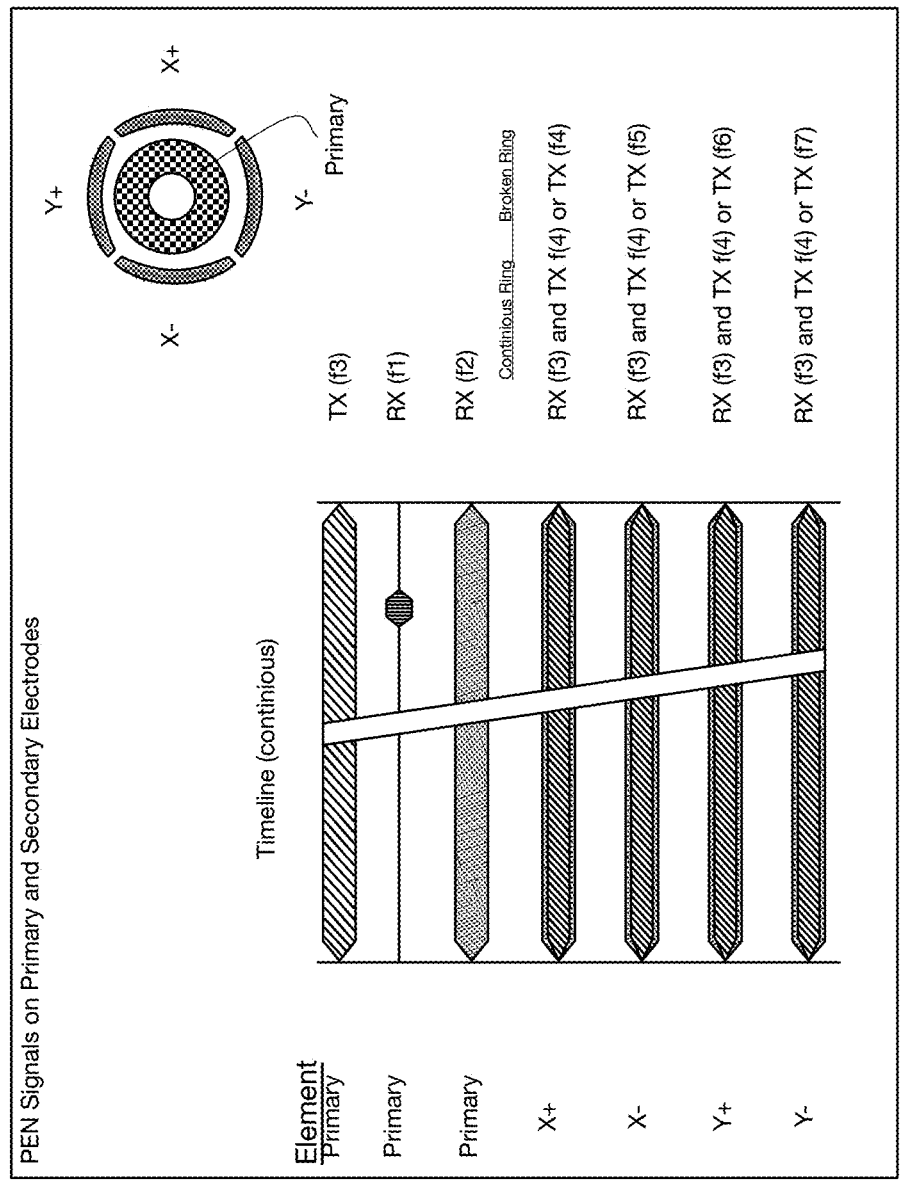
FIG. 30 is a timing diagram showing a continuous timeline of the pen signals with simultaneous transmit and receive of the electrostatic capacitive electrode signals applicable in the embodiments of FIGS. 25, 26, and 31, for example.

FIG. 30 is a timing diagram showing a continuous timeline of the pen signals with simultaneous transmit and receive of the electrostatic capacitive electrode signals. Primary and secondary electrode timing are shown for a four element secondary electrode broken ring configuration (see FIGS. 25, 26, and 31). The diagram shows the f1 and f2 mutual and self sensor signals that may be received when using the pen with a touch sensor system as described herein.

FIG. 31 shows a diagram of a four element electrostatic electrode system according to some embodiments. Defined zones for Internal Force and Tilt Signal Measurements at box 400 and External Signal Measurements at box 410 are shown. The Pen system 430 controls the Channel Drivers 420 with each Channel Drive 500 connected to a Primary Electrode 50 or a Secondary Electrode 52,53,54,55. The receiving system consists of a pen enable touch system (The Position System) 450 and touchscreen (The Position Sensor) 440, which may be constructed according to the single or multi-touch systems described herein, or other suitable touch system designs.

Signal Interaction of the Multi Element Electrostatic Scheme and Interaction with the Receiving System:

Now is provided a description of the preferred signal interaction of the example pen system of FIG. 31 internally to the pen and externally.

All or some the electrodes in the pen may be driven with a small high frequency signal with dither. This is the same type of signal as the self-capacitance signal on the multi-touch system and functions in the same manner to effect a continuous self-capacitance signal which can be measured but also is the main mechanism to overcome the internal hysteresis of the channel driver be it 30 m V of an analog comparator input or 150 m V of a digital input. This signal can be used to measure proximity to other surfaces or the users touch.

Internal Force and Tilt Signal Measurements 400:

The Primary Electrode 50 is driven with the lower frequency large amplitude signal that also couples across the small internal air gap between it and Secondary Electrodes 52,53,54,55. As the pivot mechanism experiences axial or lateral forces the mechanism will press further into the pen and this will reduce all the capacitive spacing gaps evenly and/or rock with lateral force. The change to the capacitances changes the coupled energy between the Primary and Secondary Electrodes which is measured and resolved into pressure, tilt, and barrel rotation. These interactions are internal to the pen mechanism.

External Signal Measurements 410:

The Primary Pivoting Electrode 50 is driven with a lower frequency large amplitude signal that acts as the primary pen signal to the receiving system. The receiving system measures this signal on multiple rows and columns and uses this data to resolve the Primary Electrode location.

The Secondary Electrodes 52, 53, 54, 55 also are simultaneously driven with a singular or plural alternate signals of high amplitude that interact with the receiving system allowing the receiving system to measure and resolve orientation, tilt, and rotation. A diagram (FIG. 32) shows the difference resolution capabilities between driving the secondary ring electrodes with an identical frequency signal or four separate frequency signals.

The Primary or Secondary Electrodes may also, simultaneous to their other functions, receive signals from the touch system such as self, mutual, or transmitted data signals which are expected to be fairly small and on different frequencies.

The Primary or Secondary Electrodes may also, simultaneous to their other functions, transmit signals to the touch system. Transmitted data signals should be large on different frequencies and so may saturate the driver channel if other large amplitude transmission frequencies are simultaneously used. It may be preferable to transmit data via radio or to transmit the data on the Secondary Electrodes interleaved with the normal secondary transmit signals. Due to the nature and benefits of continuous signal operation it may be preferable to drive signals at half the possible amplitude when they are going to share a channel to prevent voltage saturation of the driver channel.

In some instances, it may be desirable to measure the self-signal emanating from the touch screen system. The rows and columns may be driven at a different self-frequency to enable the pen to measure a rudimentary orientation of the barrel to the rows and columns through calculation of the received signals on the Secondary Electrodes and the balance between the signals.

Figure 32:
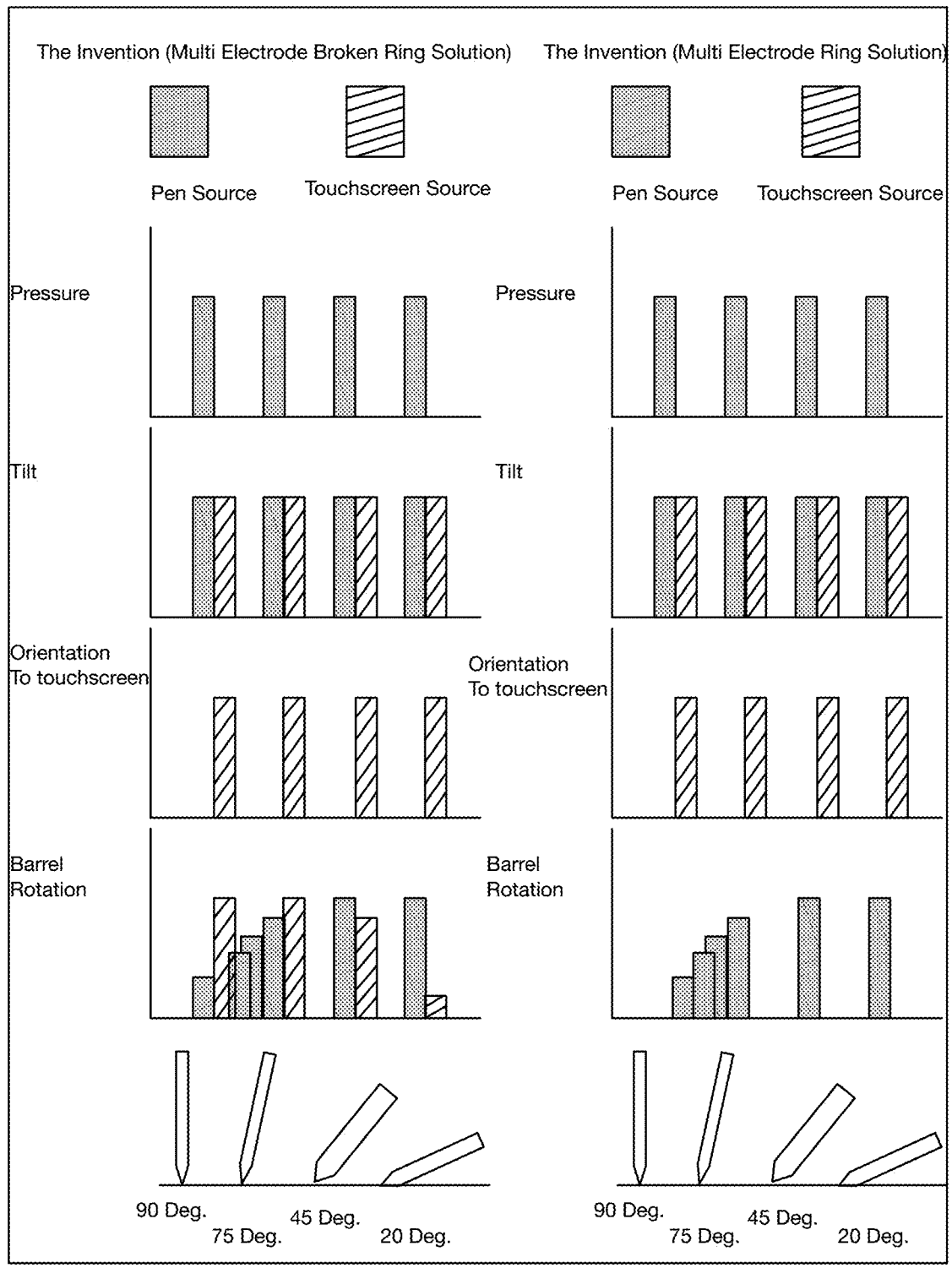
FIG. 32 is a signal diagram showing resolutions for the invention with different electrode ring configurations at different pen tilt angles.

FIG. 32 is a signal diagram showing resolutions achievable using the invention with different electrode ring configurations at different pen tilt angles. The difference resolution capabilities are shown between driving a single or plural secondary ring electrodes with a single frequency signal (Ring Solution) or driving the plural electrodes with four separate frequency signals (Broken Ring Solution).

Figure 33:
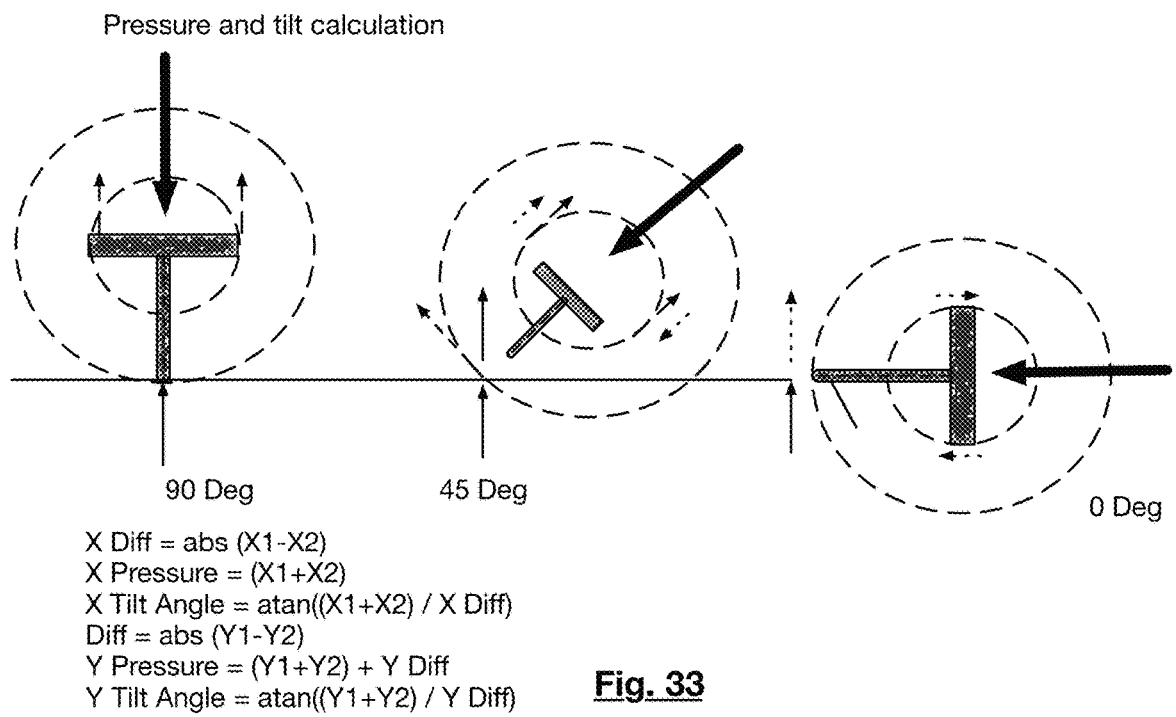
FIG. 33 is a signal diagram showing force distribution and calculations for the invention at different pen angles.

FIG. 33 a diagram showing force distribution and calculations for various embodiments of the invention at different pen angles.

Figure 34:
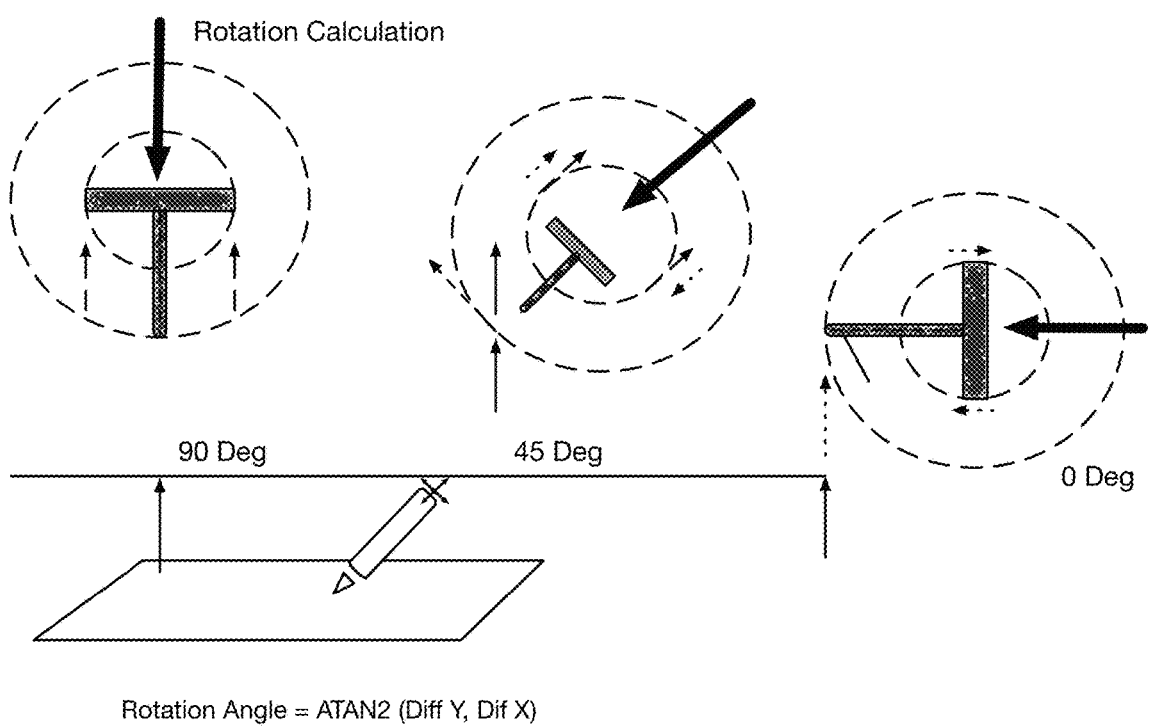
FIG. 34 is a signal diagram showing force distribution and calculations for the invention at different pen angles.

FIG. 34 a diagram showing force distribution and calculations for various embodiments of the invention at different pen angles. The final diagram of FIGS. 33 and 34 shows a pen nib tip placed at a surface edge while the pen body is held past the edge.

Figure 35:
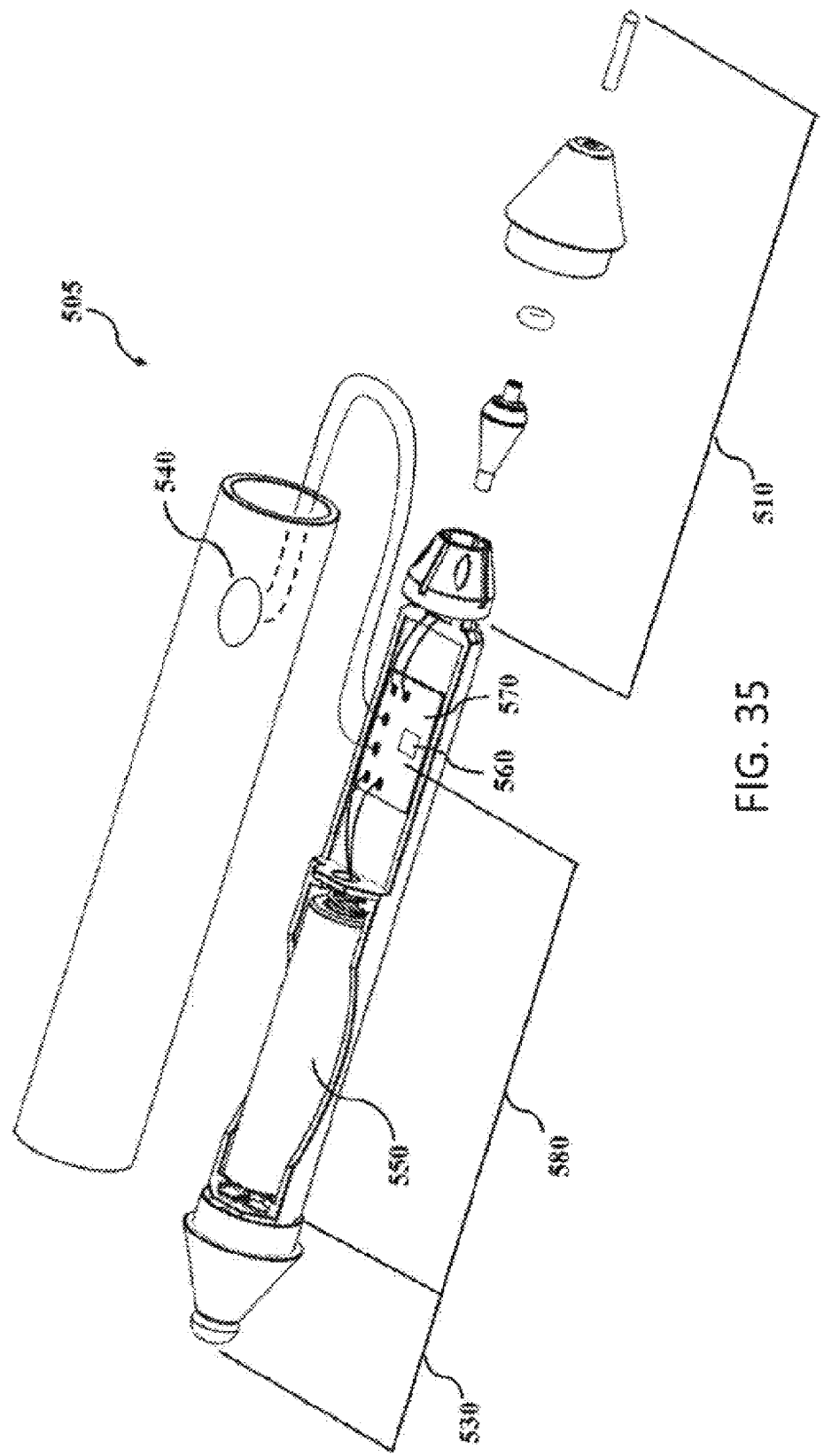
FIG. 35 is an isometric, exploded perspective view of an electronic pen assembly according to an embodiment of the invention.

FIG. 35 an isometric diagram showing an exploded pen assembly according to some embodiments of the invention. The Pen Assembly 505 broken into general components and regions such as The Pen Electrode Assembly 510, Alternate Electrode Assembly 530, Power Source 550, Power Management Group 580, Control FPGA or ASIC 560, Circuit Board 570, and Alternate Input Electrode Assembly 540.

Figure 36:
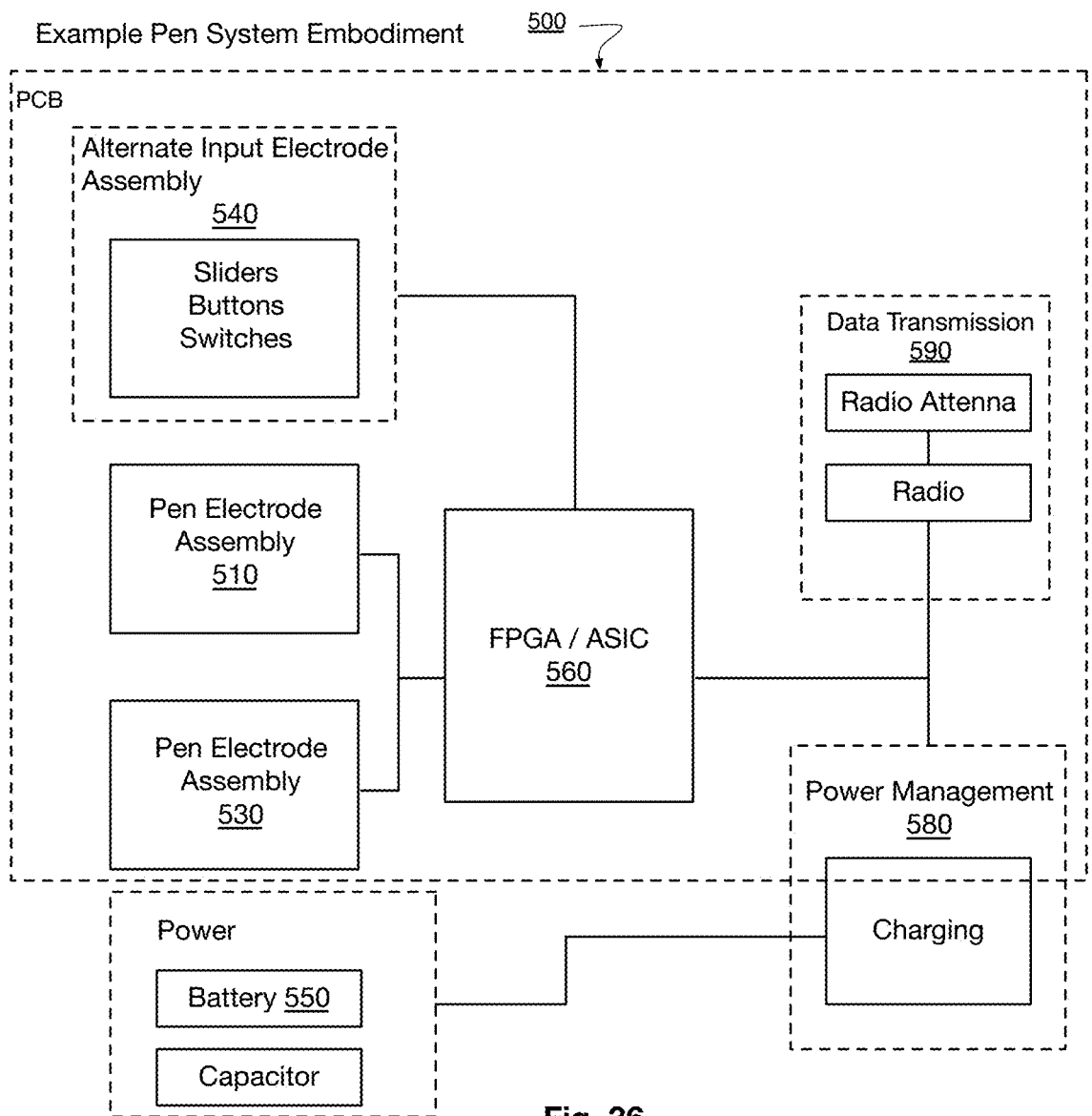
FIG. 36 is a system block diagram for the pen assembly of FIG. 35.

FIG. 36 a system block diagram for the exploded pen assembly of FIG. 35. The Pen System Block Diagram 500 with The Pen Electrode Assembly 510, Alternate Electrode Assembly 530, Power Source 550, Power Management Group 580, Control FPGA or ASIC 560, Alternate Input Electrode Assembly 540, and Radio Transmission 590. As can be seen, the alternate electrode assembly 530 may include control buttons, sliders, or switches that may also be driven and sensed with the drive/receive circuitry 30 described herein in various versions.

Figure 37:
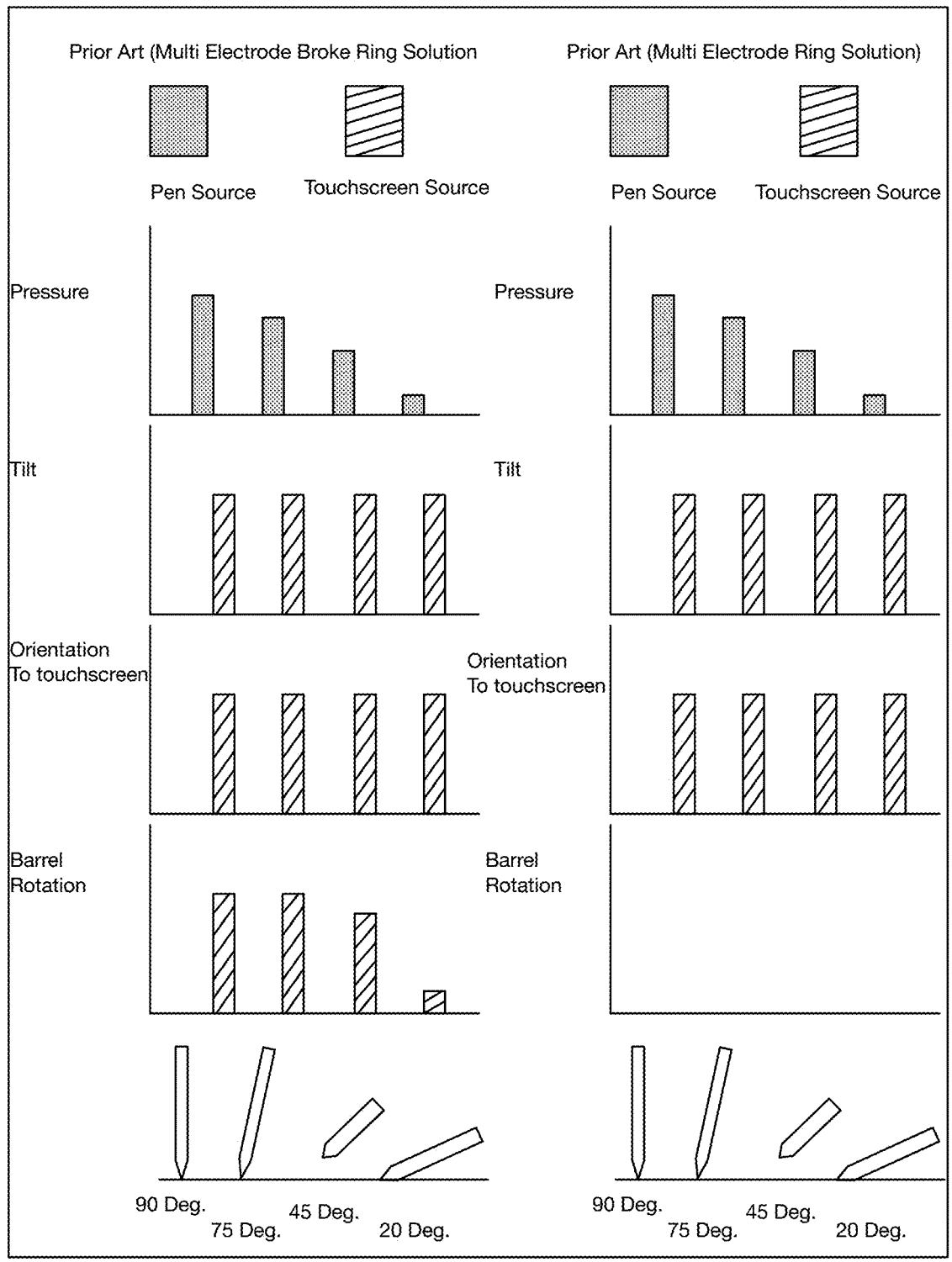
FIG. 37 is a signal diagram showing resolutions for prior art pen and touchscreen systems with different electrode ring configurations at different pen tilt angles.

FIG. 37 is a signal diagram showing resolutions for prior art pen and touchscreen systems with different electrode ring configurations at different pen tilt angles.

Figure 38:
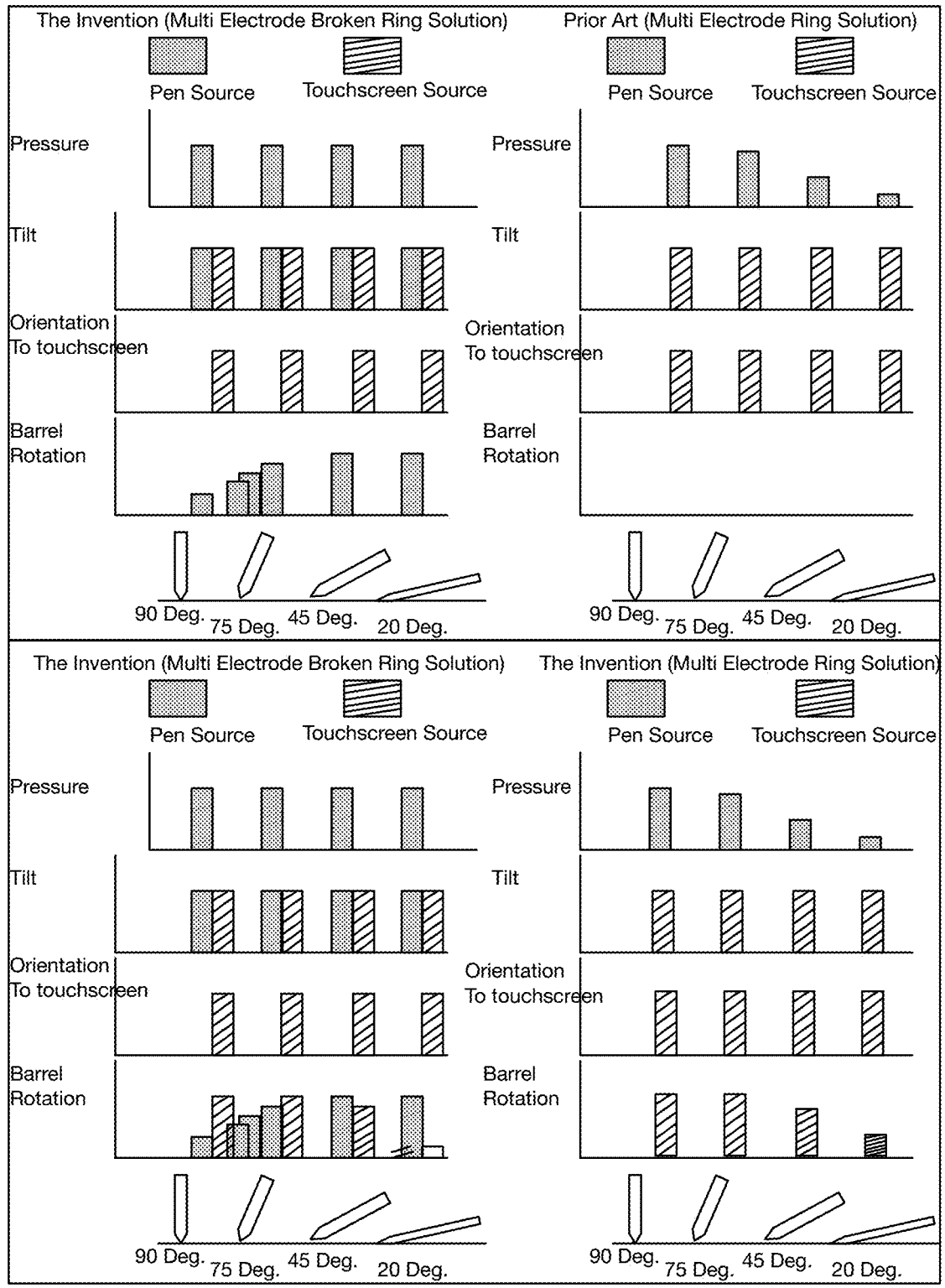
FIG. 38 is a signal diagram showing the relative resolution capabilities of the current invention against the prior art at different pen tilt angles.

FIG. 38 is a signal diagram showing the relative resolution capabilities of the current invention against the prior art at different pen tilt angles. The magnitudes shown on the chart in this and other similar diagrams generally refer to signal strength achievable when sensing the listed measurements.

Action without the Receiving System:

In some embodiments, with a radio enabled device, operation away from the touchscreen system for the purpose of simple relative motion control is possible.

A pen system may be provided according to various embodiments may have a plurality of multi-axis pen electrode systems, in which one or all support alternate input functions that uses radio to transmit the pressure, tilt, and barrel rotation to a computer system which may be thumb, finger, or an inanimate object (table top as an example) driven for a relative mode of cursor movement or button functions. Determining the presence of a touch screen may be used as a method of activating various alternate input functions such as eraser and cursor movement functions. The receiving system driver then orients the tilt and appropriately and send relative mouse movements to the system based on the strength of the tilt. Pressure measurements taken in this manner can be interpreted by the receiving system driver to activate mouse clicks or other cursor functions, for example.

A pen system with a singular multi-axis pen electrode system that uses radio to transmit the pressure, tilt, and barrel rotation can act like a relative pointing device as above or if the tip movement can be resisted such as on a rough, non-slick, or even placing the tip into a divot the pen could act as a relative mouse replacement.

Conclusion, Ramifications and Scope

The pressure measurement circuitry according to the present invention provides an apparatus and method for enhancing the usability and feature set of an electrostatic pen by enabling pressure, barrel rotation, and tilt data improved over the prior art. The improved signaling and channel driving and sensing schemes enhance the pen capability, especially in combination with the touch sensor systems herein.

While described embodiments provide pressure, tilt, and rotation information, not all embodiments will provide pressure, tilt, and rotation information as some of the information may be not required in some applications.

While some embodiments of the present invention are shown and described, it is to be distinctly understood that this invention is not limited thereto but may be variously embodied. From the foregoing description, it will be apparent that various changes may be made without departing from the spirit and scope of the invention as defined by the claims.

Accordingly, the scope of the invention should not be determined by the embodiments illustrated.

Multiple individual inventions are described herein. The inventions are patentable separately and in combinations. The combinations of features described herein should not be interpreted to be limiting, and the features herein may be used in any working combination or sub-combination according to the invention. This description should therefore be interpreted as providing written support for any working combination or sub-combination of the features herein. Various signaling and signal processing functions described above can be implemented in either hardware or software.

As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are

What is claimed is:

1. An electronic pen system comprising:
a pivoting nib collet mechanism that includes a primary electrode;
a first secondary electrode and a second secondary electrode implemented at a first location and a second location, respectively, around the primary electrode of the pivoting nib collet mechanism, wherein movement of the primary electrode that changes a first distance between the first secondary electrode and the primary electrode causes a first capacitance change between the primary electrode and the first secondary electrode, and wherein movement of the primary electrode that changes a second distance between the second secondary electrode and the primary electrode causes a second capacitance change between the primary electrode and the second secondary electrode;
a drive/receive circuit configured simultaneously, via the primary electrode, to drive a primary electrode signal and to sense change of the primary electrode signal based on at least one of the first capacitance change or the second capacitance change; and
a processor configured to process the change of the primary electrode signal in accordance with determining one or more of location of the primary electrode to the first secondary electrode and the second secondary electrode, pressure on the pivoting nib collet mechanism, tilt of the pivoting nib collet mechanism, or barrel rotation of the pivoting nib collet mechanism.

2. The electronic pen system of claim 1, wherein the drive/receive circuit is further configured simultaneously, via the primary electrode, to drive the primary electrode signal and to sense change of the primary electrode signal based on a first electrode signal coupled into the primary electrode from the first secondary electrode.

3. The electronic pen system of claim 2 further comprising:
another drive/receive circuit configured to drive the first electrode signal via the first secondary electrode.

4. The electronic pen system of claim 2, wherein the primary electrode signal includes a first frequency, and the first electrode signal includes a second frequency.

5. The electronic pen system of claim 1 further comprising:
another drive/receive circuit configured simultaneously, via the first secondary electrode, to drive a first electrode signal and to sense change of the first electrode signal based on at least one of the first capacitance change or the second capacitance change; and
a processor configured to process the change of the first electrode signal in accordance with determining the one or more of the location of the primary electrode to the first secondary electrode and the second secondary electrode, the pressure on the pivoting nib collet mechanism, the tilt of the pivoting nib collet mechanism, or the barrel rotation of the pivoting nib collet mechanism.

6. The electronic pen system of claim 5, wherein the another drive/receive circuit is further configured simultaneously, via the first secondary electrode, to drive the first electrode signal and to sense change of the first electrode signal based on the primary electrode signal coupled into the first secondary electrode from the primary electrode.

7. The electronic pen system of claim 6, wherein the primary electrode signal includes a first frequency, and the first electrode signal includes a second frequency.

8. The electronic pen system of claim 1 further comprising:
a first other drive/receive circuit configured simultaneously, via the first secondary electrode, to drive a first electrode signal and to sense change of the first electrode signal based on at least one of the first capacitance change or the second capacitance change; and
a second drive/receive circuit configured simultaneously, via the second secondary electrode, to drive a second electrode signal and to sense change of the second electrode signal based on at least one of the first capacitance change or the second capacitance change; and
a processor configured to process at least one of the change of the first electrode signal or the change of the second electrode signal in accordance with determining the one or more of the location of the primary electrode to the first secondary electrode and the second secondary electrode, the pressure on the pivoting nib collet mechanism, the tilt of the pivoting nib collet mechanism, or the barrel rotation of the pivoting nib collet mechanism.

9. The electronic pen system of claim 8 further comprising:
the first other drive/receive circuit configured simultaneously, via the first secondary electrode, to drive the first electrode signal and to sense change of the first electrode signal based on or the primary electrode signal coupled into the first secondary electrode from the primary electrode; and
the second drive/receive circuit configured simultaneously, via the second secondary electrode, to drive the second electrode signal and to sense change of the second electrode signal based on the primary electrode signal coupled into the second secondary electrode from the primary electrode.

10. The electronic pen system of claim 9, wherein the primary electrode signal includes a first frequency, the first electrode signal includes a second frequency, and the second electrode signal includes a third frequency.

11. An electronic pen system comprising:
a pivoting nib collet mechanism that includes a primary electrode;
a first secondary electrode and a second secondary electrode implemented at a first location and a second location, respectively, around the primary electrode of the pivoting nib collet mechanism, wherein movement of the primary electrode that changes a first distance between the first secondary electrode and the primary electrode causes a first capacitance change between the primary electrode and the first secondary electrode, and wherein movement of the primary electrode that changes a second distance between the second secondary electrode and the primary electrode causes a second capacitance change between the primary electrode and the second secondary electrode;
a primary drive/receive circuit configured to drive a primary electrode signal via the primary electrode;
a first secondary drive/receive circuit configured simultaneously, via the first secondary electrode, to drive a first electrode signal and to sense change of the first electrode signal based on at least one of the first capacitance change, the second capacitance change, or the primary electrode signal coupled into the first secondary electrode from the primary electrode; and a processor configured to process the change of the primary electrode signal in accordance with determining one or more of location of the primary electrode to the first secondary electrode and the second secondary electrode, pressure on the pivoting nib collet mechanism, tilt of the pivoting nib collet mechanism, or barrel rotation of the pivoting nib collet mechanism.

12. The electronic pen system of claim 11, wherein the primary electrode signal includes a first frequency, and the first electrode signal includes a second frequency.

13. The electronic pen system of claim 11, wherein the primary drive/receive circuit is further configured simultaneously, via the primary electrode, to drive the primary electrode signal and to sense change of the primary electrode signal based on at least one of the first capacitance change or the second capacitance change.

14. The electronic pen system of claim 13, wherein the primary electrode signal includes a first frequency, and the first electrode signal includes a second frequency.

15. The electronic pen system of claim 11, wherein the primary drive/receive circuit is further configured simultaneously, via the primary electrode, to drive the primary electrode signal and to sense change of the primary electrode signal based on at least one of the first capacitance change, the second capacitance change, or the first electrode signal coupled into the primary electrode signal from the first secondary electrode.

16. The electronic pen system of claim 15, wherein the primary electrode signal includes a first frequency, and the first electrode signal includes a second frequency.

17. The electronic pen system of claim 11 further comprising:

a second secondary drive/receive circuit configured simultaneously, via the second secondary electrode, to drive a second electrode signal and to sense change of the second electrode signal based on at least one of the first capacitance change, the second capacitance change, or the primary electrode signal coupled into the second secondary electrode from the primary electrode; and a processor configured to process the change of the second electrode signal in accordance with determining one or more of the location of the primary electrode to the first secondary electrode and the second secondary electrode, the pressure on the pivoting nib collet mechanism, the tilt of the pivoting nib collet mechanism, or the barrel rotation of the pivoting nib collet mechanism.

18. The electronic pen system of claim 17, wherein the primary electrode signal includes a first frequency, the first electrode signal includes a second frequency, and the second electrode signal includes a third frequency.

19. The electronic pen system of claim 11 further comprising:

a second drive/receive circuit configured to drive a second electrode signal via the second secondary electrode; and the primary drive/receive circuit configured simultaneously, via the primary electrode, to drive the primary electrode signal and to sense change of the primary electrode signal based on at least one of the first capacitance change, the second capacitance change, the first electrode signal coupled into the primary electrode signal from the first secondary electrode, or the second electrode signal coupled into the primary electrode signal from the second secondary electrode.

20. The electronic pen system of claim 19, wherein the primary electrode signal includes a first frequency, the first electrode signal includes a second frequency, and the second electrode signal includes a third frequency.

* * * * *